US011064549B2

United States Patent
Ang et al.

(10) Patent No.: US 11,064,549 B2
(45) Date of Patent: Jul. 13, 2021

(54) BANDWIDTH CONFIGURATION TECHNIQUES IN WIRELESS COMMUNICATIONS

(71) Applicant: QUALCOMM Incorporated, San Diego, CA (US)

(72) Inventors: Peter Pui Lok Ang, San Diego, CA (US); Tingfang Ji, San Diego, CA (US); John Edward Smee, San Diego, CA (US); Masato Kitazoe, Hachiouji (JP); Keiichi Kubota, Tokyo (JP); Peter Gaal, San Diego, CA (US); Joseph Binamira Soriaga, San Diego, CA (US); Hung Dinh Ly, San Diego, CA (US); Valentin Alexandru Gheorghiu, Tokyo (JP); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 16/534,694

(22) Filed: Aug. 7, 2019

(65) Prior Publication Data
US 2020/0053811 A1 Feb. 13, 2020

Related U.S. Application Data

(60) Provisional application No. 62/716,917, filed on Aug. 9, 2018.

(51) Int. Cl.
*H04W 76/18* (2018.01)
*H04L 5/00* (2006.01)
(Continued)

(52) U.S. Cl.
CPC .......... *H04W 76/18* (2018.02); *H04L 5/0051* (2013.01); *H04L 5/0064* (2013.01);
(Continued)

(58) Field of Classification Search
CPC ... H04W 76/18; H04W 76/27; H04W 72/048; H04W 74/0833; H04L 5/0051; H04L 5/0064; H04L 27/2666
(Continued)

(56) References Cited

U.S. PATENT DOCUMENTS

| 2014/0092855 | A1* | 4/2014 | Ahn | H04W 74/006 |
| | | | | 370/329 |
| 2015/0365976 | A1* | 12/2015 | Lee | H04W 4/70 |
| | | | | 455/422.1 |

(Continued)

FOREIGN PATENT DOCUMENTS

WO WO-2016048044 A1 3/2016

OTHER PUBLICATIONS

Apple et al., "Signaling Support for CE Mode and Bandwidth Switch for FeMTC Devices", 3GPP Draft; R2-1701323, 3rd Generation Partnership Project (3GPP), Mobile Competence Centre ; 650, Route Des Lucioles ; F-06921 Sophia-Antipolis Cedex ; France, vol. RAN WG2, No. Athens, Greece; Feb. 13, 2017-Feb. 17, 2017, Feb. 12, 2017 (Feb. 12, 2017), XP051211987, 3 pages, Retrieved from the Internet: URL:http://www.3gpp.org/ftp/Meetings_3GPP_SYNC/RAN2/Docs/ [retrieved on Feb. 12, 2017], p. 2, lines 1-11 APPLE_Bandwidth_Switch_2017_Pgs_3_EFS.

(Continued)

*Primary Examiner* — Obaidul Huq
(74) *Attorney, Agent, or Firm* — Holland & Hart LLP; Nerrie M. Zohn

(57) ABSTRACT

Methods, systems, and devices for wireless communications are described that provide for configuration of channel bandwidth that may be specific to a particular user equipment (UE). A UE may be configured with a channel bandwidth that is less than or equal to a channel bandwidth of the serving base station, and may also be different than a (Continued)

channel bandwidth of one or more other UEs that are served by the base station. The base station may signal the UE-specific channel bandwidth in UE-specific signaling, such as UE-specific radio resource control (RRC) signaling.

68 Claims, 26 Drawing Sheets

(51) Int. Cl.
| | | |
|---|---|---|
| *H04W 76/27* | (2018.01) | |
| *H04L 27/26* | (2006.01) | |
| *H04W 72/04* | (2009.01) | |
| *H04W 74/08* | (2009.01) | |

(52) U.S. Cl.
CPC ....... *H04L 27/2666* (2013.01); *H04W 72/048* (2013.01); *H04W 74/0833* (2013.01); *H04W 76/27* (2018.02)

(58) Field of Classification Search
USPC ........................................ 370/310, 328, 329
See application file for complete search history.

(56) References Cited

U.S. PATENT DOCUMENTS

| | | | | |
|---|---|---|---|---|
| 2016/0029426 | A1* | 1/2016 | Bangolae | H04W 72/04 370/329 |
| 2018/0049068 | A1 | 2/2018 | Agiwal et al. | |
| 2019/0037579 | A1* | 1/2019 | Yi | H04L 5/001 |
| 2019/0349060 | A1* | 11/2019 | Liao | H04L 5/005 |
| 2020/0204406 | A1* | 6/2020 | Zhang | H04L 5/0053 |

OTHER PUBLICATIONS

Intel Corporation: "On UE Bandwidth Support in NR", 3GPP Draft; R4-1709407 UE BW Support, 3rd Generation Partnership Project (3GPP), Mobile Competence Centre ; 650, Route Des Lucioles, F-06921 Sophia-Antipolis Cedex ; France, vol. TSG RAN, No. Nagoya, Japan; Sep. 19, 2017-Sep. 21, 2017, Sep. 11, 2017 (Sep. 11, 2017), XP051331890, 5 Pages, Retrieved from the Internet: URL:http://www.3gpp.org/ftp/tsg_ran/WG4_Radio/TSGR4_AHs/TSGR4_NR_Sep2017/Docs/ [retrieved on Sep. 11, 2017].
International Search Report and Written Opinion—PCT/US2019/045716—ISA/EPO—Nov. 6, 2019.
Lenovo: "DCI Design on Supporting Larger Bandwidth in FeMTC", 3GPP Draft; R1-1612096, 3rd Generation Partnership Project (3GPP), Mobile Competence Centre ; 650, Route Des Lucioles ; F-06921 Sophia-Antipolis Cedex; France, vol. RAN WG1, No. Reno, USA; Nov. 14, 2016-Nov. 18, 2016, Nov. 13, 2016 (Nov. 13, 2016), XP051176051, 3 Pages, Retrieved from the Internet: URL:http://www.3gpp.org/ftp/Meetings_3GPP_SYNC/RAN1/Docs/ [retrieved on Nov. 13, 2016], section 2; pp. 1-2.
Samsung: "Random Access in NR—Flexible UE BW Aspects", 3GPP Draft; R2-164696_Random Access-UE Channel Bandwidth Aspects, 3rd Generation Partnership Project (3GPP), Mobile Competence Centre ; 650, Route Des Lucioles; F-06921 Sophia-Antipolis Cedex; France, vol. RAN WG2, No. Gothenburg, Sweden; Aug. 22, 2016-Aug. 26, 2016, Aug. 21, 2016 (Aug. 21, 2016), XP051126469, 5 Pages, Retrieved from the Internet: URL:http://www.3gpp.org/ftp/Meetings_3GPP_SYNC/RAN2/Docs/ [retrieved on Aug. 21, 2016].
Samsung: "RRM Measurement to Support Bandwidth Parts in NR", 3GPP Draft; R2-1711190 RRM Measurement to Support Bandwidth Parts in NR R1, 3rd Generation Partnership Project (3GPP), Mobile Competence Centre ; 650, Route Des Lucioles ; F-06921 Sophia-Antipolis Ced, vol. RAN WG2, No. Prague, Czech; Oct. 9, 2017-Oct. 13, 2017, Oct. 8, 2017 (Oct. 8, 2017), XP051343197, 7 Pages, Retrieved from the Internet: URL:http://www.3gpp.org/ftp/Meetings_3GPP_SYNC/RAN2/Docs/ [retrieved on Oct. 8, 2017].
Samsung: "The Impact of Bandwidth Part on RAN2: Overview and Issues", 3GPP Draft; R2-1711595—3GPP TSG RAN WG2, #99bis, The Impact of Bandwidth Part on RAN2, 3rd Generation Partnership Project (3GPP), Mobile Competence Centre ; 650, Route Des Lucioles ; F-06921 Sophia-Antipolis Cedex; France, vol. RAN WG2, No. Prague, Czech Republic; Oct. 9, 2017-Oct. 13, 2017, Oct. 8, 2017 (Oct. 8, 2017), XP051343561, 8 Pages, Retrieved from the Internet:URL:http://www.3gpp.org/ftp/Meetings_3GPP_SYNC/RAN2/Docs/ [retrieved on Oct. 8, 2017].

* cited by examiner

BANDWIDTH CONFIGURATION TECHNIQUES IN WIRELESS COMMUNICATIONS

CROSS REFERENCE

The present Application for Patent claims the benefit of U.S. Provisional Patent Application No. 62/716,917 by Ang et al., entitled "BANDWIDTH CONFIGURATION TECHNIQUES IN WIRELESS COMMUNICATIONS," filed Aug. 9, 2018, assigned to the assignee hereof, and expressly incorporated by reference herein.

BACKGROUND

The following relates generally to wireless communications, and more specifically to bandwidth configuration techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform (DFT)-spread-orthogonal frequency division multiplexing (OFDM) (DFT-S-OFDM). A wireless multiple-access communications system may include a number of base stations or network access nodes, each simultaneously supporting communication for multiple communication devices, which may be otherwise known as user equipment (UE).

In some wireless communications systems, a channel bandwidth may be configurable by a base station. For example, in some NR systems, a channel bandwidth of up to 100 MHz may be configured for communications by a base station. Such relatively high bandwidth channels may provide for relatively high data transmission rates and may enhance the efficiency of the network. In some cases, multiple different types of UEs may be deployed in such a system, and some UEs may not be capable of supporting such relatively high bandwidth channels, or may prefer to operate using a lower channel bandwidth (e.g., for power savings). In such cases, efficient techniques for configuring channel bandwidths may enhance the efficiency of a wireless communications system.

SUMMARY

The described techniques relate to improved methods, systems, devices, and apparatuses that support bandwidth configuration techniques in wireless communications. Various described techniques provide for configuration of channel bandwidth that may be specific to a particular user equipment (UE). In some cases, a UE may be configured with a channel bandwidth that is less than or equal to a channel bandwidth of the serving base station, and may also be different than a channel bandwidth of one or more other UEs that are served by the base station. In some cases, a UE may signal a maximum UE-specific channel bandwidth that may be less than or equal to a cell-specific channel bandwidth, which may also be referred to as a base station channel bandwidth. The base station may then configure the UE-specific channel bandwidth, and may signal the UE-specific channel bandwidth in UE-specific signaling, such as UE-specific radio resource control (RRC) signaling. A base station, in some cases, may reject a connection request for a UE that indicates a lower UE-specific channel bandwidth than the cell-specific channel bandwidth. Such a UE, upon receiving an indication of the rejection, may select a different base station for a connection. Such techniques may allow coexistence of multiple UEs that may have different UE-specific channel bandwidths, and provide flexibility for base stations to serve UEs in an efficient manner.

A method of wireless communications at a UE is described. The method may include receiving system information from a base station, the system information including a first bandwidth indication, transmitting a connection establishment request to the base station based on the system information, receiving, from the base station responsive to the connection establishment request, an indication of a UE-specific channel bandwidth, where the UE-specific channel bandwidth is less than or equal to a cell-specific channel bandwidth and is based on a maximum supported bandwidth of the UE, and communicating with the base station using the UE-specific channel bandwidth.

An apparatus for wireless communications at a UE is described. The apparatus may include a processor, memory coupled with the processor, and instructions stored in the memory. The instructions may be executable by the processor to cause the apparatus to receive system information from a base station, the system information including a first bandwidth indication, transmit a connection establishment request to the base station based on the system information, receive, from the base station responsive to the connection establishment request, an indication of a UE-specific channel bandwidth, where the UE-specific channel bandwidth is less than or equal to a cell-specific channel bandwidth and is based on a maximum supported bandwidth of the UE, and communicate with the base station using the UE-specific channel bandwidth.

Another apparatus for wireless communications at a UE is described. The apparatus may include means for receiving system information from a base station, the system information including a first bandwidth indication, transmitting a connection establishment request to the base station based on the system information, receiving, from the base station responsive to the connection establishment request, an indication of a UE-specific channel bandwidth, where the UE-specific channel bandwidth is less than or equal to a cell-specific channel bandwidth and is based on a maximum supported bandwidth of the UE, and communicating with the base station using the UE-specific channel bandwidth.

A non-transitory computer-readable medium storing code for wireless communications at a UE is described. The code may include instructions executable by a processor to receive system information from a base station, the system information including a first bandwidth indication, transmit a connection establishment request to the base station based on the system information, receive, from the base station responsive to the connection establishment request, an indication of a UE-specific channel bandwidth, where the UE-specific channel bandwidth is less than or equal to a cell-specific channel bandwidth and is based on a maximum supported bandwidth of the UE, and communicate with the base station using the UE-specific channel bandwidth.

In some examples of the method, apparatuses, and non-transitory computer-readable medium described herein, the transmitting the connection establishment request further may include operations, features, means, or instructions for transmitting the maximum supported bandwidth of the UE to the base station.

In some examples of the method, apparatuses, and non-transitory computer-readable medium described herein, the maximum supported bandwidth of the UE may be less than the cell-specific channel bandwidth.

In some examples of the method, apparatuses, and non-transitory computer-readable medium described herein, the maximum supported bandwidth of the UE may be a maximum supported bandwidth part (BWP) bandwidth that may be less than or equal to a full bandwidth capability of the UE.

Some examples of the method, apparatuses, and non-transitory computer-readable medium described herein may further include operations, features, means, or instructions for determining the maximum supported BWP bandwidth of the UE to include with the connection establishment request based on the full bandwidth capability of the UE, the cell-specific channel bandwidth, a current data usage of the UE, a power consumption mode of the UE, a thermal status of the UE, or any combinations thereof.

In some examples of the method, apparatuses, and non-transitory computer-readable medium described herein, the first bandwidth indication corresponds to the cell-specific channel bandwidth or a maximum channel bandwidth supported by the base station.

In some examples of the method, apparatuses, and non-transitory computer-readable medium described herein, the first bandwidth indication may be a minimum bandwidth supported by the base station.

In some examples of the method, apparatuses, and non-transitory computer-readable medium described herein, the first bandwidth indication may be a placeholder indication of bandwidth.

In some examples of the method, apparatuses, and non-transitory computer-readable medium described herein, the receiving the indication of the UE-specific channel bandwidth may include operations, features, means, or instructions for receiving UE-specific RRC signaling that includes the indication of the UE-specific channel bandwidth.

In some examples of the method, apparatuses, and non-transitory computer-readable medium described herein, the UE-specific RRC signaling comprises a plurality of indications of UE-specific channel bandwidths corresponding to respective ones of a plurality of subcarrier spacings (SCSs), and the plurality of indications of UE-specific channel bandwidths includes the indication of the UE-specific channel bandwidth.

In some examples of the method, apparatuses, and non-transitory computer-readable medium described herein, the UE-specific channel bandwidth may be a subset of the maximum supported bandwidth of the UE.

In some examples of the method, apparatuses, and non-transitory computer-readable medium described herein, the UE-specific channel bandwidth may be a first UE-specific channel bandwidth, and where the method further may include operations, features, means, or instructions for receiving, subsequent to communicating with the base station using the first UE-specific channel bandwidth, a bandwidth reconfiguration message from the base station that indicates a second UE-specific channel bandwidth that may have a different bandwidth than the first UE-specific channel bandwidth, a different location within the cell-specific channel bandwidth, or any combination thereof.

In some examples of the method, apparatuses, and non-transitory computer-readable medium described herein, the connection establishment request includes one or more of the maximum supported bandwidth of the UE, a maximum carrier aggregation supported by the UE, a UE capability to dynamically or semi-statically reconfigure the UE-specific channel bandwidth within the cell-specific channel bandwidth, a maximum modulation and coding scheme (MCS) supported by the UE, a UE processing timeline capability, or any combinations thereof.

In some examples of the method, apparatuses, and non-transitory computer-readable medium described herein, the communicating with the base station using the UE-specific channel bandwidth includes transmitting one or more uplink transmissions to the base station using a first subset of resource blocks within the UE-specific channel bandwidth.

In some examples of the method, apparatuses, and non-transitory computer-readable medium described herein, the first subset of resource blocks and a second subset of resource blocks occupy alternating resource blocks within the UE-specific channel bandwidth.

A method of wireless communications at a UE is described. The method may include receiving first system information from a first base station, the first system information including a first cell-specific channel bandwidth, transmitting a first connection establishment request to the first base station based on the first system information, the first connection establishment request indicating a maximum supported bandwidth of the UE that is less than the first cell-specific channel bandwidth, and receiving, from the first base station responsive to the first connection establishment request, a rejection indication.

An apparatus for wireless communications at a UE is described. The apparatus may include a processor, memory coupled with the processor, and instructions stored in the memory. The instructions may be executable by the processor to cause the apparatus to receive first system information from a first base station, the first system information including a first cell-specific channel bandwidth, transmit a first connection establishment request to the first base station based on the first system information, the first connection establishment request indicating a maximum supported bandwidth of the UE that is less than the first cell-specific channel bandwidth, and receive, from the first base station responsive to the first connection establishment request, a rejection indication.

Another apparatus for wireless communications at a UE is described. The apparatus may include means for receiving first system information from a first base station, the first system information including a first cell-specific channel bandwidth, transmitting a first connection establishment request to the first base station based on the first system information, the first connection establishment request indicating a maximum supported bandwidth of the UE that is less than the first cell-specific channel bandwidth, and receiving, from the first base station responsive to the first connection establishment request, a rejection indication.

A non-transitory computer-readable medium storing code for wireless communications at a UE is described. The code may include instructions executable by a processor to receive first system information from a first base station, the first system information including a first cell-specific channel bandwidth, transmit a first connection establishment request to the first base station based on the first system information, the first connection establishment request indicating a maximum supported bandwidth of the UE that is less than the first cell-specific channel bandwidth, and receive, from the first base station responsive to the first connection establishment request, a rejection indication.

Some examples of the method, apparatuses, and non-transitory computer-readable medium described herein may further include operations, features, means, or instructions for transmitting a second connection establishment request to a second base station based on second system information of the second base station, the second connection establishment request indicating the maximum supported bandwidth of the UE, and receiving, from the second base station responsive to the second connection establishment request, a connection establishment response to establish a connection with the second base station.

In some examples of the method, apparatuses, and non-transitory computer-readable medium described herein, the rejection indication from the first base station may be received prior to the UE camping on the first base station.

In some examples of the method, apparatuses, and non-transitory computer-readable medium described herein, the first connection establishment request may be a random access message transmitted to the first base station as part of a random access procedure, and where the rejection indication may be received in a random access response from the first base station as part of the random access procedure.

In some examples of the method, apparatuses, and non-transitory computer-readable medium described herein, the maximum supported bandwidth of the UE may be transmitted in a PUSCH transmission, and the rejection indication may be received in a PDSCH transmission, as part of the random access procedure.

A method of wireless communications at a base station is described. The method may include transmitting system information to at least a first UE of a set of UEs in a broadcast transmission, the system information including a first bandwidth indication, receiving a connection establishment request from the first UE, determining, based on the connection establishment request, a first UE-specific channel bandwidth for communications with the first UE, where the first UE-specific channel bandwidth is less than or equal to a cell-specific channel bandwidth and is based on a maximum supported bandwidth of the first UE, and transmitting a connection establishment response to the first UE that includes an indication of the first UE-specific channel bandwidth.

An apparatus for wireless communications at a base station is described. The apparatus may include a processor, memory coupled with the processor, and instructions stored in the memory. The instructions may be executable by the processor to cause the apparatus to transmit system information to at least a first UE of a set of UEs in a broadcast transmission, the system information including a first bandwidth indication, receive a connection establishment request from the first UE, determine, based on the connection establishment request, a first UE-specific channel bandwidth for communications with the first UE, where the first UE-specific channel bandwidth is less than or equal to a cell-specific channel bandwidth and is based on a maximum supported bandwidth of the first UE, and transmit a connection establishment response to the first UE that includes an indication of the first UE-specific channel bandwidth.

Another apparatus for wireless communications at a base station is described. The apparatus may include means for transmitting system information to at least a first UE of a set of UEs in a broadcast transmission, the system information including a first bandwidth indication, receiving a connection establishment request from the first UE, determining, based on the connection establishment request, a first UE-specific channel bandwidth for communications with the first UE, where the first UE-specific channel bandwidth is less than or equal to a cell-specific channel bandwidth and is based on a maximum supported bandwidth of the first UE, and transmitting a connection establishment response to the first UE that includes an indication of the first UE-specific channel bandwidth.

A non-transitory computer-readable medium storing code for wireless communications at a base station is described. The code may include instructions executable by a processor to transmit system information to at least a first UE of a set of UEs in a broadcast transmission, the system information including a first bandwidth indication, receive a connection establishment request from the first UE, determine, based on the connection establishment request, a first UE-specific channel bandwidth for communications with the first UE, where the first UE-specific channel bandwidth is less than or equal to a cell-specific channel bandwidth and is based on a maximum supported bandwidth of the first UE, and transmit a connection establishment response to the first UE that includes an indication of the first UE-specific channel bandwidth.

In some examples of the method, apparatuses, and non-transitory computer-readable medium described herein, the transmitting the connection establishment response may include operations, features, means, or instructions for transmitting UE-specific RRC signaling to the first UE that includes the indication of the first UE-specific channel bandwidth.

In some examples of the method, apparatuses, and non-transitory computer-readable medium described herein, the UE-specific RRC signaling comprises a plurality of indications of UE-specific channel bandwidths corresponding to respective ones of a plurality of subcarrier spacings (SCSs), and the plurality of indications of UE-specific channel bandwidths includes the indication of the first UE-specific channel bandwidth.

In some examples of the method, apparatuses, and non-transitory computer-readable medium described herein, the first UE-specific channel bandwidth may be different than a second UE-specific channel bandwidth of a second UE of the set of UEs.

In some examples of the method, apparatuses, and non-transitory computer-readable medium described herein, the connection establishment request includes an indication of the maximum supported bandwidth of the first UE.

In some examples of the method, apparatuses, and non-transitory computer-readable medium described herein, the maximum supported bandwidth of the first UE may be less than or equal to the cell-specific channel bandwidth.

In some examples of the method, apparatuses, and non-transitory computer-readable medium described herein, the maximum supported bandwidth of the first UE may be a maximum supported BWP bandwidth that may be less than or equal to a full bandwidth capability of the first UE.

In some examples of the method, apparatuses, and non-transitory computer-readable medium described herein, the first bandwidth indication corresponds to the cell-specific channel bandwidth or a maximum channel bandwidth supported by the base station.

In some examples of the method, apparatuses, and non-transitory computer-readable medium described herein, the first bandwidth indication may be a minimum bandwidth supported by the base station.

In some examples of the method, apparatuses, and non-transitory computer-readable medium described herein, the first bandwidth indication may be a placeholder indication of bandwidth.

In some examples of the method, apparatuses, and non-transitory computer-readable medium described herein, the first UE-specific channel bandwidth may be a subset of the maximum supported bandwidth of the first UE.

Some examples of the method, apparatuses, and non-transitory computer-readable medium described herein may further include operations, features, means, or instructions for determining, subsequent to transmitting the connection establishment response, a second UE-specific channel bandwidth for communications with the first UE, the second UE-specific channel bandwidth having a different bandwidth than the first UE-specific channel bandwidth, a different location within the cell-specific channel bandwidth, or any combination thereof, and transmitting an indication of the second UE-specific channel bandwidth to the first UE.

In some examples of the method, apparatuses, and non-transitory computer-readable medium described herein, the connection establishment request includes one or more of the maximum supported bandwidth of the first UE, a maximum carrier aggregation supported by the first UE, a capability of the first UE to dynamically or semi-statically reconfigure the first UE-specific channel bandwidth within the cell-specific channel bandwidth, a maximum MCS supported by the first UE, a first UE processing timeline capability, or any combinations thereof.

Some examples of the method, apparatuses, and non-transitory computer-readable medium described herein may further include operations, features, means, or instructions for configuring the first UE to use a first subset of resource blocks within the first UE-specific channel bandwidth.

In some examples of the method, apparatuses, and non-transitory computer-readable medium described herein, the first subset of resource blocks and a second subset of resource blocks occupy alternating resource blocks within the first UE-specific channel bandwidth.

A method of wireless communications at a base station is described. The method may include transmitting system information to at least a first UE of a set of UEs in a broadcast transmission, the system information including a cell-specific channel bandwidth, receiving a connection establishment request from the first UE, the connection establishment request indicating a maximum supported bandwidth of the first UE that is less than the cell-specific channel bandwidth, determining, based on the maximum supported bandwidth of the first UE, to reject the connection establishment request from the first UE, and transmitting a rejection indication to the first UE.

An apparatus for wireless communications at a base station is described. The apparatus may include a processor, memory coupled with the processor, and instructions stored in the memory. The instructions may be executable by the processor to cause the apparatus to transmit system information to at least a first UE of a set of UEs in a broadcast transmission, the system information including a cell-specific channel bandwidth, receive a connection establishment request from the first UE, the connection establishment request indicating a maximum supported bandwidth of the first UE that is less than the cell-specific channel bandwidth, determine, based on the maximum supported bandwidth of the first UE, to reject the connection establishment request from the first UE, and transmit a rejection indication to the first UE.

Another apparatus for wireless communications at a base station is described. The apparatus may include means for transmitting system information to at least a first UE of a set of UEs in a broadcast transmission, the system information including a cell-specific channel bandwidth, receiving a connection establishment request from the first UE, the connection establishment request indicating a maximum supported bandwidth of the first UE that is less than the cell-specific channel bandwidth, determining, based on the maximum supported bandwidth of the first UE, to reject the connection establishment request from the first UE, and transmitting a rejection indication to the first UE.

A non-transitory computer-readable medium storing code for wireless communications at a base station is described. The code may include instructions executable by a processor to transmit system information to at least a first UE of a set of UEs in a broadcast transmission, the system information including a cell-specific channel bandwidth, receive a connection establishment request from the first UE, the connection establishment request indicating a maximum supported bandwidth of the first UE that is less than the cell-specific channel bandwidth, determine, based on the maximum supported bandwidth of the first UE, to reject the connection establishment request from the first UE, and transmit a rejection indication to the first UE.

In some examples of the method, apparatuses, and non-transitory computer-readable medium described herein, the rejection indication may be transmitted to the first UE prior to the first UE camping on the base station.

In some examples of the method, apparatuses, and non-transitory computer-readable medium described herein, the connection establishment request may be a random access message transmitted to the base station as part of a random access procedure, and where the rejection indication may be transmitted in a random access response as part of the random access procedure.

In some examples of the method, apparatuses, and non-transitory computer-readable medium described herein, the rejection indication includes an identification of one or more other base stations that may be configured to support the maximum supported bandwidth of the first UE.

DETAILED DESCRIPTION

Figure 1:
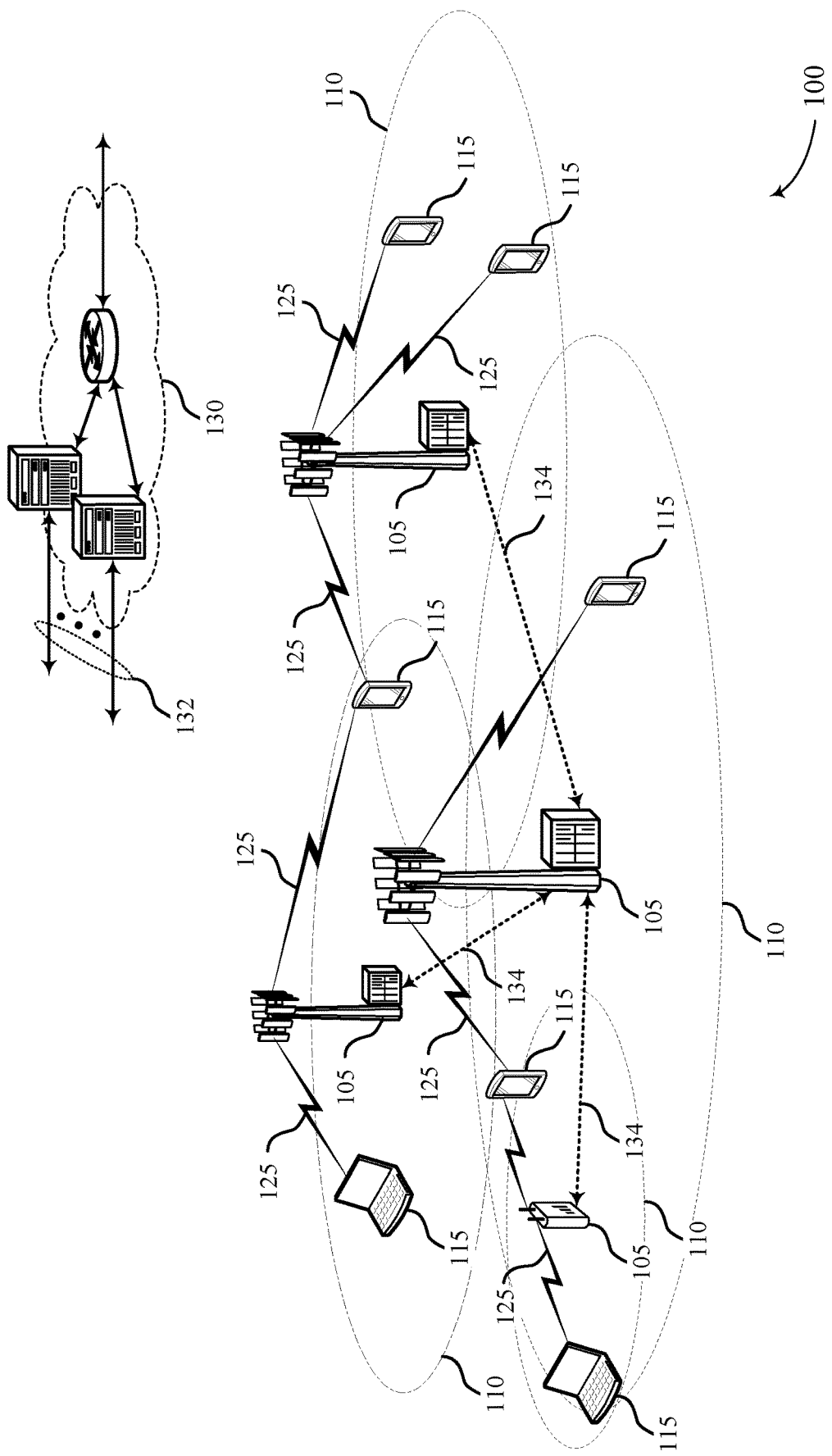
FIG. 1 illustrates an example of a system for wireless communications that supports bandwidth configuration techniques in wireless communications in accordance with aspects of the present disclosure.

In various aspects of the disclosure, different user equipment (UE) channel bandwidths may be configured for different UEs that may be present in a system. For example, a first UE may support a 100 MHz channel bandwidth, and a second UE may support a 20 MHz channel bandwidth, and both the first UE and second UE may be configured and served by a serving cell at a base station. Various techniques disclosed herein provide for the base station to configure and serve such UEs. In some cases, a UE may be configured with a channel bandwidth that is less than or equal to a channel bandwidth of the base station, and may also be different than a channel bandwidth of one or more other UEs that are served by the base station. In some examples, a base station may configure the UE-specific channel bandwidth for a UE, and may signal the UE-specific channel bandwidth in UE-specific signaling, such as UE-specific radio resource control (RRC) signaling. It is noted that several examples discussed herein use a 20 MHz channel bandwidth and 100 MHz channel bandwidth as exemplary bandwidths for different UEs. These exemplary channel bandwidths are provided for illustration and discussion purposes only and that any different values for channel bandwidths may be used and are within the scope of this disclosure.

In some cases, a UE may signal a maximum UE-specific channel bandwidth that may be less than or equal to a cell-specific channel bandwidth. The UE may signal such a maximum UE-specific channel bandwidth based on a capability of the UE (e.g., a low tier UE may support a 20 MHz channel bandwidth and a high tier UE may support a 100 MHz channel bandwidth). In some cases, a UE may have a capability for a higher channel bandwidth, and may determine to signal a lower maximum UE-specific channel bandwidth based on conditions at the UE (e.g., an amount of data to be transferred, a priority of a service associated with data to be transferred, UE power consumption conditions, UE thermal conditions, or any combinations thereof). In some cases, the UE may signal the maximum UE-specific channel bandwidth in a random access message (e.g., in a message 3 transmission of an established random access procedure used in NR or LTE systems). The base station may then configure the UE-specific channel bandwidth based on the signaled maximum UE-specific channel bandwidth.

A base station, in some cases, may reject a connection request for a UE that indicates a lower UE-specific channel bandwidth than the cell-specific channel bandwidth. For example, a UE may indicate a 40 MHz maximum UE-specific channel bandwidth to a base station having a 100 MHz channel bandwidth. The base station may determine that the UE should be rejected (e.g., if the lower bandwidth connection will impact a number of higher bandwidth UEs already being served by the base station), and may signal the rejection to the UE. Such a rejection indication may be provided, in some examples, in a random access response to the UE (e.g., in a message 4 transmission of an established random access procedure used in NR or LTE systems). The UE, upon receiving the indication of the rejection, may select a different base station for a connection.

Such techniques may allow coexistence of multiple UEs that may have different UE-specific channel bandwidths, and provide flexibility for base stations to serve UEs in an efficient manner. In some cases, multiple component carriers (CCs) may be established in a carrier aggregation (CA) configuration, and different CCs may have different channel bandwidths that correspond to UE-specific channel bandwidths of one or more served UEs. In some cases, transmissions for higher bandwidth UEs may be rate-matched around lower bandwidth transmissions for lower bandwidth UEs, and the different UEs may have separate resources that are used for transmitting system information. In other cases, rate-matching may be used for different UE-specific channel bandwidths and resources containing system information may be shared. In some cases that use shared resources for different UE-specific channel bandwidths, different subsets of resource blocks (e.g., alternating resource blocks) within the shared bandwidth may be allocated to the different UEs. Such resource allocation may provide a waveform for the higher bandwidth UE that has a lower peak to average power ratio (PAPR) and allows more efficient power amplifier operation.

Aspects of the disclosure are initially described in the context of a wireless communications system. Various examples of UE-specific channel bandwidth configurations and process flows for UE configurations are then described, along with a number of examples of coexistence configurations. Aspects of the disclosure are further illustrated by and described with reference to apparatus diagrams, system diagrams, and flowcharts that relate to bandwidth configuration techniques in wireless communications.

FIG. 1 illustrates an example of a wireless communications system 100 that supports bandwidth configuration techniques in wireless communications in accordance with aspects of the present disclosure. The wireless communications system 100 includes base stations 105, UEs 115, and a core network 130. In some examples, the wireless communications system 100 may be a Long Term Evolution (LTE)

network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Different UEs 115 may have different UE-specific channel bandwidths, and base stations 105 may configure UE-specific channel bandwidths using UE-specific signaling, in accordance with various techniques provided herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, as indicated above, different UEs 115 may have different UE-specific channel bandwidths and may be configured and served by a serving cell at a base station 105. In some cases, a UE 115 may be configured with a channel bandwidth that is less than or equal to a channel bandwidth of the base station 105, and may also be different than a channel bandwidth of one or more other UEs 115 that are served by the base station 105. In some examples, a base station 105 may configure a UE-specific channel bandwidth for a UE 115, and may signal the UE-specific channel bandwidth in UE-specific signaling, such as UE-specific RRC signaling. The UE-specific RRC signaling may include a plurality of indications of UE-specific channel bandwidths corresponding to respective ones of a plurality of SCSs, and the plurality of indications of UE-specific channel bandwidths includes the indication of the UE-specific channel bandwidth. In some cases, a UE 115 may signal a maximum UE-specific channel bandwidth that may be used for configuring the UE-specific channel bandwidth. A base station 105, in some cases, may reject a connection request for a UE 115 that indicates a lower UE-specific channel bandwidth than a threshold bandwidth (e.g., the cell-specific channel bandwidth). Such techniques may allow coexistence of multiple UEs that may have different UE-specific channel bandwidths, and provide flexibility for base stations to serve UEs in an efficient manner.

Figure 2:
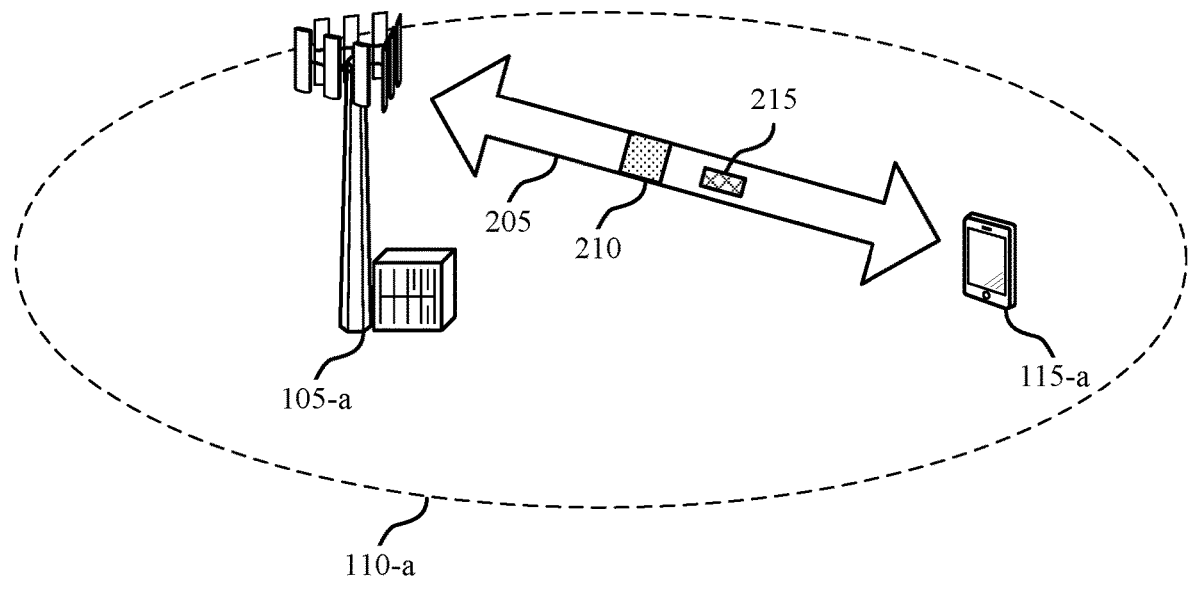
FIG. 2 illustrates an example of a portion of a wireless communications system that supports bandwidth configuration techniques in wireless communications in accordance with aspects of the present disclosure.

FIG. 2 illustrates an example of a wireless communications system 200 that supports bandwidth configuration techniques in wireless communications in accordance with aspects of the present disclosure. In some examples, wireless communications system 200 may implement aspects of wireless communications system 100 or 200. The wireless communications system 200 may include base station 105-a and UE 115-a, which may be examples of a base station 105 and a UE 115, as described with reference to FIG. 1.

Base station 105-a may provide network coverage for geographic area 110-a. Base station 105-a and UE 115-a may communicate using communication link 205. In this example, the communication link 205 may have a cell-specific channel bandwidth 210, and the base station 105-a may support communications with one or more UEs 115 that may occupy up to the cell-specific channel bandwidth 210. Further, in this example, the UE 115-a may have a UE-specific channel bandwidth 215 which is smaller than the cell-specific channel bandwidth 210. For example, the UE-specific channel bandwidth 215 may be 20 MHz, and the cell-specific channel bandwidth 210 may be 100 MHz. In other cases, different channel bandwidths may be used, and the examples provided herein are for purposes of illustration and discussion only. In some cases, one or more other UEs 115 may establish connections with the base station 105-a that may use all or some of the cell-specific channel bandwidth 210. The base station 105-a may configure the UE 115-a with the UE-specific channel bandwidth 215 via, for example, UE-specific RRC signaling. In some cases, the UE 115-a may not be informed of the cell-specific channel bandwidth 210.

In some cases, the UE-specific channel bandwidth 215 may be centered at a center frequency of the cell-specific channel bandwidth 210. Alternatively, the placement of the UE-specific channel bandwidth 215 may be flexible so long as it is completely within the cell-specific channel bandwidth 210. In some cases, the base station 105-a may transmit to and/or receive from one or more UEs 115 via one or more bandwidth parts (BWPs). Each BWP may include a number of resource blocks that is less than or equal to the number of resource blocks of the radio frequency (RF) carrier, and may be located in any part of the carrier resource blocks. In some cases, for initial system acquisition at the UE 115-a, the UE 115-a may operate in a bandwidth that contains resources for initial access information, such as resources that contain a synchronization signal block (SSB), remaining minimum system information (RMSI), other system information (OSI), or any combinations thereof. In such cases, the UE 115-a may monitor system information resources according to a preconfigured system information bandwidth (e.g., 20 resource blocks (RBs) within a 20 MHz bandwidth), and may then be further configured with a dedicated channel bandwidth (e.g., UE-specific channel bandwidth) based on its capabilities.

In some cases, a UE 115-a, as part of a connection establishment procedure with the base station 105-a, may signal a maximum UE-specific channel bandwidth to the base station 105-a. In other cases, the base station 105-a may receive the maximum UE-specific channel bandwidth from another entity, such as from another base station 105 as part of a handover procedure in which the UE 115-a changes serving base stations 105. In some cases, the UE 115-a may signal the maximum UE-specific channel bandwidth in a random access message (e.g., in a message 3 transmission of an established random access procedure used in NR or LTE systems). The base station 105-a may then configure the UE-specific channel bandwidth based on the signaled maximum UE-specific channel bandwidth. In some cases, the base station 105-a may reject a connection request from the UE 115-a that indicates a lower maximum UE-specific channel bandwidth than the cell-specific channel bandwidth 210 (e.g., the UE 115-a may indicate a 40 MHz maximum UE-specific channel bandwidth and the cell-specific channel bandwidth 210 may have a 100 MHz channel bandwidth). The base station 105-a may determine that the UE 115-a should be rejected (e.g., if the lower bandwidth connection will impact a number of higher bandwidth UEs already being served by the base station), and may signal the rejection to the UE 115-a. Such a rejection indication may be provided, in some examples, in a random access response to the UE 115-a (e.g., in a message 4 transmission of an established random access procedure used in NR or LTE systems). The UE 115-a, upon receiving the indication of the rejection, may select a different base station 105 for a connection. Such techniques may allow coexistence of multiple UEs that may have different UE-specific channel bandwidths, and provide flexibility for base stations to serve UEs in an efficient manner, as discussed herein.

Figure 3:
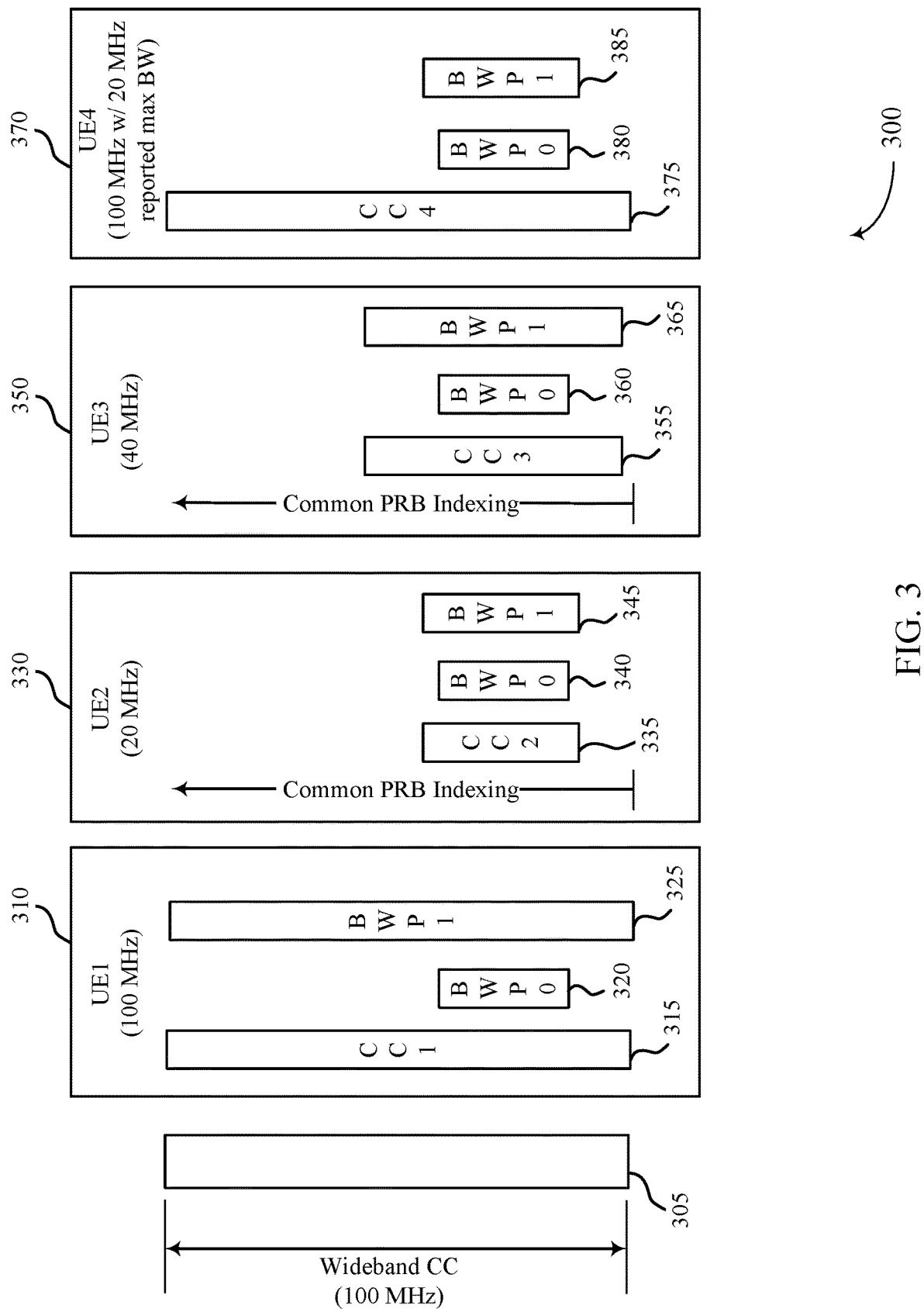
FIG. 3 illustrates an example of UE-specific channel bandwidths that support bandwidth configuration techniques in wireless communications in accordance with aspects of the present disclosure.

FIG. 3 illustrates an example of UE-specific channel bandwidths 300 that support bandwidth configuration techniques in wireless communications in accordance with aspects of the present disclosure. In some examples, UE-specific channel bandwidths 300 may implement aspects of wireless communications system 100 or 200. In this example, a base station may have a cell-specific channel bandwidth for wideband component carrier (CC) 305 that spans 100 MHz. The base station may serve four UEs, namely UE1 310, UE2 330, UE3 350, and UE4 370. It should be noted that the example channel bandwidths and the number of UEs in this example are provided for illustration and discussion purposes only, and that different channel bandwidths or combinations thereof, and different numbers of UEs, may be present in such systems.

In this example, UE1 310 is capable of supporting a 100 MHz channel bandwidth and may be configured with CC1 315, having a UE-specific channel bandwidth of 100 MHz. In this example, UE1 310 may be configured with BWP0 320, which is an initial downlink BWP that may span resources that transmit certain system information (e.g., a RMSI CORESET). The location and bandwidth of BWP0 320 may be provide, for example, in a master information block (MIB) transmitted in a physical broadcast channel (PBCH) in an SSB transmission. In this example, UE1 310 may also be configured with BWP1 325, which may be a 100 MHz BWP that spans the entire UE-specific channel bandwidth for UE1 310.

Also present in the example of FIG. 3 is UE2 330, which is capable of supporting a 20 MHz channel bandwidth and may be configured with CC2 335, having channel bandwidth of 20 MHz. For example, UE2 330 may be a UE that has reduced capabilities relative to UE1 310. For example, UE1 310 may be a smartphone supporting video streaming services, and UE2 330 may be integrated with a sensor and only need to support transmissions of relatively small amounts of data. In this example, UE2 330 may be configured with BWP0 340, which is an initial downlink BWP that may span resources that transmit certain system information, similarly as discussed above with respect to UE1 310. In this example, UE2 330 may also be configured with BWP1 345, which may be a 20 MHz BWP that spans the entire channel bandwidth for CC2 335. In some cases, physical resource block (PRB) indexing may be common across all CCs.

In this example, UE3 350 may also be a reduced capability UE, which is capable of supporting a 40 MHz channel bandwidth and may be configured with CC3 355, having a channel bandwidth of 40 MHz. In this example, UE3 350 may be configured with BWP0 360 as an initial downlink BWP that spans resources that transmit certain system information, similarly as discussed above with respect to UE1 310. In this example, UE3 350 may also be configured with BWP1 365, which may be a 40 MHz BWP that spans the entire channel bandwidth for CC3 355.

The example of FIG. 3 also includes UE4 370, which may have a capability for a 100 MHz UE-specific channel bandwidth, but that reports a 20 MHz maximum UE-specific channel bandwidth. For example, UE4 370 may be a smartphone that is capable of supporting video streaming services that may transfer relatively large amounts of data that are more efficiently transmitted using relatively high UE-specific channel bandwidths (e.g., via a 100 MHz or 200 MHz UE-specific channel bandwidth). However, UE4 370 may determine that such a relatively high UE-specific channel bandwidth is not needed, and may instead indicate a 20 MHz maximum UE-specific channel bandwidth. For example, UE4 370 may determine that relatively small amounts of data are likely to be transmitted, and a lower channel bandwidth will consume less power. In some cases, UE4 370 may make a determination of the reported maximum UE-specific channel bandwidth based on one or more of the full bandwidth capability of the UE, the cell-specific channel bandwidth, a current data usage of the UE, a power consumption mode of the UE, a thermal status of the UE, or any combinations thereof.

In some cases, the base station may recognize UE4 370 as being capable of supporting a 100 MHz UE-specific channel bandwidth (e.g., based on a UE category or one or more other capability indications of UE4 370), and may receive in indication from UE4 370 (e.g., via an indication provided in a random access request message) that indicated the 20 MHz maximum UE-specific channel bandwidth. The base station may, based on the UE capability and the signaled maximum UE-specific channel bandwidth, configure CC4 375 for the UE4 370, having a channel bandwidth of 100 MHz, and configure BWP1 385 to have a 20 MHz bandwidth. UE4 370 also may configure BWP0 380 as an initial downlink BWP for monitoring system information similarly as discussed above. Thus, UE4 370 may assume that it only needs to support a 20 MHz UE-specific channel bandwidth (e.g., a 20 MHz BWP).

While UE-specific channel bandwidth of different UEs with different capabilities (also referred to as different tiers of UEs) are discussed for various examples herein, lower tier UEs may also have other attributes that may be different than higher tier UEs. For example, other capabilities may be reduced, which may include a maximum carrier aggregation supported (e.g., single carrier only), support for only RRC-based BWP reconfiguration, lack of support for downlink control information (DCI)-based dynamic BWP switching, a limited maximum modulation and coding scheme (MCS), modified UE processing timeline capabilities (e.g., a minimum slot delay from scheduling DCI to scheduled PDSCH, a slot delay from scheduling DCI to scheduled PUSCH, a HARQ-ACK delay in a slot, aperiodic channel state information (A-CSI) processing times, etc.), or combinations thereof. The base station, in some cases, may configure some or all such attributes in conjunction with configuration of the UE-specific UE-specific channel bandwidth.

Figure 4:
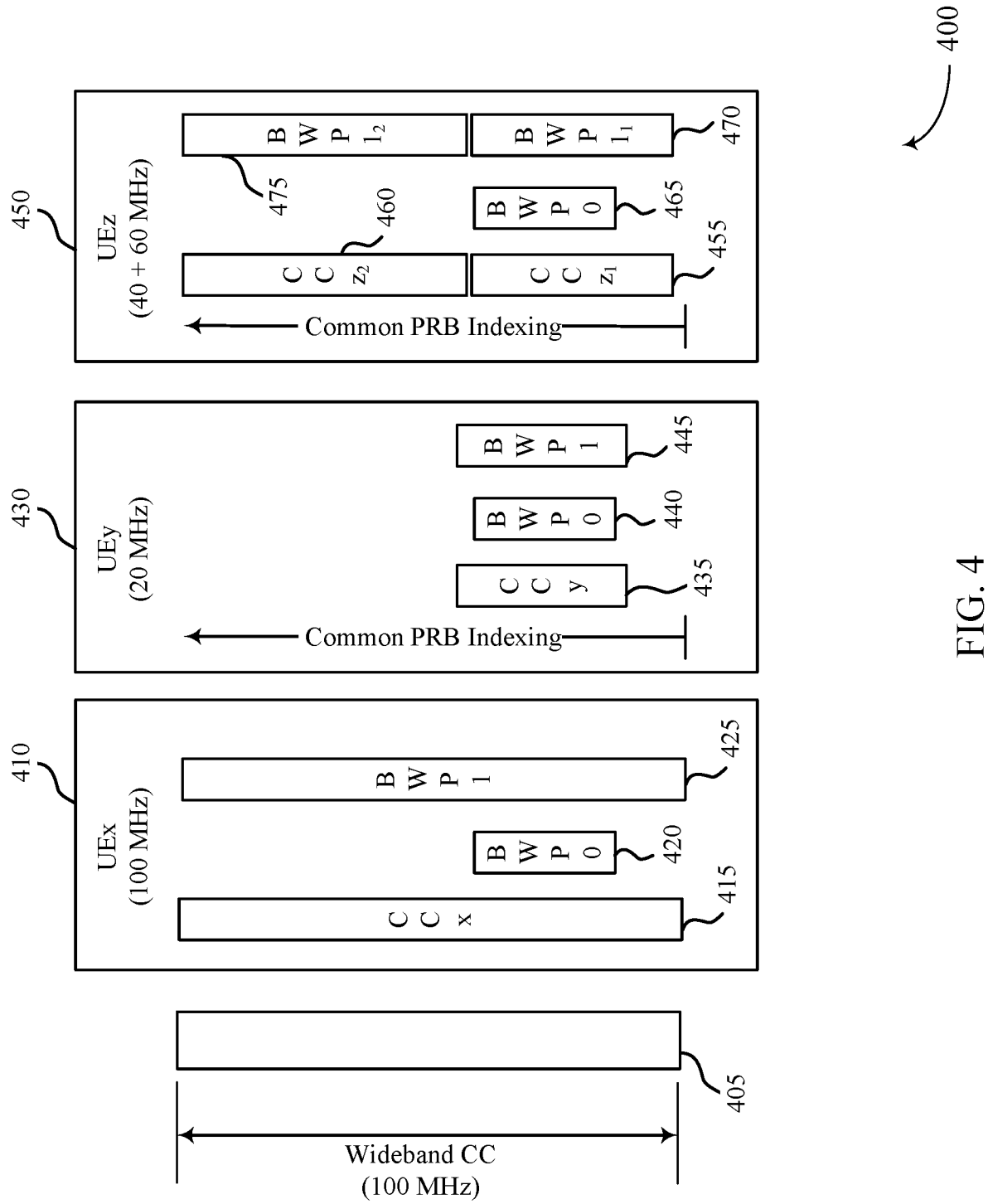
FIG. 4 illustrates another example of UE-specific channel bandwidths that support bandwidth configuration techniques in wireless communications in accordance with aspects of the present disclosure.

FIG. 4 illustrates an example of UE-specific channel bandwidths 400 that support bandwidth configuration techniques in wireless communications in accordance with aspects of the present disclosure. In some examples, UE-specific channel bandwidths 400 may implement aspects of wireless communications system 100 or 200. In this example, a base station may have a cell-specific channel bandwidth for wideband CC 405 that spans 100 MHz. The base station may serve multiple types of UEs, including UEx 410, UEy 430, and UEz 450 types of UEs, for this example. Again, it should be noted that the example channel bandwidths and the number of UEs in this example are provided for illustration and discussion purposes only, and that different channel bandwidths or combinations thereof, and different numbers of UEs, may be present in such systems.

In this example, a first type of UE, UEx 410, may be capable of supporting a 100 MHz channel bandwidth and may be configured with CCx 415, having a UE-specific channel bandwidth of 100 MHz. In this example, UEs in category UEx 410 may be configured with BWP0 420, which is an initial downlink BWP for system information (e.g., a RMSI CORESET), and may also be configured with BWP1 425, which may be a 100 MHz BWP that spans the entire UEx 410 channel bandwidth. A second type of UE, UEy 430, may be capable of supporting a 20 MHz channel bandwidth and may be configured with CCy 435, having a UE-specific channel bandwidth of 20 MHz. In this example, UEs in category UEy 430 may be configured with BWP0 440, which is an initial downlink BWP for system information (e.g., a RMSI CORESET), and may also be configured with BWP1 445, which may be a 20 MHz BWP that spans the entire UEy 430 channel bandwidth.

Further, in this example, a third type of UE, UEz 450, may be capable of supporting a 100 MHz channel bandwidth and may be configured using carrier aggregation of $CCz_1$ 455 and $CCz_2$ 460 that span a combined channel bandwidth of 100 MHz. In this example, UEs in category UEz 450 may be configured with BWP0 465, which is an initial downlink BWP for system information (e.g., a RMSI CORESET), and may also be configured with BWPs for each CC, including $BWP1_1$ 470, which may be a 20 MHz BWP, and $BWP1_2$ 475, which may be a 80 MHz BWP.

In such examples, each UE may have a different channel bandwidth, and UEs with different channel bandwidths may coexist. Further, carrier aggregation CC bandwidths may be different. In some cases, small bandwidth UEs and larger bandwidth UEs may share the RMSI CORESET, and each UE's initial BWP and channel BW may be concentrated (e.g., centered) around the RMSI CORESET. In other cases, different RMSI CORESETs may be used for different types of UEs. Various aspects of the present disclosure, as will be discussed in more detail below, provide techniques for such coexistence of UEs with different UE-specific channel bandwidths.

Figure 5:
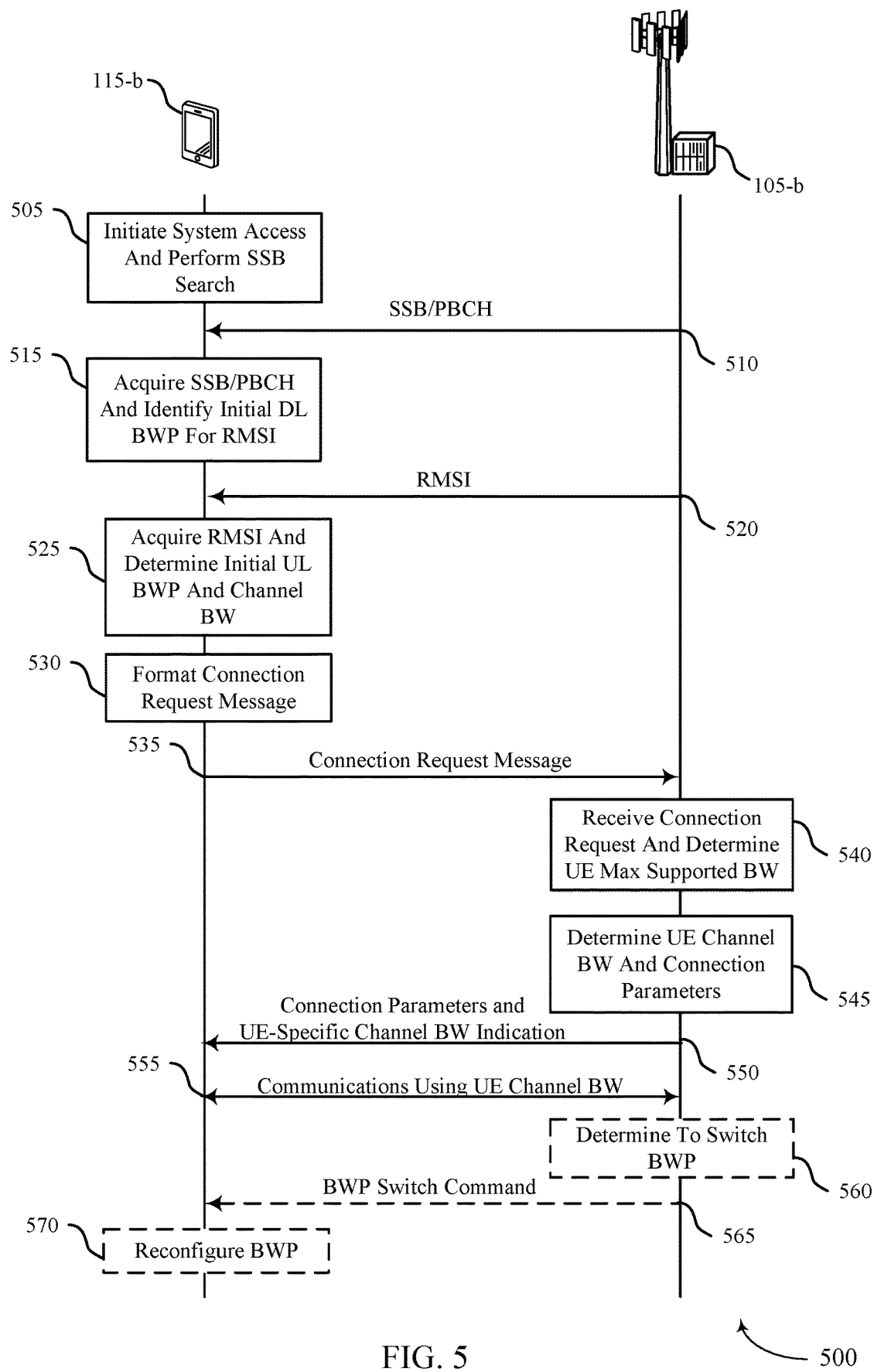
FIG. 5 illustrates an example of a process flow that supports bandwidth configuration techniques in wireless communications in accordance with aspects of the present disclosure.

FIG. 5 illustrates an example of a process flow 500 that supports bandwidth configuration techniques in wireless communications in accordance with aspects of the present disclosure. In some examples, process flow 500 may implement aspects of wireless communications system 100 or 200. Process flow 500 includes a UE 115-b and a base station 105-b, which may be respective examples of a UE 115 and a base station 105 as described with reference to FIGS. 1 and 2.

At 505, the UE 115-b may initiate system access and perform an SSB search. In some cases, the SSB search may be performed by monitoring one or more preconfigured SSB bandwidths. In some cases, SSB transmissions from the base station 105-b may occupy 20 RBs, and the UE 115-b may monitor potential locations within an SSB search space for an SSB. In some cases, the UE 115-b may perform such monitoring when doing initial system access. In other cases, the UE 115-b may perform such monitoring as part of a handover procedure for changing serving base stations 105 at the UE 115-b.

The base station 105-b may periodically broadcast SSB/PBCH transmissions 510 using resources within the SSB search space. In some cases, SSB/PBCH transmissions 510 may be transmitted as part of a beam sweep procedure. At 515, the UE 115-b may acquire the SSB/PBCH and identify an initial downlink BWP (also referred to as RMSI CORESET bandwidth, or BWP0 in various examples herein) to be monitored from RMSI. In some cases, the RMSI CORESET may be an initial RMSI CORESET in an initial common search space, and additional common search spaces may be configured at the UE 115-b via RRC signaling subsequent to establishing a connection. In some cases, the initial downlink BWP may be indicated in a configuration field (e.g., a pdcch-ConfigSIB1 field) in a MIB that is broadcast with the SSB/PBCH transmission.

The base station 105-b may transmit RMSI 520 using the initial downlink BWP. The UE 115-b may, at block 525, acquire the RMSI and determine an initial uplink BWP and a first channel bandwidth. In some cases, the first channel bandwidth may correspond to a cell-specific channel bandwidth. In other cases, the UE 115-b may not be informed of the total cell-specific channel bandwidth, and the first channel bandwidth may be a minimum bandwidth supported by the base station 105-b, or may be a placeholder or dummy bandwidth indication that allows backward compatibility of the RMSI. In some cases, the first channel bandwidth may be provided in a field that indicates a carrier bandwidth per sub-carrier spacing (SCS) (e.g., a scs-SpecificCarrierList field, which may be included in a FrequencyInfoDL-SIB of a DownlinkConfigCommonSIB) that is transmitted in the RMSI.

At 530, the UE 115-b may format a connection request message. In some cases, the connection request message may be a random access message that may be transmitted as part of a random access procedure. The connection request message may be formatted based on the information in the SSB/PBCH and RMSI. In some cases, the connection request message may indicate a maximum UE-specific channel bandwidth of the UE 115-b. The UE 115-b may format the connection request message for transmission in an initial uplink BWP that may be indicated in the RMSI. In some cases, the UE 115-b may include one or more indications of one or more other capabilities of the UE 115-b such as, for example, a maximum carrier aggregation supported (e.g., single carrier only), support for RRC-based BWP or DCI-based dynamic BWP switching, a maximum supported MCS, UE processing timeline capabilities, or combinations thereof. The UE 115-b may transmit the connection request message at 535 to the base station 105-b. In some cases, the UE 115-b may format the connection request message based on a determination of whether a cell provided by the base station 105-b is accessible to the UE 115-b. In some examples, the UE 115-b may consider the cell as accessible if the UE 115-b supports the bandwidths signaled by the base station 105-b in one or more system information fields, such as in a configuration field (e.g., a pdcch-ConfigSIB1 field) in MIB, a position field (e.g., a locationAndBandwidth field) in SIB1, an SCS field (e.g., a scs-SpecificCarrierList field) in SIB1, or any combinations thereof.

At 540, the base station 105-*b* may receive the connection request and determine a maximum UE-specific channel bandwidth for the UE 115-*b*. In some cases, the base station 105-*b* may determine the maximum UE-specific channel bandwidth based on an indication provided by the UE 115-*b* in the connection request message. In other cases, the base station 105-*b* may determine the maximum UE-specific channel bandwidth based on information provided by another base station or a core network (e.g., as part of a handover procedure).

At 545, the base station 105-*b* may determine a UE-specific channel bandwidth and connection parameters for the UE 115-*b*. As discussed above, the UE-specific channel bandwidth may be determined based on the maximum UE-specific channel bandwidth, such that the UE-specific channel bandwidth does not exceed the maximum UE-specific channel bandwidth. In some cases, the base station 105-*b* may configure a single CC with the UE-specific channel bandwidth. In other cases, the base station 105-*a* may configure multiple CCs in a CA configuration with an aggregate bandwidth that spans the UE-specific channel bandwidth. The base station 105-*b* may, at 550, transmit an indication of the connection parameters and UE-specific channel bandwidth. In some cases, the UE-specific channel bandwidth may be indicated to the UE 115-*b* in RRC signaling with an information field that is a UE-specific version of an SCS field (e.g., scs-SpecificCarrierList field) in a configuration field (e.g., ServingCellConfig field) (i.e., scs-SpecificCarrierList-UE). The UE 115-*b* may use this information to complete configuration of the connection with the base station 105-*b*, and communications 555 using the UE-specific channel bandwidth may commence.

Optionally, at 560, the base station 105-*b* may determine to switch the BWP of the UE 115-*b*. Such a determination may be made based on, for example, scheduling parameters at the base station 105-*b*, a number of other UEs that are served by the base station 105-*b*, channel conditions of the different candidate BWPs, or any combinations thereof. The determination to switch BWPs may include a switch to a BWP having a different UE-specific channel bandwidth, but that does not exceed the maximum UE-specific channel bandwidth.

The base station 105-*b* may transmit the BWP switch command at 565, when such a BWP switch is determined to be made. In some cases, the BWP switch command may be a dynamic switch command that is transmitted via DCI. In other cases, the BWP switch command may be RRC signaled to the UE 115-*b*. At 570, the UE 115-*b* may reconfigure the BWP in accordance with the BWP switch command.

Figure 6:
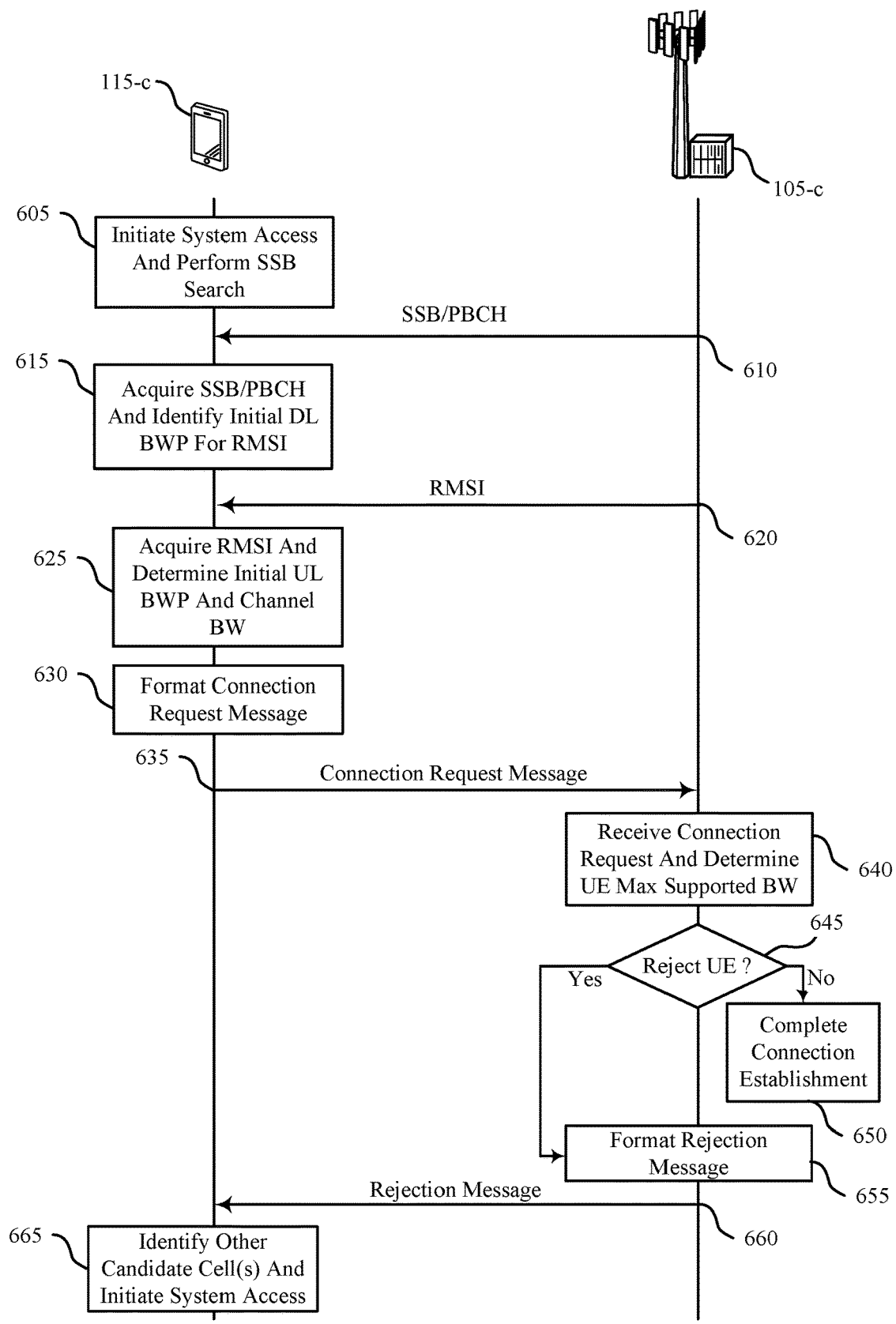
FIG. 6 illustrates an example of another process flow that supports bandwidth configuration techniques in wireless communications in accordance with aspects of the present disclosure.

FIG. 6 illustrates an example of a process flow 600 that supports bandwidth configuration techniques in wireless communications in accordance with aspects of the present disclosure. In some examples, process flow 600 may implement aspects of wireless communications system 100 or 200. Process flow 600 includes a UE 115-*c* and a base station 105-*c*, which may be respective examples of a UE 115 and a base station 105 as described with reference to FIGS. 1 and 2.

At 605, the UE 115-*c* may initiate system access and perform an SSB search. In some cases, the SSB search may be performed by monitoring one or more preconfigured SSB bandwidths. In some cases, SSB transmissions from the base station 105-*c* may occupy 20 RBs, and the UE 115-*c* may monitor potential locations within an SSB search space for an SSB. In some cases, the UE 115-*c* may perform such monitoring when doing initial system access. In other cases, the UE 115-*c* may perform such monitoring as part of a handover procedure for changing serving base stations 105 at the UE 115-*c*.

The base station 105-*c* may periodically broadcast SSB/PBCH transmissions 610 using resources within the SSB search space. In some cases, SSB/PBCH transmissions 610 may be transmitted as part of a beam sweep procedure. At 615, the UE 115-*c* may acquire the SSB/PBCH and identify an initial downlink BWP (also referred to as RMSI CORESET bandwidth, or BWP0 in various examples herein) to be monitored from RMSI. In some cases, the RMSI CORESET may be an initial RMSI CORESET in an initial common search space, and additional common search spaces may be configured at the UE 115-*c* via RRC signaling subsequent to establishing a connection. In some cases, the initial downlink BWP may be indicated in a configuration field (e.g., a pdcch-ConfigSIB1 field) in a MIB that is broadcast with the SSB/PBCH transmission.

The base station 105-*c* may transmit RMSI 620 using the initial downlink BWP. The UE 115-*c* may, at block 625, acquire the RMSI and determine an initial uplink BWP and a first channel bandwidth. In some cases, the first channel bandwidth may correspond to a cell-specific channel bandwidth. In other cases, the UE 115-*c* may not be informed of the total cell-specific channel bandwidth, and the first channel bandwidth may be a minimum bandwidth supported by the base station 105-*c*, or may be a placeholder or dummy bandwidth indication that allows backward compatibility of the RMSI. In some cases, the first channel bandwidth may be provided in an SCS field (e.g., a scs-SpecificCarrierList field) that indicates a carrier bandwidth per SCS, which may be included in an information field (e.g., a FrequencyInfoDL-SIB field) of a configuration field (e.g., a DownlinkConfigCommonSIB field) that is transmitted in the RMSI.

At 630, the UE 115-*c* may format a connection request message. In some cases, the connection request message may be a random access message (e.g., MSG3 in a NR random access procedure, carried in PUSCH) that may be transmitted as part of a random access procedure. The connection request message may be formatted based on the information in the SSB/PBCH and RMSI. In some cases, the connection request message may indicate a maximum UE-specific channel bandwidth of the UE 115-*c*. The UE 115-*c* may format the connection request message for transmission in an initial uplink BWP that may be indicated in the RMSI. In some cases, the UE 115-*c* may include one or more indications of one or more other capabilities of the UE 115-*c* such as, for example, a maximum carrier aggregation supported (e.g., single carrier only), support for RRC-cased BWP or DCI-cased dynamic BWP switching, a maximum supported MCS, UE processing timeline capabilities, or combinations thereof. The UE 115-*c* may transmit the connection request message at 635 to the base station 105-*c*. In some cases, the UE 115-*c* may format the connection request message based on a determination of whether a cell provided by the base station 105-*c* is accessible to the UE 115-*c*. In some examples, the UE 115-*c* may consider the cell as accessible if the UE 115-*c* supports the bandwidths signaled by the base station 105-*c* in one or more system information fields, such as in a configuration field (e.g., a pdcch-ConfigSIB1 field) in MIB, a position field (e.g., locationAndBandwidth field) in SIB1, an SCS field (e.g., a scs-SpecificCarrierList field) in SIB1, or any combinations thereof.

At 640, the base station 105-*c* may receive the connection request and determine a maximum supported UE-specific channel bandwidth of the UE 115-*c*. In some cases, the base station 105-*c* may determine the maximum UE-specific channel bandwidth based on an indication provided by the UE 115-*c* in the connection request message. In other cases, the base station 105-*c* may determine the maximum UE-specific channel bandwidth based on information provided by another base station or a core network (e.g., as part of a handover procedure).

At 645, the base station 105-*c* may determine whether to accept or to reject the UE 115-*c*. In some cases, the base station 105-*c* may accept or reject the UE 115-*c* based on the UE capability and the determined maximum UE-specific channel bandwidth. For example, the base station 105-*c* may be intended to serve higher tier UEs with relatively high UE-specific channel bandwidths, and if the UE 115-*c* is a low tier UE with a relatively low maximum UE-specific channel bandwidth, the base station 105-*c* may determine to reject the UE 115-*c*. Similarly, if the UE 115-*c* supports a relatively high maximum UE-specific channel bandwidth, the base station 105-*c* may accept the UE 115-*c*. In other cases, the base station 105-*c* may make such a determination based on one or more current conditions, such as a traffic load or number of other UEs that are being served using a same or different UE-specific channel bandwidth than the indicate maximum UE-specific channel bandwidth of UE 115-*c*.

If the base station 105-*c* determines at 645 not to reject the UE 115-*c*, the base station 105-*c* may act at 650 to complete the connection establishment with the UE 115-*c* (e.g., such as described at 545 through 560 in the example of FIG. 5).

If the base station 105-*c* determines at 645 that the UE 115-*c* is to be rejected, the base station 105-*c*, at 655, may format a rejection message. In some cases, the rejection message may be included with a connection request response message, such as a random access response (e.g., in MSG4 of a NR random access procedure, carried in PDSCH). In some cases, the base station 105-*c* may identify one or more other candidate base stations that may be better suited for a connection with the UE 115-*c*, and may provide an indication of the one or more other candidate base stations with the rejection message.

The base station 105-*c* may transmit the rejection message at 660, and the UE 115-*c*, at 665, may identify one or more other candidate cells or base stations for initiating system access. In some cases, the UE 115-*c* may discontinue a system access procedure upon receipt of the rejection message, which may allow the UE 115-*c* to move to a search for a proper base station more quickly than if the UE 115-*c* were to camp on the base station 105-*c*. Thus, such techniques may provide for reduced UE power and access latency relative to cases where the UE 115-*c* camps on the base station 105-*c* and then has to change base stations.

Figure 7:
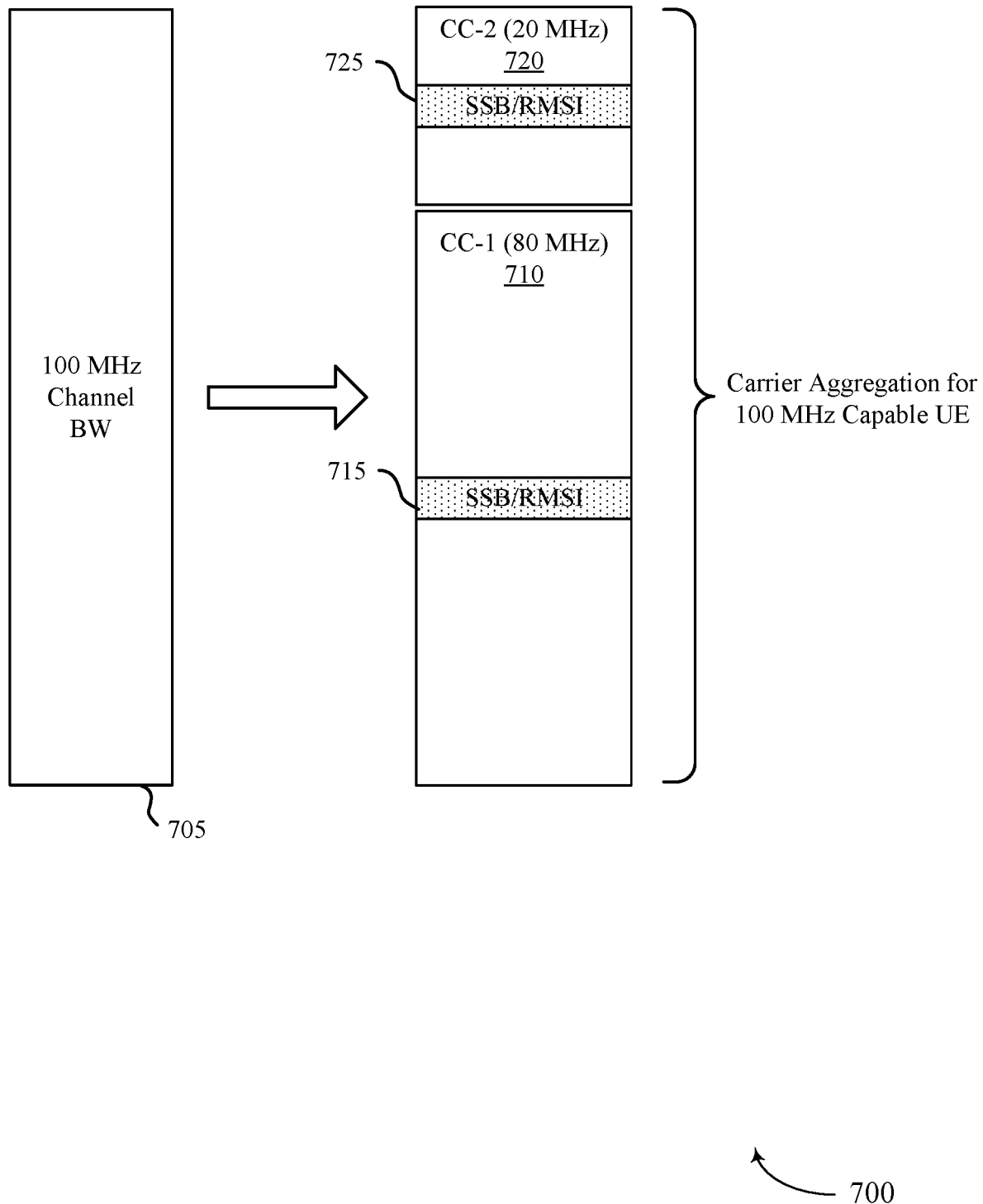
FIGS. 7 through 11 illustrate examples of coexistence configurations that support bandwidth configuration techniques in wireless communications in accordance with aspects of the present disclosure.

FIG. 7 illustrates an example of a coexistence configuration 700 that supports bandwidth configuration techniques in wireless communications in accordance with aspects of the present disclosure. In some examples, coexistence configuration 700 may implement aspects of wireless communications system 100 or 200. As indicated above, various techniques discussed herein allow for UEs having different UE-specific channel bandwidths to concurrently communicate with a same base station. In the example of FIG. 7, a base station may have a 100 MHz cell-specific channel bandwidth 705. Further, in this example, one or more UEs may have a 20 MHz UE-specific channel bandwidth, and one or more UEs having higher UE maximum channel bandwidths (e.g., UEs having a 100 MHz or 200 MHz maximum UE-specific channel bandwidth), may be served by the base station.

In this example, the base station may configure two CCs for the UEs having different UE-specific channel bandwidths. A first CC, CC-1 710, may be configured for UEs having a maximum UE-specific channel bandwidth that exceeds 20 MHz (e.g., UEs having a 100 MHz maximum channel bandwidth). A second CC, CC-2 720, may be configured for UEs having a maximum UE-specific channel bandwidth of 20 MHz, and for UEs having a higher maximum UE-specific channel bandwidth. Thus, UEs having a higher maximum UE-specific channel bandwidth may use carrier aggregation of CC-1 710 and CC-2 720. Further, UEs having a 20 MHz maximum UE-specific channel bandwidth may use CC-1 710 only. In this case, CC-1 710 may have SSB/RMSI resources 715, and CC-2 720 may have separate SSB/RMSI resources 725.

Figure 8:
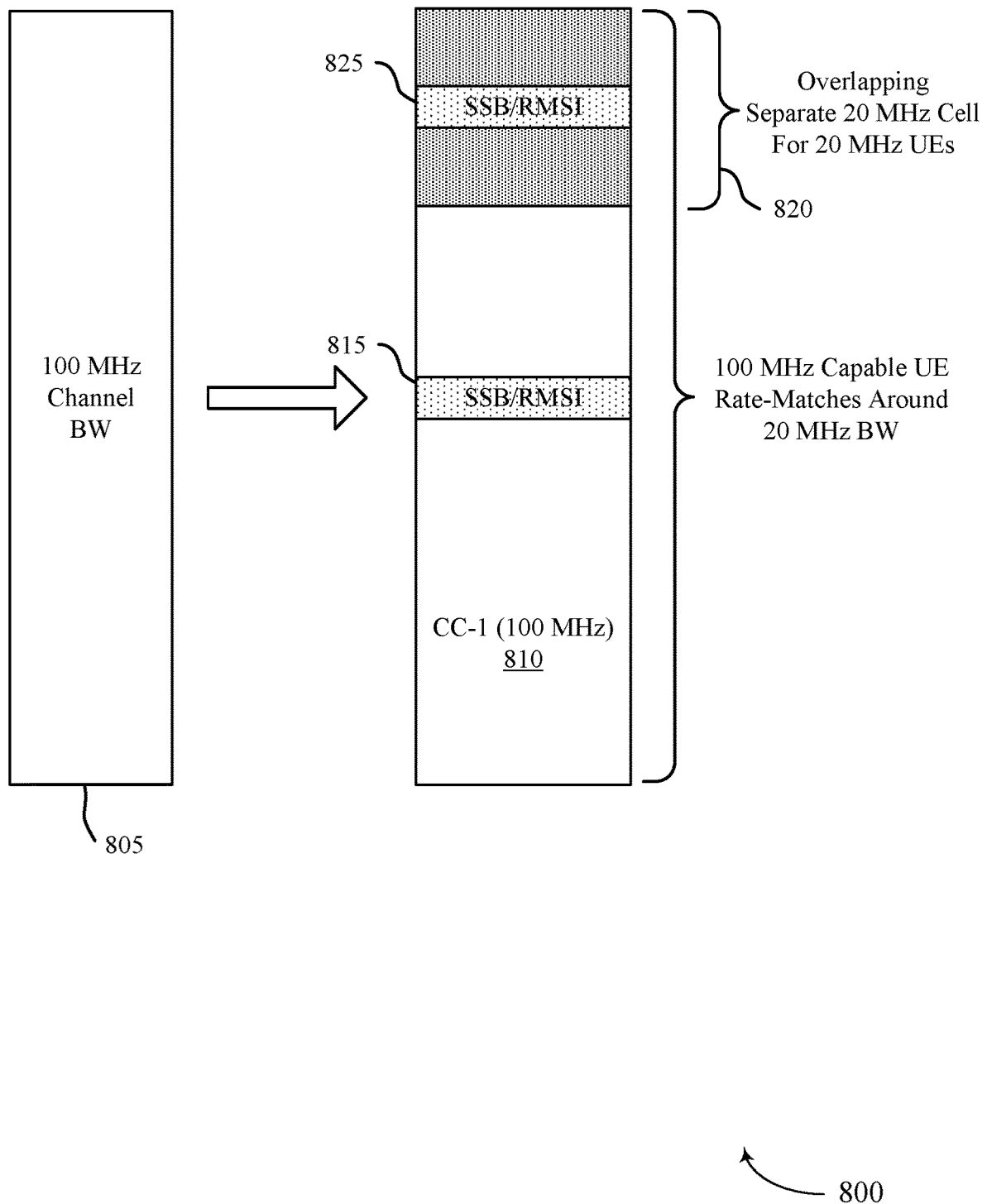

FIG. 8 illustrates an example of a coexistence configuration 800 that supports bandwidth configuration techniques in wireless communications in accordance with aspects of the present disclosure. In some examples, coexistence configuration 800 may implement aspects of wireless communications system 100 or 200. As indicated above, various techniques discussed herein allow for UEs having different UE-specific channel bandwidths to concurrently communicate with a same base station. In the example of FIG. 8, a base station may again have a 100 MHz cell-specific channel bandwidth 805. Further, in this example, one or more UEs may have a 20 MHz UE-specific channel bandwidth, and one or more UEs having higher UE maximum channel bandwidths (e.g., UEs having a 100 MHz or 200 MHz maximum UE-specific channel bandwidth), may be served by the base station.

In this example, the base station may configure one CC, CC-1 810, for the UEs having different UE-specific channel bandwidths, and communications using higher channel bandwidths may be rate-matched around communications using lower channel bandwidths. In this example, a UE having a 100 MHz UE-specific channel bandwidth may be configured for the entire 100 MHz base station bandwidth and a UE having a 20 MHz channel bandwidth may be configured with a BWP 820 corresponding to 20 MHz of CC-1 810, such as by using an overlapping 20 MHz cell. The base station may provide signaling to the higher-bandwidth UEs that indicate that the BWP 820 is to be rate-matched around, such as by rate matching and scheduling around the low-tier downlink broadcast channels and signals, and uplink physical random access channel (PRACH) resources. In this example, separate SSB/RMSI resources may be configured for the different UEs, with first SSB/RMSI resources 815 configured for the higher bandwidth UEs, and second SSB/RMSI resources 825 configured for the lower bandwidth UEs. The different UEs may thus monitor for their respective SSB/RMSI in corresponding search spaces, and configure connections with the base station according to the separate system information.

Figure 9A:
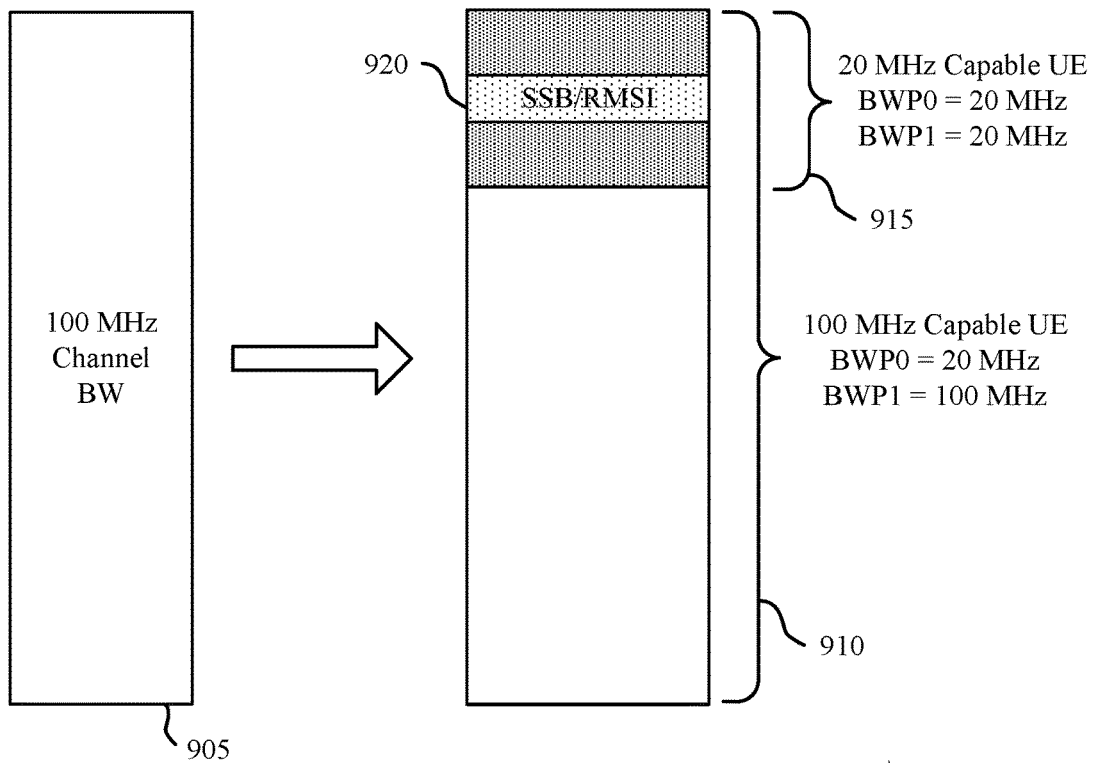
Figure 9B:
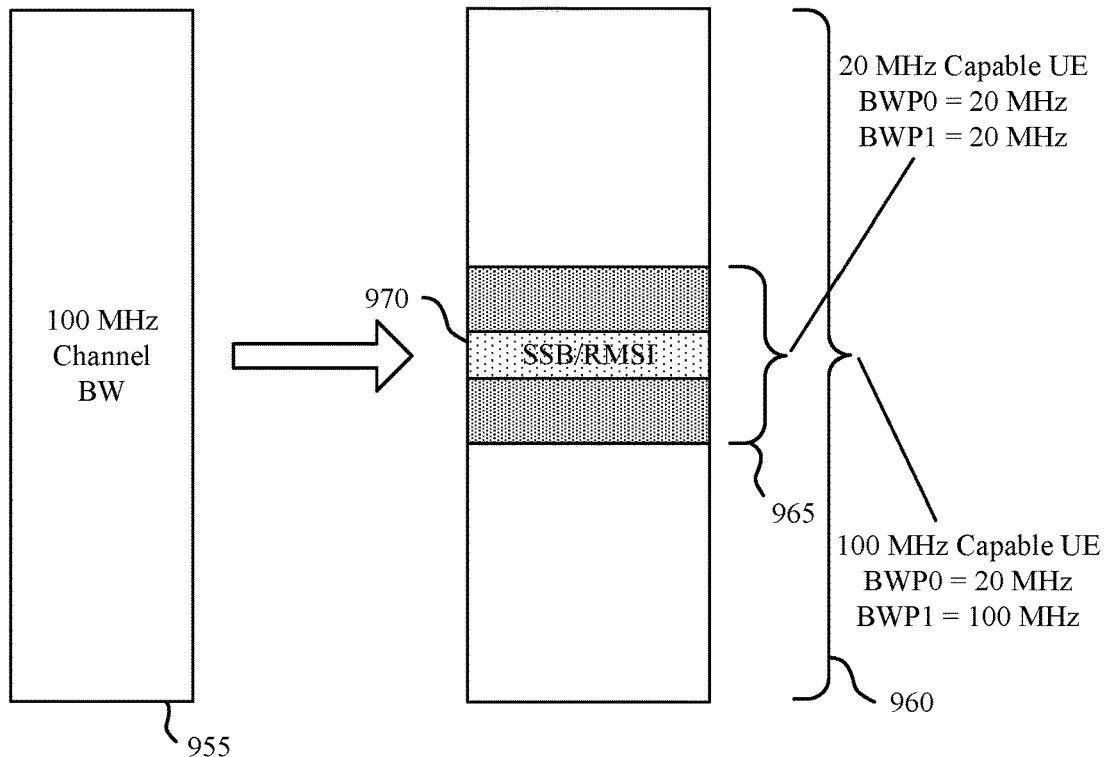

FIGS. 9A and 9B illustrates further examples of coexistence configurations 900, 950 that support bandwidth configuration techniques in wireless communications in accordance with aspects of the present disclosure. In some examples, coexistence configurations 900, 950 may implement aspects of wireless communications system 100 or 200. In the example of FIG. 9A, a base station may again have a 100 MHz cell-specific channel bandwidth 905. Further, in this example, one or more UEs may have a 20 MHz UE-specific channel bandwidth, and one or more UEs having higher UE maximum channel bandwidths (e.g., UEs having a 100 MHz or 200 MHz maximum UE-specific channel bandwidth), may be served by the base station.

In this example, the base station may configure one CC for the UEs having different UE-specific channel bandwidths, and communications using higher channel bandwidths may be rate-matched around communications using lower channel bandwidths, similarly as discussed above with respect to FIG. 8. In this example, a UE having a 100 MHz UE-specific channel bandwidth may be configured for the entire 100 MHz base station bandwidth 910 and a UE having a 20 MHz channel bandwidth may be configured with a BWP 915 corresponding to 20 MHz of the CC, such as by using an overlapping 20 MHz cell. Again, the base station may provide signaling to the higher-bandwidth UEs that indicate that the BWP 915 is to be rate-matched around, similarly as discussed above. In this example, SSB/RMSI resources 920 may be shared for the different UEs, with the SSB/RMSI resources 920 configured for all of the served UEs. The different UEs may thus monitor for their respective SSB/RMSI in corresponding search spaces (e.g., BWP0), and configure connections with the base station according to the separate system information. In the example, of FIG. 9A, the BWP 915 is located at an edge of the entire 100 MHz base station bandwidth 910. In such cases, the higher bandwidth UEs may be configured to allow for a common search space that does not include a center frequency of the 100 MHz cell-specific channel bandwidth.

In the example of FIG. 9B, a base station may again have a 100 MHz cell-specific channel bandwidth 955, and different UE-specific channel bandwidths may be supported. In this example, the base station may again configure one CC for the UEs having different UE-specific channel bandwidths, and communications using higher channel bandwidths may be rate-matched around communications using lower channel bandwidths, similarly as discussed above with respect to FIG. 8. Thus, a UE having a 100 MHz UE-specific channel bandwidth may be configured for the entire 100 MHz base station bandwidth 960 and a UE having a 20 MHz channel bandwidth may be configured with a BWP 965 corresponding to 20 MHz of the CC, such as by using an overlapping 20 MHz cell. In this example, SSB/RMSI resources 970 may be shared for the different UEs, with the SSB/RMSI resources 970 configured for the all of the served UEs. The different UEs may thus monitor for their respective SSB/RMSI in corresponding search spaces (i.e., BWP0), and configure connections with the base station according to the separate system information. In the example, of FIG. 9B, the BWP 965 is centered at a center frequency of the 100 MHz base station bandwidth 960. Such techniques allow for all of the UEs to have SSB/RMSI resources 970 located at a center frequency of the UE-specific channel bandwidth.

However, such a configuration may result in higher bandwidth UEs rate matching around frequencies that are not contiguous within the 100 MHz base station bandwidth 960, which may result in a relatively high peak to average power ratio (PAPR) for such transmissions. Such relatively high PAPR values may result in a power amplifier having reduced gain, which may reduce a potential uplink data rate and result in capacity loss. In some cases, in order to mitigate the PAPR impact of having fragmented resources that span rate-matched lower bandwidth UE transmissions, the base station may configure the different types of UEs with different subsets of RBs within the 20 MHz BWP 965. In some cases, higher bandwidth UEs and lower bandwidth UEs may transmit using alternating RBs. For example, a low bandwidth UE may be allocated odd RBs, and a high bandwidth UE may be allocated even RBs. Such an allocation may result in lower PAPR, and the resulting transmit waveform may use less power amplifier backoff to thereby increase the effective transmit power and mitigate the impact of the uplink data rate.

Figure 10:
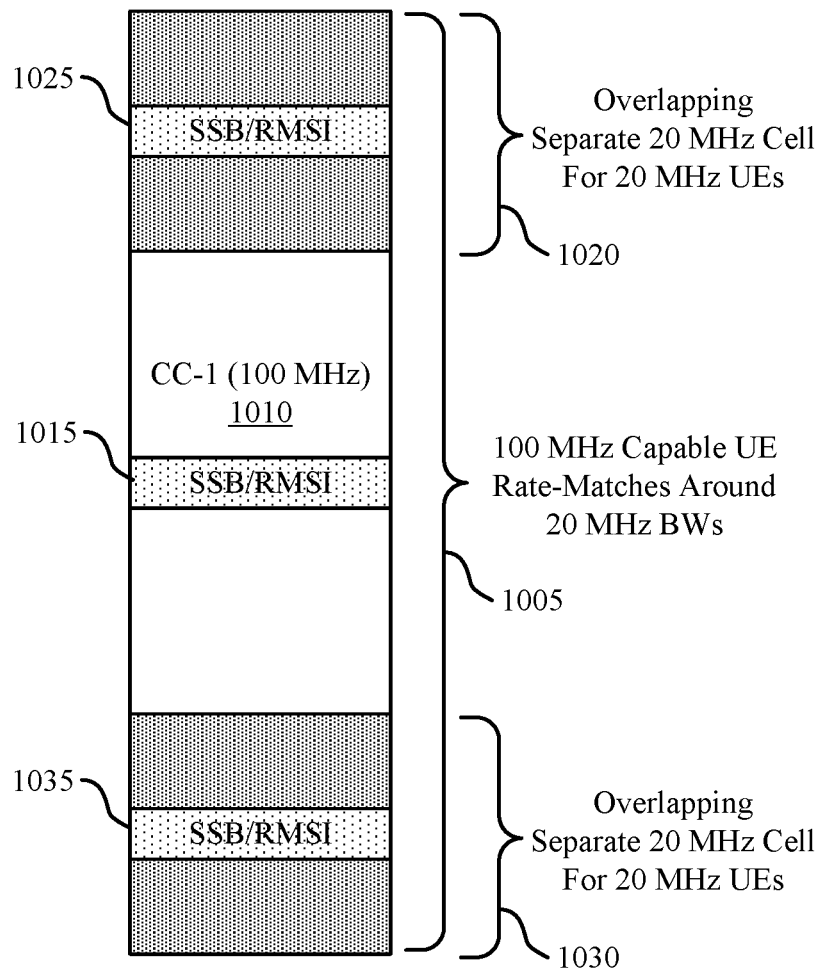

FIG. 10 illustrates an example of a coexistence configuration 1000 that supports bandwidth configuration techniques in wireless communications in accordance with aspects of the present disclosure. In some examples, coexistence configuration 1000 may implement aspects of wireless communications system 100 or 200. As indicated above, various techniques discussed herein allow for UEs having different UE-specific channel bandwidths to concurrently communicate with a same base station. In the example of FIG. 10, a base station may again have a 100 MHz cell-specific channel bandwidth 1005. Further, in this example, one or more UEs may have a 20 MHz UE-specific channel bandwidth, and one or more UEs having higher UE maximum channel bandwidths (e.g., UEs having a 100 MHz or 200 MHz maximum UE-specific channel bandwidth), may be served by the base station.

In this example, rate-matching may be used in a manner as discussed above with respect to FIG. 8, in which different SSB/RMSI resources are used for different BWPs of a CC-1 1010. In this example, a first BWP 1020 and a second BWP 1030, each having a 20 MHz bandwidth, may be provided within 100 MHz cell-specific channel bandwidth 1005. In this example, SSB/RMSI resources are not shared, and the first BWP 1020 has associated SSB/RMSI resources 1025, the second BWP 1030 has associated SSB/RMSI resources 1035, and a 100 MHz BWP for higher UE-specific channel bandwidth UEs has associated SSB/RMSI 1015.

Such a technique may provide for load-balancing of the lower bandwidth UEs across frequency. In such cases, multi-SSB handling may be used by both the high bandwidth UEs and the lower bandwidth UEs, and non-cell-defining SSB (NCD-SSB) can be deployed to distribute lower bandwidth UEs across frequency in finer granularity.

Figure 11:
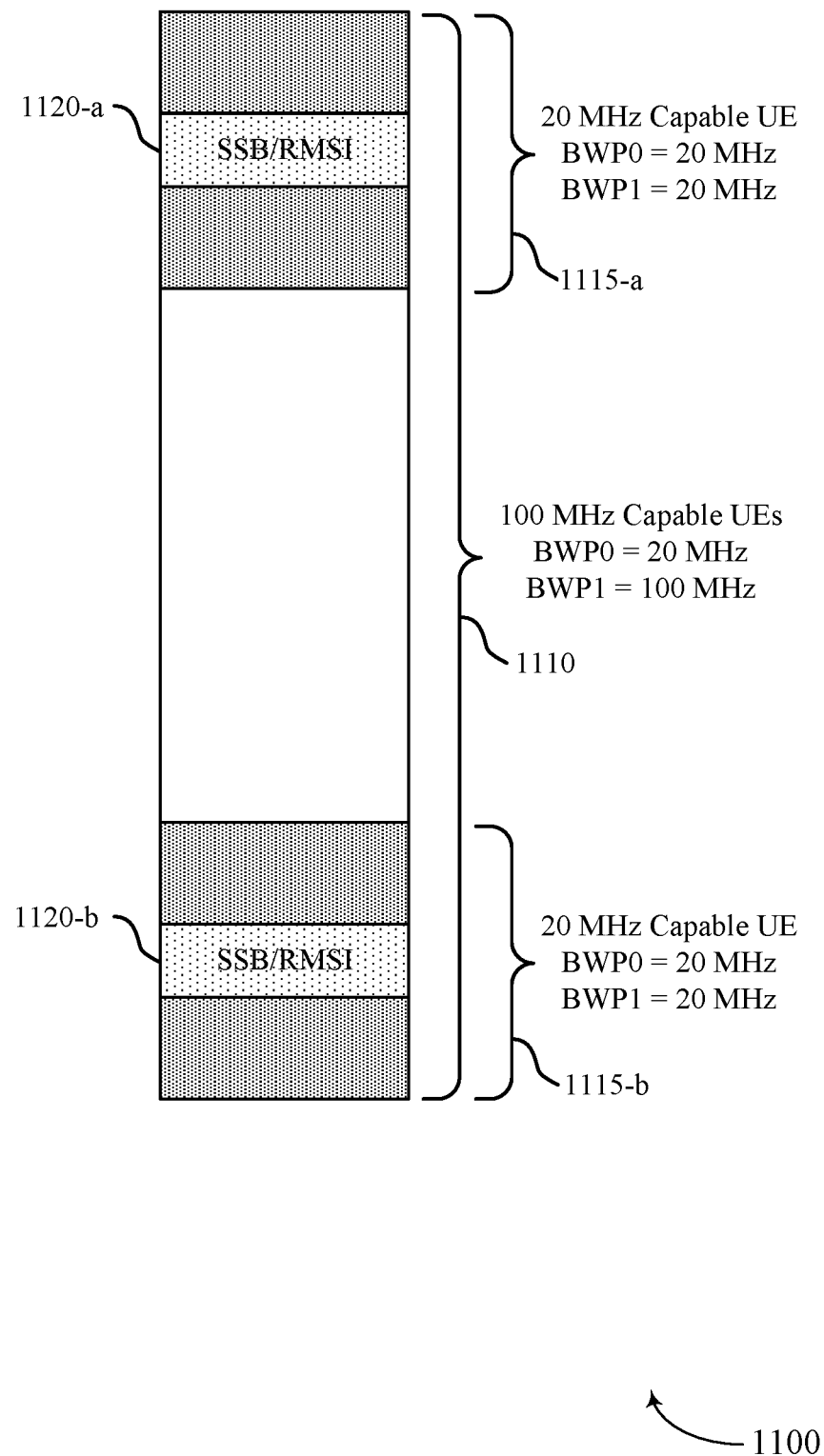

FIG. 11 illustrates an example of a coexistence configuration 1100 that supports bandwidth configuration techniques in wireless communications in accordance with aspects of the present disclosure. In some examples, coexistence configuration 1100 may implement aspects of wireless communications system 100 or 200. As indicated above, various techniques discussed herein allow for UEs having different UE-specific channel bandwidths to concurrently communicate with a same base station. In the example of FIG. 11, a base station may again have a 100 MHz cell-specific channel bandwidth 1110. Further, in this example, one or more UEs may have a 20 MHz UE-specific channel bandwidth, and one or more UEs having higher UE maximum channel bandwidths (e.g., UEs having a 100 MHz or 200 MHz maximum UE-specific channel bandwidth), may be served by the base station.

In this example, rate-matching may be used in a manner as discussed above with respect to FIGS. 9A and 9B, in which shared SSB/RMSI resources may be used for different 20 MHz BWPs 1115 and the 100 MHz cell-specific channel bandwidth 1110. In this example, a first BWP 1115-*a* and a second BWP 1115-*b*, each having a 20 MHz bandwidth, may be provided within 100 MHz cell-specific channel bandwidth 1110. In this example, first BWP 1115-*a* may have first SSB/RMSI resources 1120-*a*, and second BWP 1115-*b* may have second SSB/RMSI resources 1120-*b*. Different UEs may be configured for different BWPs, and thus load-balancing of the lower bandwidth UEs across frequency may be achieved. In such cases, multi-SSB handling again may be used by both the high bandwidth UEs and the lower bandwidth UEs, and non-cell-defining SSB (NCD-SSB) can be deployed to distribute lower bandwidth UEs across frequency in finer granularity. In some cases, higher bandwidth UEs may use any one of the SSB/RMSI, and in some cases a more optimized approach may be to distribute the higher bandwidth UE to search the first BWP 1115-*a*.

Figure 12:
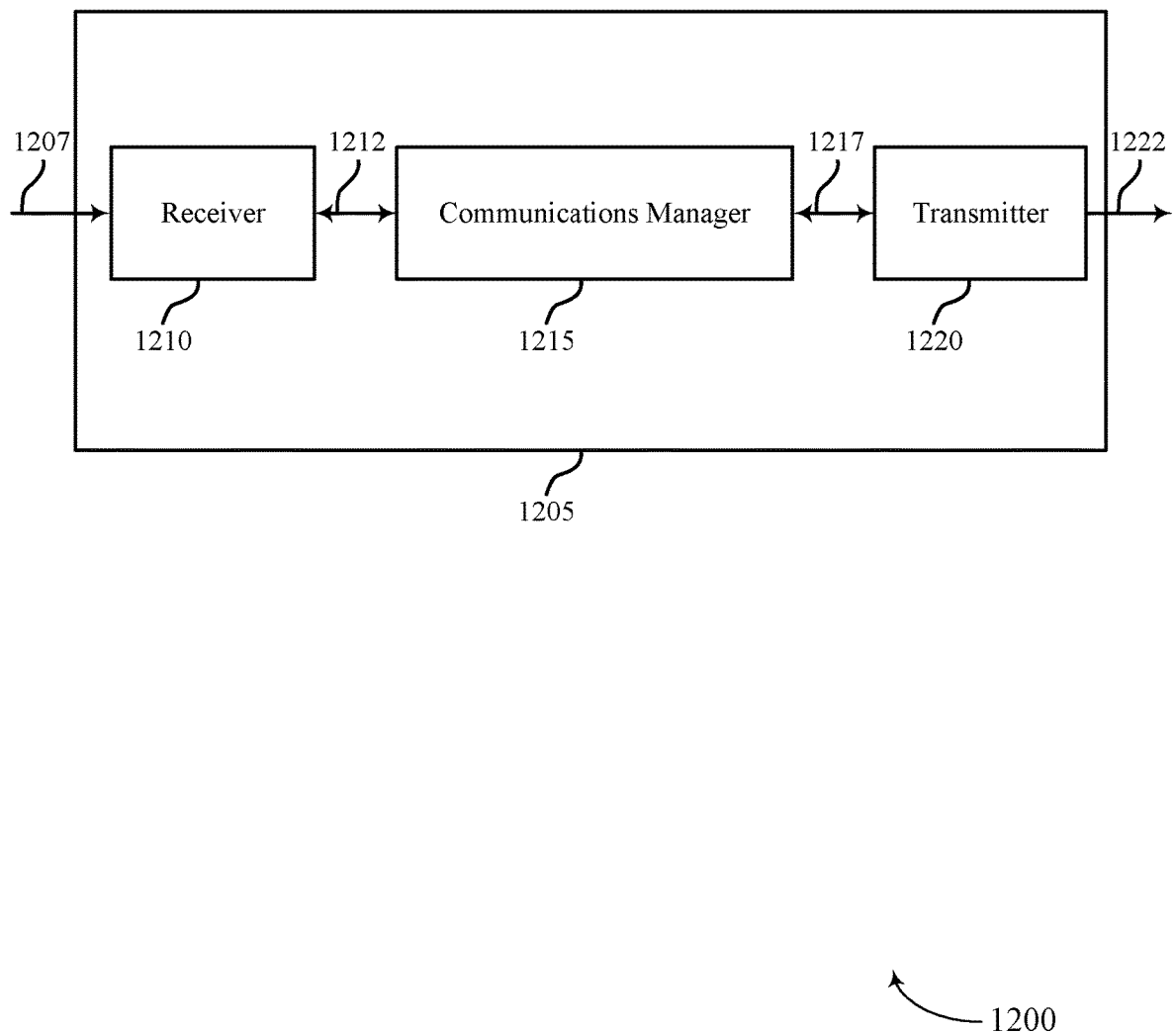
FIGS. 12 and 13 show block diagrams of devices that support bandwidth configuration techniques in wireless communications in accordance with aspects of the present disclosure.

FIG. 12 shows a block diagram 1200 of a device 1205 that supports bandwidth configuration techniques in wireless communications in accordance with aspects of the present disclosure. The device 1205 may be an example of aspects of a UE 115 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive signaling 1207 via one or more antennas and may perform various operations to process the signaling (e.g., down-conversion, analog-to-digital (ADC) conversion, filtering, baseband processing, etc.) This information may be passed on to other components of the device 1205.

The receiver 1210 may receive information such as packets, user data, or control information associated with various information channels (e.g., control channels, data channels, and information related to bandwidth configuration techniques in wireless communications, etc.) via signaling 1207. Information may be passed on to other components of the device 1205. The receiver 1210 may be an example of aspects of the transceiver 1520 described with reference to FIG. 15. The receiver 1210 may utilize a single antenna or a set of antennas. The receiver 1210 may transmit signaling 1212 to communications manager 1215.

The communications manager 1215 may receive information via signaling 1212 from receiver 1210 and may transmit information via signaling 1217 to transmitter 1220. For example, the communications manager 1215 may receive system information from a base station via signaling 1212, the system information including a first bandwidth indication, transmit a connection establishment request to the base station via signaling 1217 based on the system information, receive, responsive to the connection establishment request, a UE-specific channel bandwidth indication from the base station via signaling 1212, where the UE-specific channel bandwidth is based on a maximum supported bandwidth of the UE, and communicate with the base station using the UE-specific channel bandwidth.

In some cases, the communications manager 1215 may also receive first system information from a first base station via signaling 1212, the system information including a first cell-specific channel bandwidth, transmit a first connection establishment request to the first base station via signaling 1217 based on the first system information, the first connection establishment request indicating a maximum supported bandwidth of the UE, and receive, responsive to the first connection establishment request, a rejection indication from the first base station via signaling 1212. The communications manager 1215 may be an example of aspects of the communications manager 1510 described herein. The actions performed by the communications manager 1215 as described herein may be implemented to realize one or more potential advantages. One implementation may allow a UE 115 to save power and increase battery life by avoiding operating at high channel bandwidths when a reduced channel bandwidth may be used. According to aspects of this disclosure, the network may provide improved quality and reliability of service at UEs 115, specifically, for varying bandwidth capable UEs 115 coexisting in the same network, as resources allocated to the UE 115 may be specifically customized for each UE 115 based on each UE's capability.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure.

In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals 1222 generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
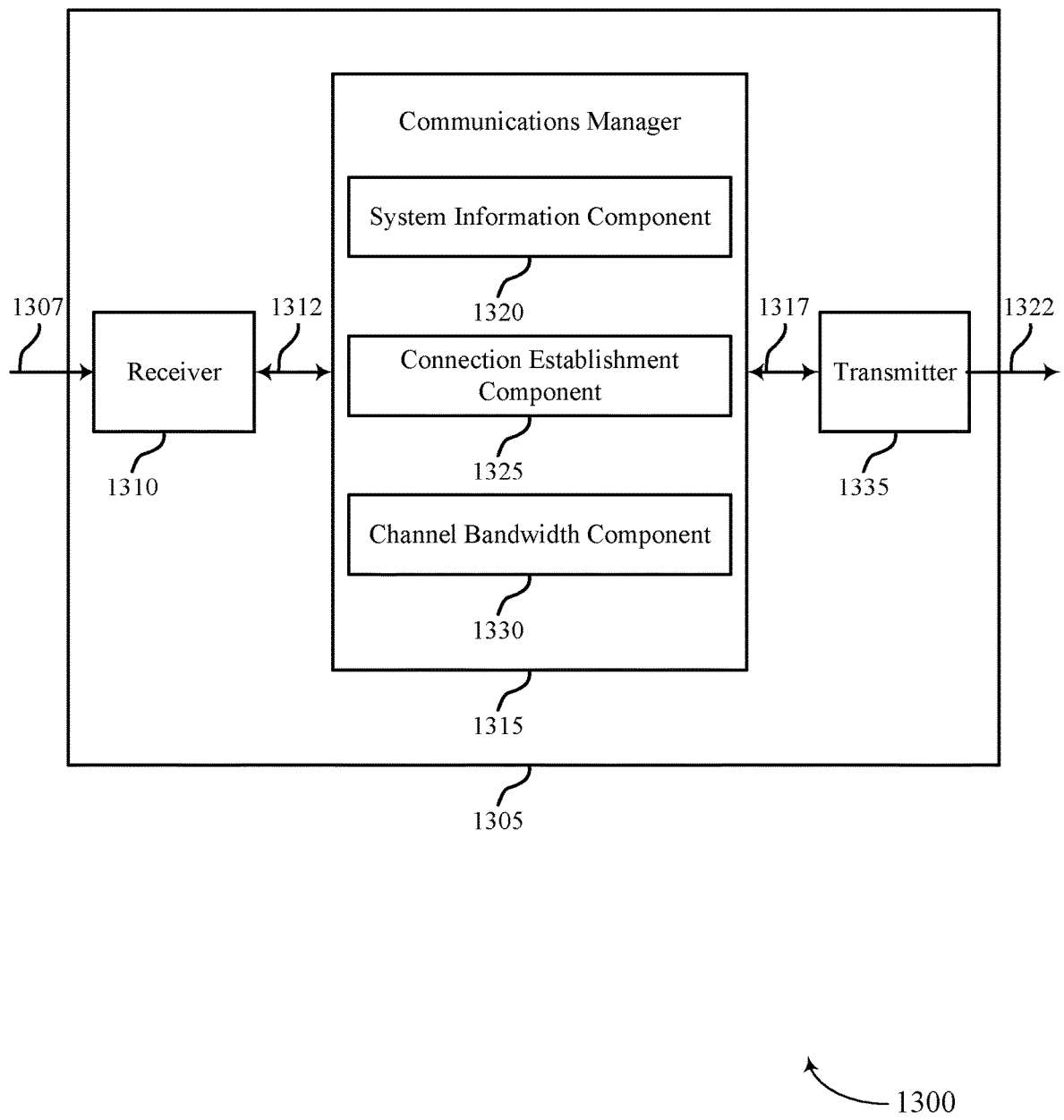

FIG. 13 shows a block diagram 1300 of a device 1305 that supports bandwidth configuration techniques in wireless communications in accordance with aspects of the present disclosure. The device 1305 may be an example of aspects of a device 1205 or a UE 115 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive signaling 1307 via one or more antennas and may perform various operations to process the signaling (e.g., down-conversion, ADC conversion, filtering, baseband processing, etc.) This information may be passed on to other components of the device 1305.

The receiver 1310 may receive information such as packets, user data, or control information associated with various information channels (e.g., control channels, data channels, and information related to bandwidth configuration techniques in wireless communications, etc.) via signaling 1307. Information may be passed on to other components of the device 1305. The receiver 1310 may be an example of aspects of the transceiver 1520 described with reference to FIG. 15. The receiver 1310 may utilize a single antenna or a set of antennas. The receiver 1310 may transmit signaling 1312 to communications manager 1315.

The communications manager 1315 may receive information via signaling 1312 from receiver 1310 and may transmit information via signaling 1317 to transmitter 1335. The communications manager 1315 may be an example of aspects of the communications manager 1215 as described herein. The communications manager 1315 may include a system information component 1320, a connection establishment component 1325, and a channel bandwidth component 1330. The communications manager 1315 may be an example of aspects of the communications manager 1510 described herein.

The system information component 1320 may receive system information from a base station via signaling 1312, the system information including a first bandwidth indication. In some cases, the system information may be received in an SSB. In some cases, a common search space may be searched for SSB transmissions from a base station. In some cases, the system information may also include information provided in RMSI, and a location of the RMSI transmissions may be indicated in the SSB. In some cases, the RMSI may be transmitted in an initial downlink BWP (i.e., BWP0).

The connection establishment component 1325 may transmit a connection establishment request to the base station via signaling 1317 based on the system information. In some cases, the connection establishment request may be a random access request that is transmitted to a base station. In some cases, the connection establishment request may include an indication of a maximum UE-specific channel bandwidth. In some cases, the connection establishment component 1325 may receive, responsive to the connection establishment request, a rejection indication from the first base station.

The channel bandwidth component 1330 may receive, responsive to the connection establishment request, a UE-specific channel bandwidth indication from the base station via signaling 1312, where the UE-specific channel bandwidth is based on a maximum supported bandwidth of the UE and communicate with the base station using the UE-specific channel bandwidth.

The transmitter 1335 may transmit signals 1322 generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
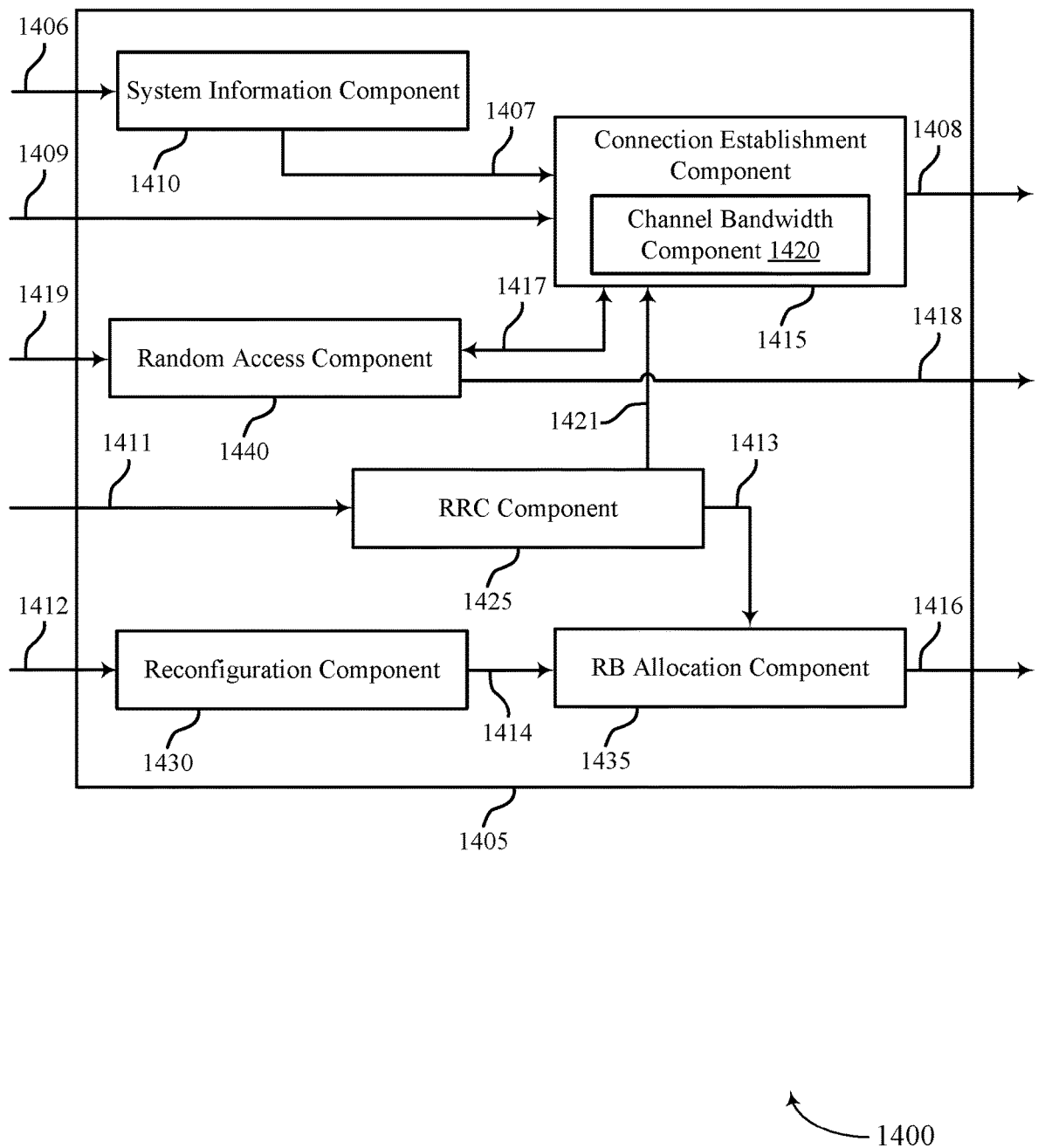
FIG. 14 shows a block diagram of a communications manager that supports bandwidth configuration techniques in wireless communications in accordance with aspects of the present disclosure.

FIG. 14 shows a block diagram 1400 of a communications manager 1405 that supports bandwidth configuration techniques in wireless communications in accordance with aspects of the present disclosure. The communications manager 1405 may be an example of aspects of a communications manager 1215, a communications manager 1315, or a communications manager 1510 described herein. The communications manager 1405 may include a system information component 1410, a connection establishment component 1415, a channel bandwidth component 1420, a RRC component 1425, a reconfiguration component 1430, a RB allocation component 1435, and a random access component 1440. Each of these modules may communicate, directly or indirectly, with one another (e.g., via one or more buses).

The system information component 1410 may receive system information 1406 from a base station. In some cases, the system information 1406 may include a first bandwidth indication. In some cases, the first bandwidth indication is a minimum bandwidth supported by the base station. In some cases, the first bandwidth indication is a placeholder or dummy indication of bandwidth. In some cases, the first bandwidth indication corresponds to the cell-specific channel bandwidth or the maximum channel bandwidth supported by the base station.

The connection establishment component 1415 may transmit a connection establishment request 1408 to the base station based on the system information 1406 received from system information component 1410 via a system information indication 1407. In some examples, the connection establishment component 1415 may transmit a first connection establishment request 1408 to the first base station based on the first system information, the first connection establishment request 1408 indicating a maximum supported bandwidth of the UE, which may be determined by channel bandwidth component 1420 coupled to connection establishment component 1415.

In some examples, the connection establishment component 1415 may receive, responsive to the first connection establishment request 1408, a rejection indication 1419 from the first base station via signaling 1417 from random access component 1440. In some cases, the rejection indication 1419 from the first base station is received prior to the UE camping on the first base station. In some examples, the connection establishment component 1415 may transmit a second connection establishment request 1408 to a second base station based on second system information of the second base station, the second connection establishment request indicating the maximum supported bandwidth of the UE, which may be determined by channel bandwidth component 1420. In some examples, the connection establishment component 1415 may receive, responsive to the second connection establishment request, a connection establishment response 1409 from the second base station to establish a connection with the second base station. The connection establishment component 1415 may indicate the connection establishment response 1409 to random access component 1440 via signaling 1417.

In some cases, the connection establishment request 1408 includes one or more of the maximum supported bandwidth of the UE, a maximum carrier aggregation supported by the UE, a UE capability to dynamically or semi-statically reconfigure the UE-specific channel bandwidth within the cell-specific channel bandwidth, a maximum MCS supported by the UE, a UE processing timeline capability, or any combinations thereof.

The channel bandwidth component 1420 may receive, responsive to the connection establishment request, a UE-specific channel bandwidth indication (e.g., in a connection establishment response 1409 or UE-specific RRC signaling 1411) from the base station via connection establishment component 1415 (e.g., via signaling 1417 or UE-specific signaling 1421), where the UE-specific channel bandwidth is based on a maximum supported bandwidth of the UE. In some cases, the UE-specific RRC signaling 1411 may include a plurality of indications of UE-specific channel bandwidths corresponding to respective ones of a plurality of SCSs, and the plurality of indications of UE-specific channel bandwidths includes the indication of the UE-specific channel bandwidth. In some examples, the UE may communicate with the base station using the UE-specific channel bandwidth. In some examples, the channel bandwidth component 1420 may transmit via connection establishment component 1415 the maximum supported bandwidth of the UE to the base station, for example, within a connection establishment request 1408. In some examples, the channel bandwidth component 1420 may determine a maximum supported BWP bandwidth of the UE to include with a connection establishment request 1408 based on the full bandwidth capability of the UE, the cell-specific channel bandwidth, a current data usage of the UE, a power consumption mode of the UE, a thermal status of the UE, or any combinations thereof. In some cases, the maximum supported bandwidth of the UE is less than the cell-specific channel bandwidth. In some cases, the maximum supported bandwidth of the UE is a maximum supported BWP bandwidth that is less than or equal to a full bandwidth capability of the UE. In some cases, the UE-specific channel bandwidth is a subset of the maximum supported bandwidth of the UE.

The RRC component 1425 may receive UE-specific RRC signaling 1411 that includes the UE-specific channel bandwidth indication. In some cases, the UE-specific RRC signaling 1411 may include a plurality of indications of UE-specific channel bandwidths corresponding to respective ones of a plurality of SCSs, and the plurality of indications of UE-specific channel bandwidths includes the indication of the UE-specific channel bandwidth. RRC component 1425 may indicate the UE-specific channel bandwidth indication to channel bandwidth component 1420 in UE-specific signaling 1421. The reconfiguration component 1430 may receive, subsequent to communicating with the base station using the first UE-specific channel bandwidth, a bandwidth reconfiguration message 1412 from the base station that indicates a second UE-specific channel bandwidth that has a different bandwidth than the first UE-specific channel bandwidth, a different location within the cell-specific channel bandwidth, or any combination thereof. Reconfiguration component 1430 may send the bandwidth reconfiguration message 1412 to RB allocation component 1435 in message 1414.

The RB allocation component 1435 may identify allocated resources for uplink transmissions based on a UE-specific RRC signaling 1411 received from RRC component 1425 via UE-specific indication 1413 or on a bandwidth reconfiguration message 1412 received from reconfiguration component 1430 via message 1414. In some cases, the communicating with the base station using the UE-specific channel bandwidth includes transmitting one or more uplink transmissions 1416 to the base station using a first subset of resource blocks within the UE-specific channel bandwidth. In some cases, the first subset of resource blocks and a second subset of resource blocks occupy alternating resource blocks within the UE-specific channel bandwidth.

The random access component 1440 may manage random access at a UE. In some cases, the first connection establishment request 1408, received from connection establishment component 1415 via signaling 1417, is a random access message 1418 transmitted to the first base station as part of a random access procedure, and where the rejection indication 1419 is received in a random access response from the first base station as part of the random access procedure. In some cases, the maximum supported bandwidth of the UE is transmitted in a PUSCH transmission, and the rejection indication is received in a PDSCH transmission, as part of the random access procedure.

Figure 15:
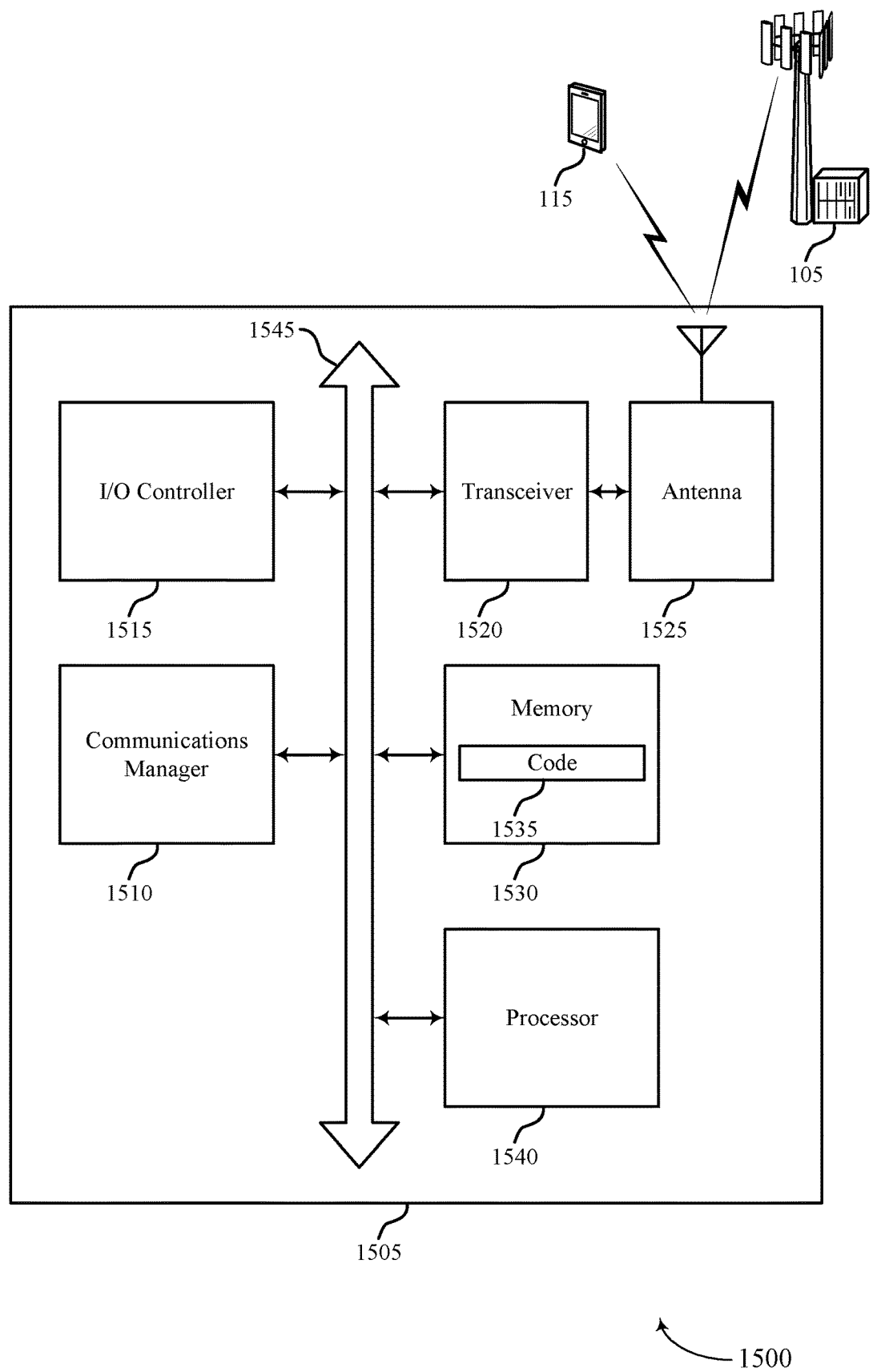
FIG. 15 shows a diagram of a system including a device that supports bandwidth configuration techniques in wireless communications in accordance with aspects of the present disclosure.

FIG. 15 shows a diagram of a system 1500 including a device 1505 that supports bandwidth configuration techniques in wireless communications in accordance with aspects of the present disclosure. The device 1505 may be an example of or include the components of device 1205, device 1305, or a UE 115 as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may receive system information from a base station, the system information including a first bandwidth indication, transmit a connection establishment request to the base station based on the system information, receive, responsive to the connection establishment request, a UE-specific channel bandwidth indication from the base station, where the UE-specific channel bandwidth is based on a maximum supported bandwidth of the UE, and communicate with the base station using the UE-specific channel bandwidth.

The communications manager 1510 may also receive first system information from a first base station, the system information including a first cell-specific channel bandwidth, transmit a first connection establishment request to the first base station based on the first system information, the first connection establishment request indicating a maximum supported bandwidth of the UE, and receive, responsive to the first connection establishment request, a rejection indication from the first base station.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include random-access memory (RAM) and read-only memory (ROM). The memory 1530 may store computer-readable, computer-executable code 1535 including instructions that, when executed, cause the processor to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting bandwidth configuration techniques in wireless communications).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
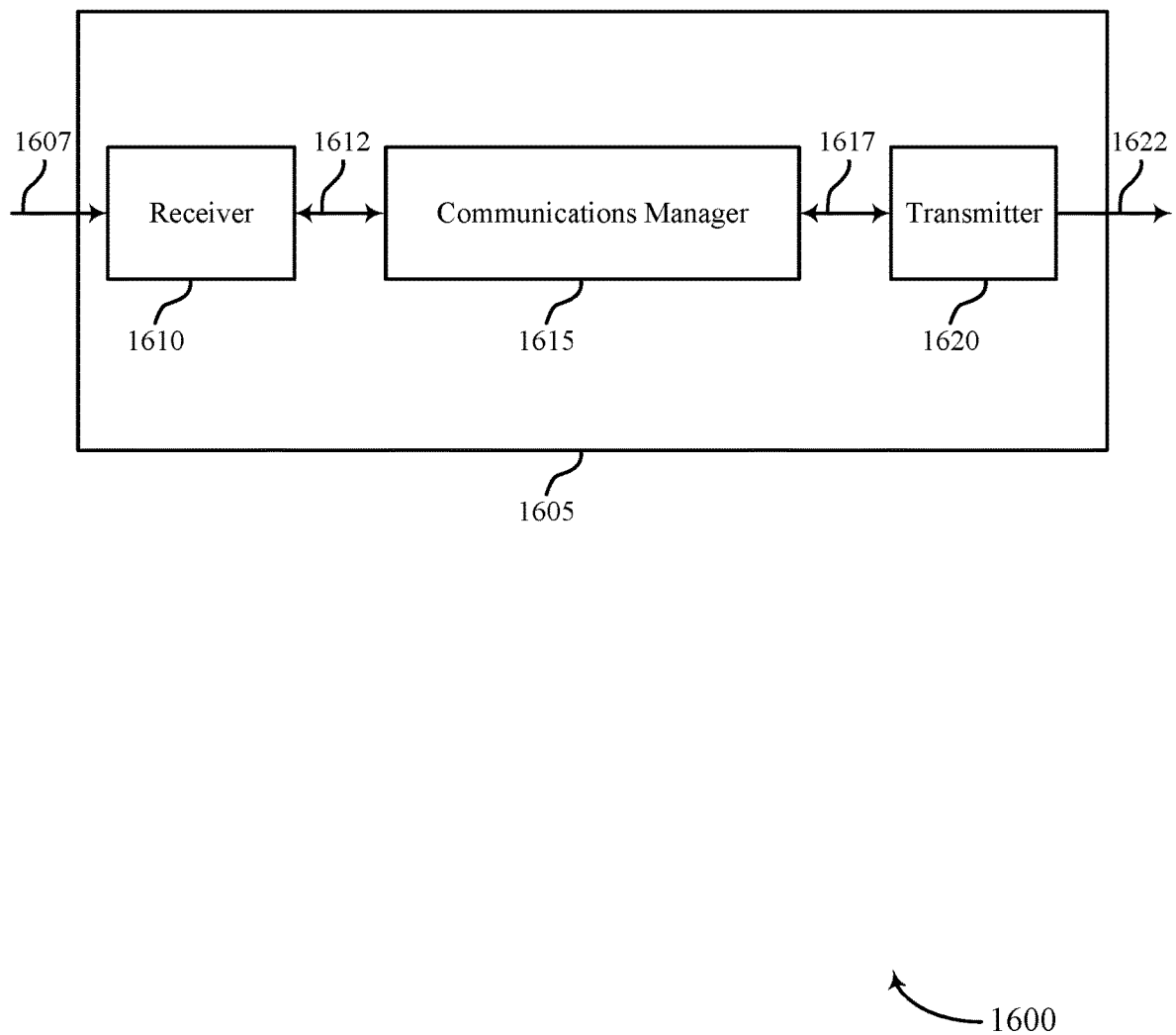
FIGS. 16 and 17 show block diagrams of devices that support bandwidth configuration techniques in wireless communications in accordance with aspects of the present disclosure.

FIG. 16 shows a block diagram 1600 of a device 1605 that supports bandwidth configuration techniques in wireless communications in accordance with aspects of the present disclosure. The device 1605 may be an example of aspects of a base station 105 as described herein. The device 1605 may include a receiver 1610, a communications manager 1615, and a transmitter 1620. The device 1605 may also include a processor. Each of these components may be in communication with one another (e.g., via one or more buses).

The receiver 1610 may receive signaling 1607 via one or more antennas and may perform various operations to process the signaling (e.g., down-conversion, ADC conversion, filtering, baseband processing, etc.) This information may be passed on to other components of the device 1605.

The receiver 1610 may receive information such as packets, user data, or control information associated with various information channels (e.g., control channels, data channels, and information related to bandwidth configuration techniques in wireless communications, etc.) via signaling 1607. Information may be passed on to other components of the device 1605. The receiver 1610 may be an example of aspects of the transceiver 1920 described with reference to FIG. 19. The receiver 1610 may utilize a single antenna or a set of antennas. The receiver 1610 may transmit signaling 1612 to communications manager 1615.

The communications manager 1615 may receive information via signaling 1612 from receiver 1610 and may transmit information via signaling 1617 to transmitter 1620. For example, the communications manager 1615 may transmit system information to at least a first UE of a set of UEs in a broadcast transmission via signaling 1617, the system information including a first bandwidth indication, receive a connection establishment request from the first UE via signaling 1612, transmit a connection establishment response to the first UE via signaling 1617 that includes an indication of the first UE-specific channel bandwidth, and determine, based on the connection establishment request, a first UE-specific channel bandwidth for communications with the first UE, where the first UE-specific channel bandwidth is based on a maximum supported bandwidth of the first UE.

The communications manager 1615 may also transmit system information to at least a first UE of a set of UEs in a broadcast transmission via signaling 1617, the system information including a cell-specific channel bandwidth, receive a connection establishment request from the first UE via signaling 1612, the connection establishment request indicating a maximum supported bandwidth of the UE, determine, based on the maximum supported bandwidth of the UE, to reject the connection establishment request from the first UE, and transmit a rejection indication to the first UE via signaling 1617. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals 1622 generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
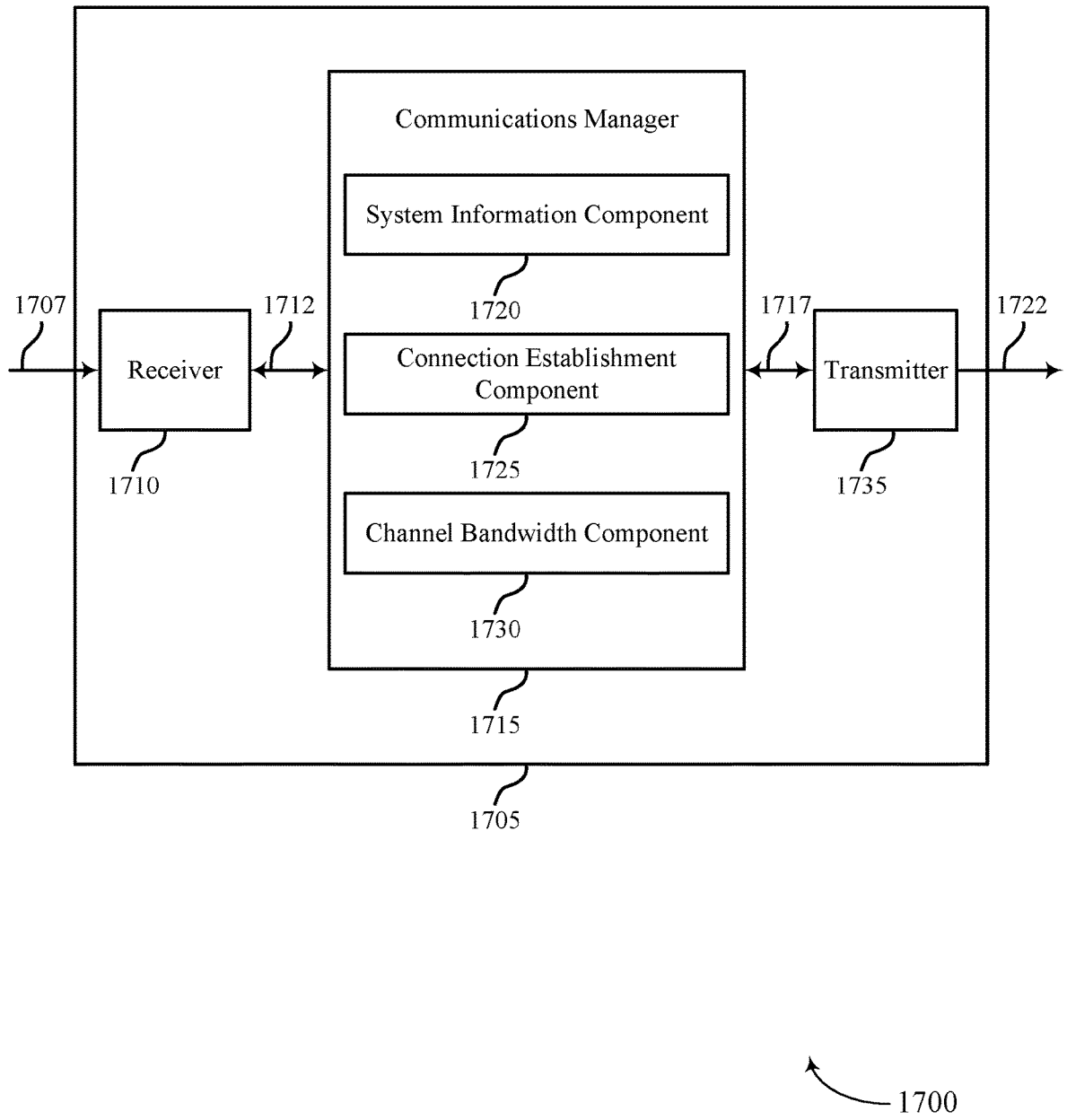

FIG. 17 shows a block diagram 1700 of a device 1705 that supports bandwidth configuration techniques in wireless communications in accordance with aspects of the present disclosure. The device 1705 may be an example of aspects of a device 1605 or a base station 105 as described herein. The device 1705 may include a receiver 1710, a communications manager 1715, and a transmitter 1735. The device 1705 may also include a processor. Each of these components may be in communication with one another (e.g., via one or more buses).

The receiver 1710 may receive signaling 1707 via one or more antennas and may perform various operations to process the signaling (e.g., down-conversion, ADC conversion, filtering, baseband processing, etc.) This information may be passed on to other components of the device 1705.

The receiver 1710 may receive information such as packets, user data, or control information associated with various information channels (e.g., control channels, data channels, and information related to bandwidth configuration techniques in wireless communications, etc.) via signaling 1707. Information may be passed on to other components of the device 1705. The receiver 1710 may be an example of aspects of the transceiver 1920 described with reference to FIG. 19. The receiver 1710 may utilize a single antenna or a set of antennas. The receiver 1710 may transmit signaling 1712 to communications manager 1715.

The communications manager 1715 may receive information via signaling 1712 from receiver 1710 and may transmit information via signaling 1717 to transmitter 1735. The communications manager 1715 may be an example of aspects of the communications manager 1615 as described herein. The communications manager 1715 may include a system information component 1720, a connection establishment component 1725, and a channel bandwidth component 1730. The communications manager 1715 may be an example of aspects of the communications manager 1910 described herein.

The system information component 1720 may transmit system information to at least a first UE of a set of UEs in a broadcast transmission via signaling 1717, the system information including a first bandwidth indication.

The connection establishment component 1725 may receive a connection establishment request from the first UE via signaling 1712 and transmit a connection establishment response to the first UE via signaling 1717 that includes an indication of the first UE-specific channel bandwidth. In some cases, the connection establishment request indicates a maximum supported bandwidth of the UE, and the connection establishment component 1725 may determine, based on the maximum supported bandwidth of the UE, to reject the connection establishment request from the first UE, and transmit a rejection indication to the first UE.

The channel bandwidth component 1730 may determine, based on the connection establishment request, a first UE-specific channel bandwidth for communications with the first UE, where the first UE-specific channel bandwidth is based on a maximum supported bandwidth of the first UE.

The transmitter 1735 may transmit signals 1722 generated by other components of the device 1705. In some examples, the transmitter 1735 may be collocated with a receiver 1710 in a transceiver module. For example, the transmitter 1735 may be an example of aspects of the transceiver 1920 described with reference to FIG. 19. The transmitter 1735 may utilize a single antenna or a set of antennas.

Figure 18:
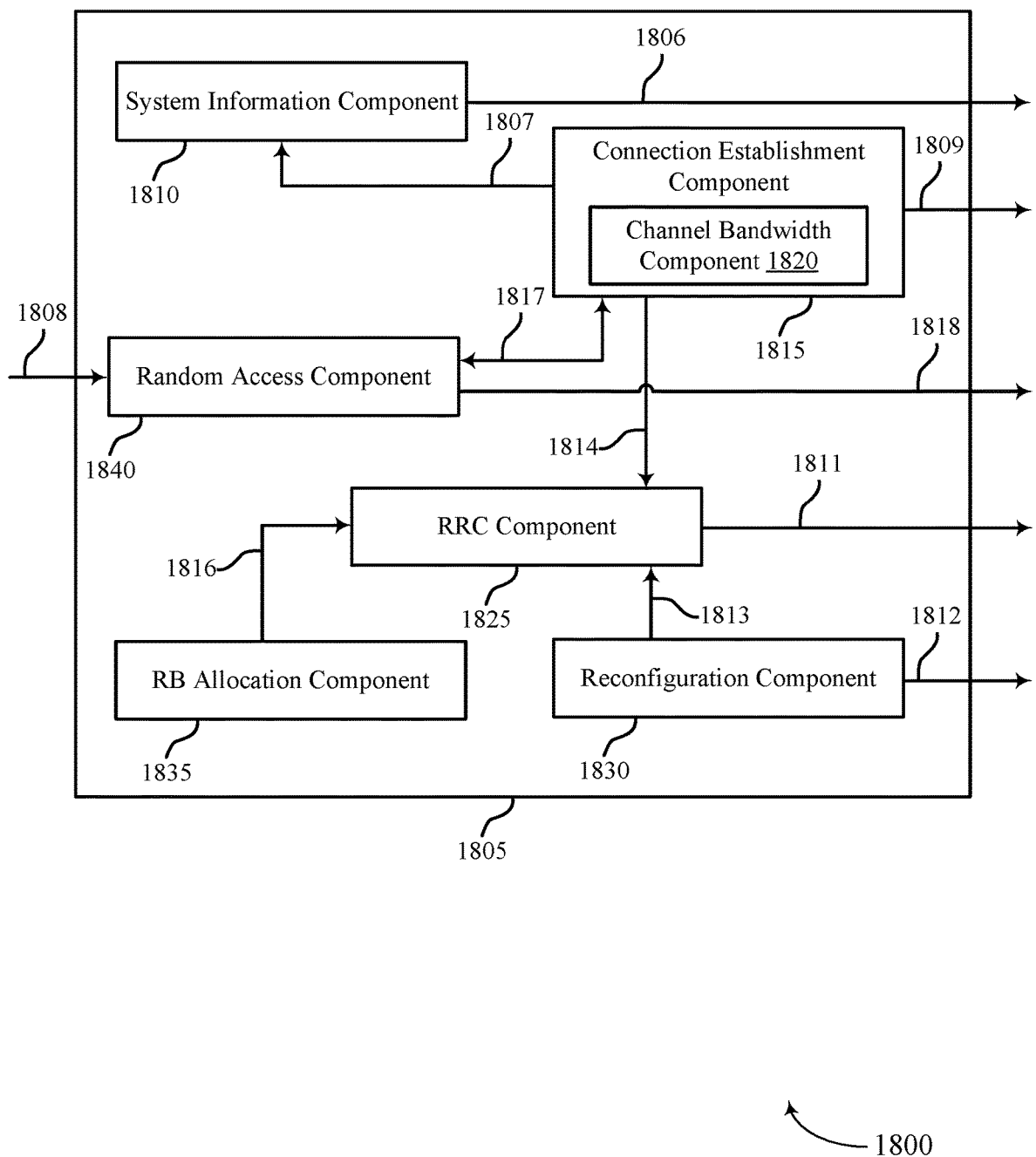
FIG. 18 shows a block diagram of a communications manager that supports bandwidth configuration techniques in wireless communications in accordance with aspects of the present disclosure.

FIG. 18 shows a block diagram 1800 of a communications manager 1805 that supports bandwidth configuration techniques in wireless communications in accordance with aspects of the present disclosure. The communications manager 1805 may be an example of aspects of a communications manager 1615, a communications manager 1715, or a communications manager 1910 described herein. The communications manager 1805 may include a system information component 1810, a connection establishment component 1815, a channel bandwidth component 1820, a RRC component 1825, a reconfiguration component 1830, a RB allocation component 1835, and a random access component 1840. Each of these modules may communicate, directly or indirectly, with one another (e.g., via one or more buses).

The system information component 1810 may transmit system information 1806 to at least a first UE of a set of UEs in a broadcast transmission, the system information 1806 may include a first bandwidth indication 1807, which may be determined by channel bandwidth component 1820 and signaled to system information component 1810 from connection establishment component 1815. In some cases, the first bandwidth indication 1807 is a minimum bandwidth supported by the base station. In some cases, the first bandwidth indication 1807 is a placeholder indication of bandwidth. In some cases, the first bandwidth indication 1807 corresponds to the cell-specific channel bandwidth or the maximum channel bandwidth supported by the base station.

The connection establishment component 1815 may receive a connection establishment request 1808, via signaling 1817 from random access component 1840, from the first UE. In some examples, the connection establishment component 1815 may transmit a connection establishment response 1809 to the first UE that includes an indication of the first UE-specific channel bandwidth, which may be determined by channel bandwidth component 1820 coupled to connection establishment component 1815.

In some examples, the connection establishment component 1815 may receive a connection establishment request 1808, via signaling 1817 from random access component 1840, from the first UE, the connection establishment request 1808 indicating a maximum supported bandwidth of the UE. In some examples, the connection establishment component 1815 may determine, based on the maximum supported bandwidth of the UE, to reject the connection establishment request from the first UE. The connection establishment component 1815 may indicate this rejection via signaling 1817 to random access component 1840.

In some examples, the connection establishment component 1815 may transmit a rejection indication 1818 via random access component 1840 to the first UE. In some cases, the rejection indication 1818 is transmitted to the first UE prior to the first UE camping on the base station. In some cases, the rejection indication 1818 includes an identification of one or more other base stations that are configured to support the maximum supported bandwidth of the UE, which may be determined by channel bandwidth component 1820 coupled to connection establishment component 1815.

In some cases, the connection establishment request 1808 includes one or more of the maximum supported bandwidth of the first UE, a maximum carrier aggregation supported by the first UE, a capability of the first UE to dynamically or semi-statically reconfigure UE-specific channel bandwidth within the cell-specific channel bandwidth, a maximum MCS supported by the first UE, a first UE processing timeline capability, or any combinations thereof.

The channel bandwidth component 1820 may determine, based on the connection establishment request 1808, a first UE-specific channel bandwidth for communications with the first UE, where the first UE-specific channel bandwidth is based on a maximum supported bandwidth of the first UE. In some cases, the first UE-specific channel bandwidth is different than a second UE-specific channel bandwidth of a second UE of the set of UEs. In some cases, the connection establishment request 1808 includes an indication of the maximum supported bandwidth of the first UE. In some cases, the maximum supported bandwidth of the first UE is less than the cell-specific channel bandwidth. In some cases, the maximum supported bandwidth of the UE is a maximum supported BWP bandwidth that is less than a full bandwidth capability of the UE. In some cases, the first UE-specific channel bandwidth is a subset of the maximum supported bandwidth of the first UE.

The RRC component 1825 may transmit UE-specific RRC signaling 1811 to the first UE that includes the UE-specific channel bandwidth indication 1814. In some examples, the UE-specific RRC signaling 1811 may include a plurality of indications of UE-specific channel bandwidths corresponding to respective ones of a plurality of SCSs, and the plurality of indications of UE-specific channel bandwidths includes the UE-specific channel bandwidth indication 1814. In some cases, RRC component 1825 may receive the UE-specific channel bandwidth indication 1814 from channel bandwidth component 1420 via connection establishment component 1815. The reconfiguration component 1830 may determine, subsequent to connection establishment component 1815 transmitting the connection establishment response 1809, a second UE-specific channel bandwidth for communications with the first UE, the second UE-specific channel bandwidth having a different bandwidth than the first UE-specific channel bandwidth, a different location within the cell-specific channel bandwidth, or any combination thereof. In some examples, the reconfiguration component 1830 may transmit an indication 1812 of the second UE-specific channel bandwidth to the first UE (e.g., via RRC or DCI). In some cases, reconfiguration component 1830 may send an indication 1813 of the second UE-specific channel bandwidth to RRC component 1825.

The RB allocation component 1835 may configure the first UE to use a first subset of resource blocks within the first UE-specific channel bandwidth. In some cases, the first subset of resource blocks and a second subset of resource blocks occupy alternating resource blocks within the first UE-specific channel bandwidth. RB allocation component 1835 may signal this configuration 1816 to RRC component 1825 to be included in UE-specific RRC signaling 1811.

The random access component 1840 may manage random access requests at the base station. In some cases, the connection establishment request 1808 is a random access message that may be signaled to connection establishment component 1815 via signaling 1817 and transmitted to the base station as part of a random access procedure. The rejection indication 1818 may be transmitted in a random access response to the first UE as part of the random access procedure.

Figure 19:
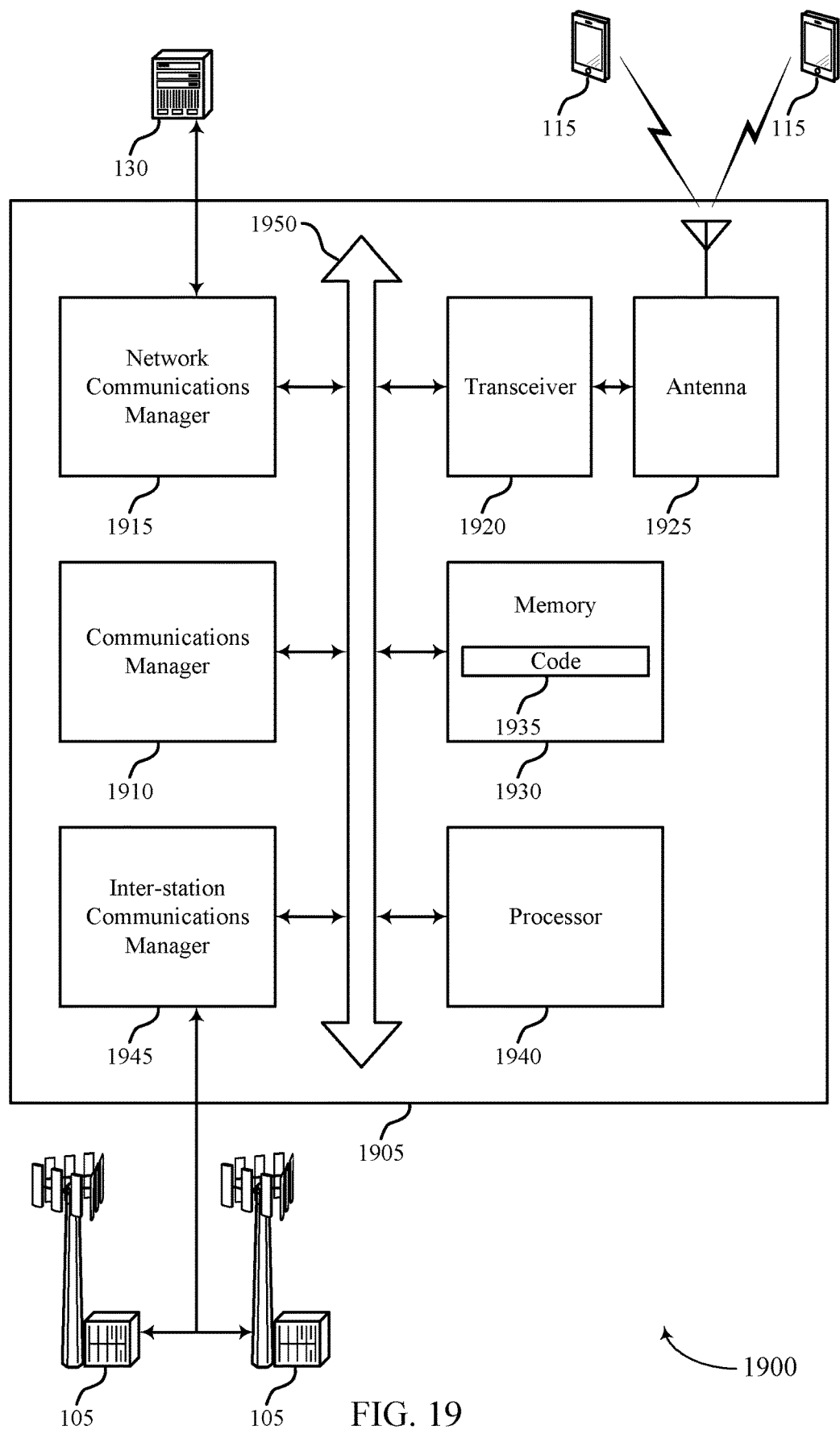
FIG. 19 shows a diagram of a system including a device that supports bandwidth configuration techniques in wireless communications in accordance with aspects of the present disclosure.

FIG. 19 shows a diagram of a system 1900 including a device 1905 that supports bandwidth configuration techniques in wireless communications in accordance with aspects of the present disclosure. The device 1905 may be an example of or include the components of device 1605, device 1705, or a base station 105 as described herein. The device 1905 may include components for bi-directional voice and data communications including components for transmitting and receiving communications, including a communications manager 1910, a network communications manager 1915, a transceiver 1920, an antenna 1925, memory 1930, a processor 1940, and an inter-station communications manager 1945. These components may be in electronic communication via one or more buses (e.g., bus 1950).

The communications manager 1910 may transmit system information to at least a first UE of a set of UEs in a broadcast transmission, the system information including a first bandwidth indication, receive a connection establishment request from the first UE, transmit a connection establishment response to the first UE that includes an indication of the first UE-specific channel bandwidth, and determine, based on the connection establishment request, a first UE-specific channel bandwidth for communications with the first UE, where the first UE-specific channel bandwidth is based on a maximum supported bandwidth of the first UE.

The communications manager 1910 may also transmit system information to at least a first UE of a set of UEs in a broadcast transmission, the system information including a cell-specific channel bandwidth, receive a connection establishment request from the first UE, the connection establishment request indicating a maximum supported bandwidth of the UE, determine, based on the maximum supported bandwidth of the UE, to reject the connection establishment request from the first UE, and transmit a rejection indication to the first UE.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described herein. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a basic input/output system (BIOS) which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device to perform various functions (e.g., functions or tasks supporting bandwidth configuration techniques in wireless communications).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
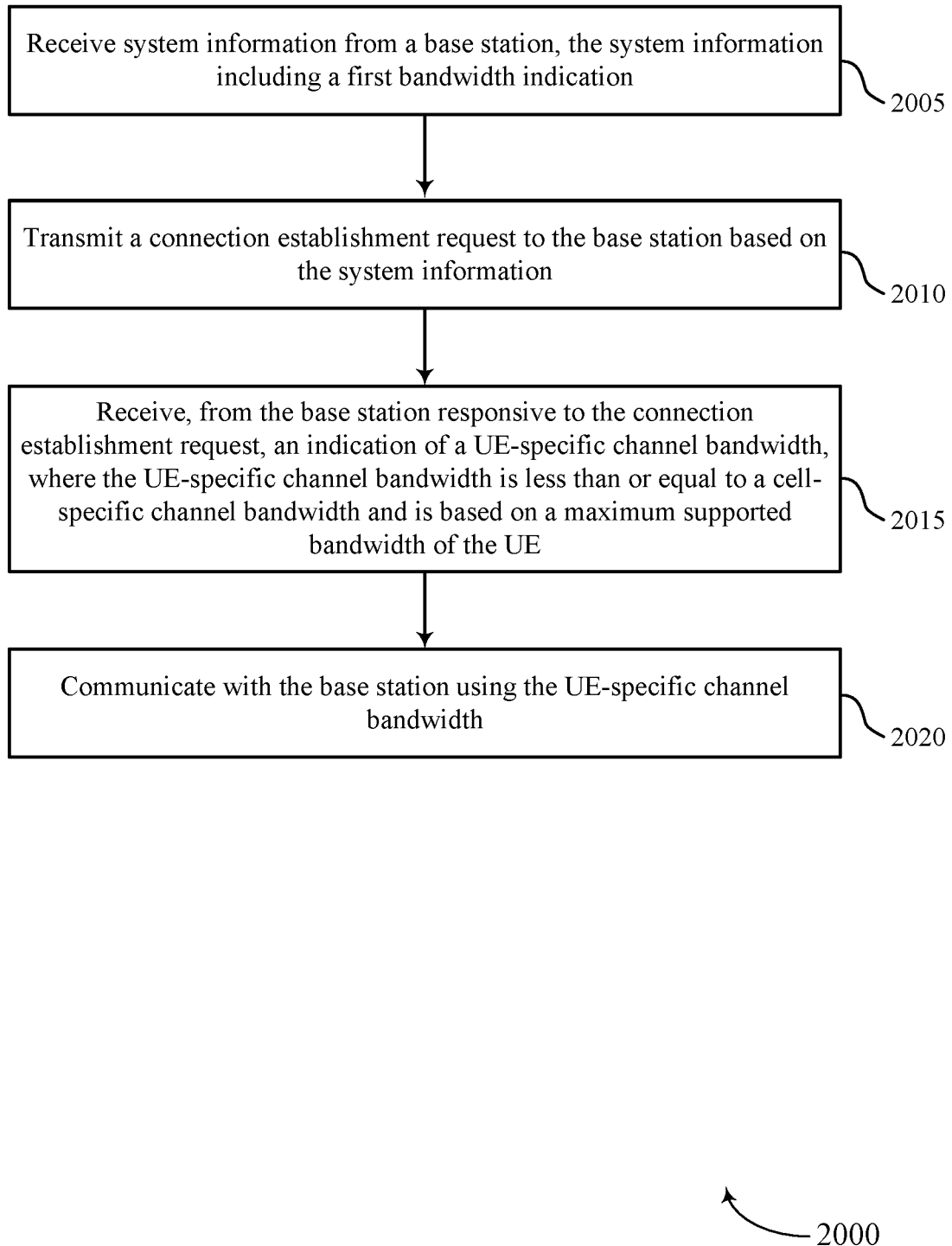
FIGS. 20 through 26 show flowcharts illustrating methods that support bandwidth configuration techniques in wireless communications in accordance with aspects of the present disclosure.

FIG. 20 shows a flowchart illustrating a method 2000 that supports bandwidth configuration techniques in wireless communications in accordance with aspects of the present disclosure. The operations of method 2000 may be implemented by a UE 115 or its components as described herein. For example, the operations of method 2000 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2005, the UE may receive system information from a base station, the system information including a first bandwidth indication. The operations of 2005 may be performed according to the methods described herein. In some examples, aspects of the operations of 2005 may be performed by a system information component as described with reference to FIGS. 12 through 15. In some cases, the first bandwidth indication corresponds to the cell-specific channel bandwidth or the maximum channel bandwidth supported by the base station. In some cases, the first bandwidth indication is a minimum bandwidth supported by the base station. In other cases, the first bandwidth indication is a placeholder indication of bandwidth that is provided for backward compatibility, and the UE not be informed of the cell-specific channel bandwidth. Such system information may be received via one or more of an SSB transmission, RMSI transmission, OSI transmission, or any combinations thereof.

At 2010, the UE may transmit a connection establishment request to the base station based on the system information. The operations of 2010 may be performed according to the methods described herein. In some examples, aspects of the operations of 2010 may be performed by a connection establishment component as described with reference to FIGS. 12 through 15. In some cases, the connection establishment request may be a random access request used for requesting initial system access via a base station. In some cases, the connection establishment request may be transmitted as part of a handover procedure. In some cases, the UE may transmit the maximum supported bandwidth of the UE to the base station, which may be less than the cell-specific channel bandwidth. In some cases, the maximum supported bandwidth of the UE is a maximum supported BWP bandwidth that is less than or equal to a full bandwidth capability of the UE, which may be determined based on the full bandwidth capability of the UE, the cell-specific channel bandwidth, a current data usage of the UE, a power consumption mode of the UE, a thermal status of the UE, or any combinations thereof.

At 2015, the UE may receive, from the base station responsive to the connection establishment request, an indication of a UE-specific channel bandwidth, where the UE-specific channel bandwidth is less than or equal to a cell-specific channel bandwidth and is based on a maximum supported bandwidth of the UE. The operations of 2015 may be performed according to the methods described herein. In some examples, aspects of the operations of 2015 may be performed by a channel bandwidth component as described with reference to FIGS. 12 through 15. In some cases, the UE may receive UE-specific RRC signaling that includes the UE-specific channel bandwidth indication. In some cases, the UE-specific channel bandwidth is a subset of the maximum supported bandwidth of the UE.

At 2020, the UE may communicate with the base station using the UE-specific channel bandwidth. The operations of 2020 may be performed according to the methods described herein. In some examples, aspects of the operations of 2020 may be performed by a channel bandwidth component as described with reference to FIGS. 12 through 15. In some cases, the communication with the base station using the UE-specific channel bandwidth includes transmitting one or more uplink transmissions to the base station using a first subset of resource blocks within the UE-specific channel bandwidth. In some cases, the first subset of resource blocks and a second subset of resource blocks occupy alternating resource blocks within the UE-specific channel bandwidth.

Figure 21:
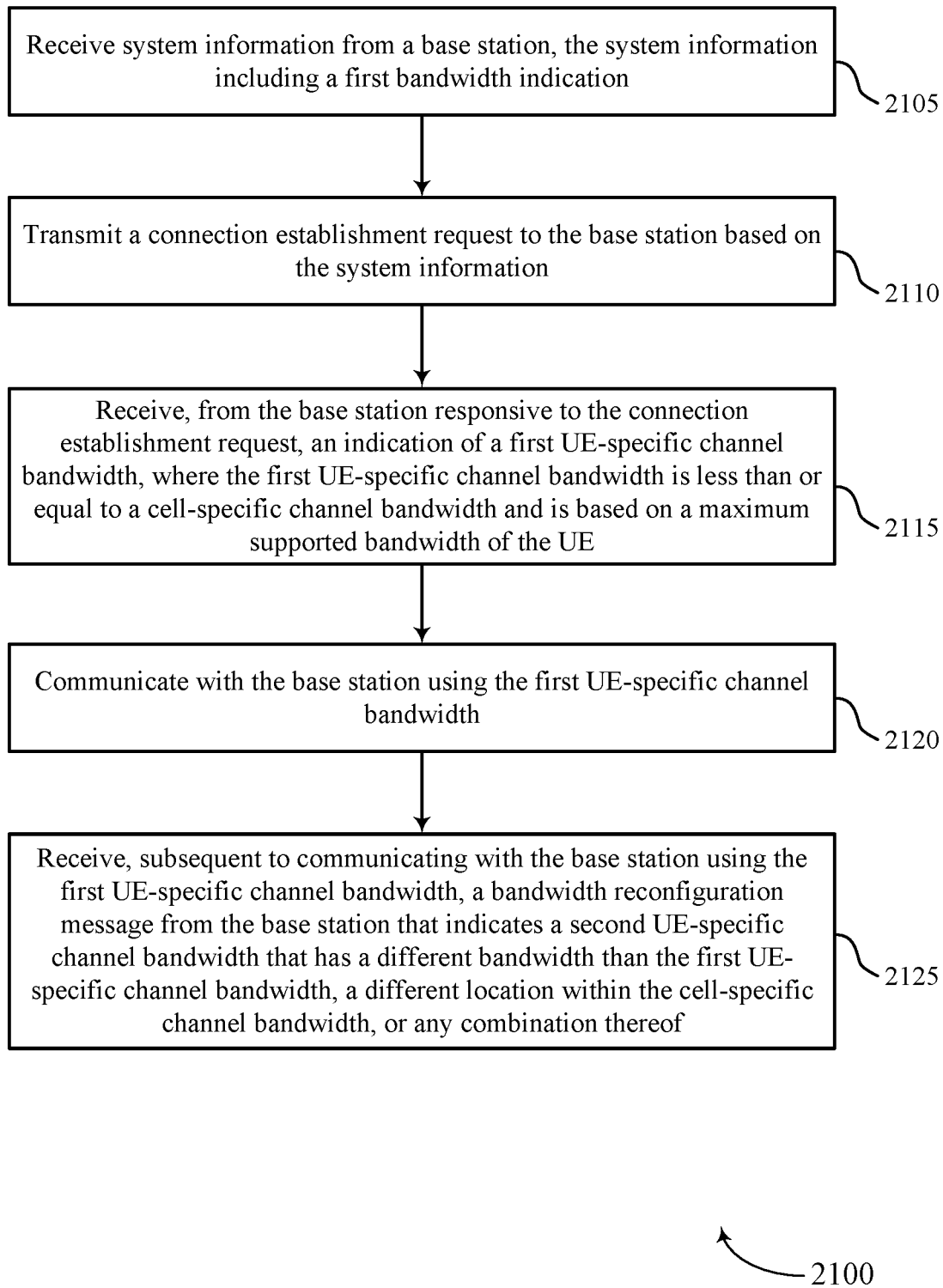

FIG. 21 shows a flowchart illustrating a method 2100 that supports bandwidth configuration techniques in wireless communications in accordance with aspects of the present disclosure. The operations of method 2100 may be implemented by a UE 115 or its components as described herein. For example, the operations of method 2100 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2105, the UE may receive system information from a base station, the system information including a first bandwidth indication. The operations of 2105 may be performed according to the methods described herein. In some examples, aspects of the operations of 2105 may be performed by a system information component as described with reference to FIGS. 12 through 15. In some cases, the first bandwidth indication corresponds to the cell-specific channel bandwidth or the maximum channel bandwidth supported by the base station. In some cases, the first bandwidth indication is a minimum bandwidth supported by the base station. In other cases, the first bandwidth indication is a placeholder indication of bandwidth that is provided for backward compatibility, and the UE not be informed of the cell-specific channel bandwidth. Such system information may be received via one or more of an SSB transmission, RMSI transmission, OSI transmission, or any combinations thereof.

At 2110, the UE may transmit a connection establishment request to the base station based on the system information. The operations of 2110 may be performed according to the methods described herein. In some examples, aspects of the operations of 2110 may be performed by a connection establishment component as described with reference to FIGS. 12 through 15. In some cases, the connection establishment request may be a random access request used for requesting initial system access via a base station. In some cases, the connection establishment request may be transmitted as part of a handover procedure. In some cases, the UE may transmit the maximum supported bandwidth of the UE to the base station, which may be less than the cell-specific channel bandwidth. In some cases, the maximum supported bandwidth of the UE is a maximum supported BWP bandwidth that is less than or equal to a full bandwidth capability of the UE, which may be determined based on the full bandwidth capability of the UE, the cell-specific channel bandwidth, a current data usage of the UE, a power consumption mode of the UE, a thermal status of the UE, or any combinations thereof.

At 2115, the UE may receive, from the base station responsive to the connection establishment request, an indication of a first UE-specific channel bandwidth, where the first UE-specific channel bandwidth is less than or equal to a cell-specific channel bandwidth and is based on a maximum supported bandwidth of the UE. The operations of 2115 may be performed according to the methods described herein. In some examples, aspects of the operations of 2115 may be performed by a channel bandwidth component as described with reference to FIGS. 12 through 15. In some cases, the UE may receive UE-specific RRC signaling that includes the UE-specific channel bandwidth indication. In some cases, the UE-specific channel bandwidth is a subset of the maximum supported bandwidth of the UE.

At 2120, the UE may communicate with the base station using the first UE-specific channel bandwidth. The operations of 2120 may be performed according to the methods described herein. In some examples, aspects of the operations of 2120 may be performed by a channel bandwidth component as described with reference to FIGS. 12 through 15. In some cases, the communication with the base station using the UE-specific channel bandwidth includes transmitting one or more uplink transmissions to the base station using a first subset of resource blocks within the UE-specific channel bandwidth. In some cases, the first subset of resource blocks and a second subset of resource blocks occupy alternating resource blocks within the UE-specific channel bandwidth.

At 2125, the UE may receive, subsequent to communicating with the base station using the first UE-specific channel bandwidth, a bandwidth reconfiguration message from the base station that indicates a second UE-specific channel bandwidth that has a different bandwidth than the first UE-specific channel bandwidth, a different location within the cell-specific channel bandwidth, or any combination thereof. The operations of 2125 may be performed according to the methods described herein. In some examples, aspects of the operations of 2125 may be performed by a reconfiguration component as described with reference to FIGS. 12 through 15. In some cases, the bandwidth reconfiguration message may be a dynamic reconfiguration message received in DCI. In some cases, the bandwidth reconfiguration message may be received in UE-specific RRC signaling.

Figure 22:
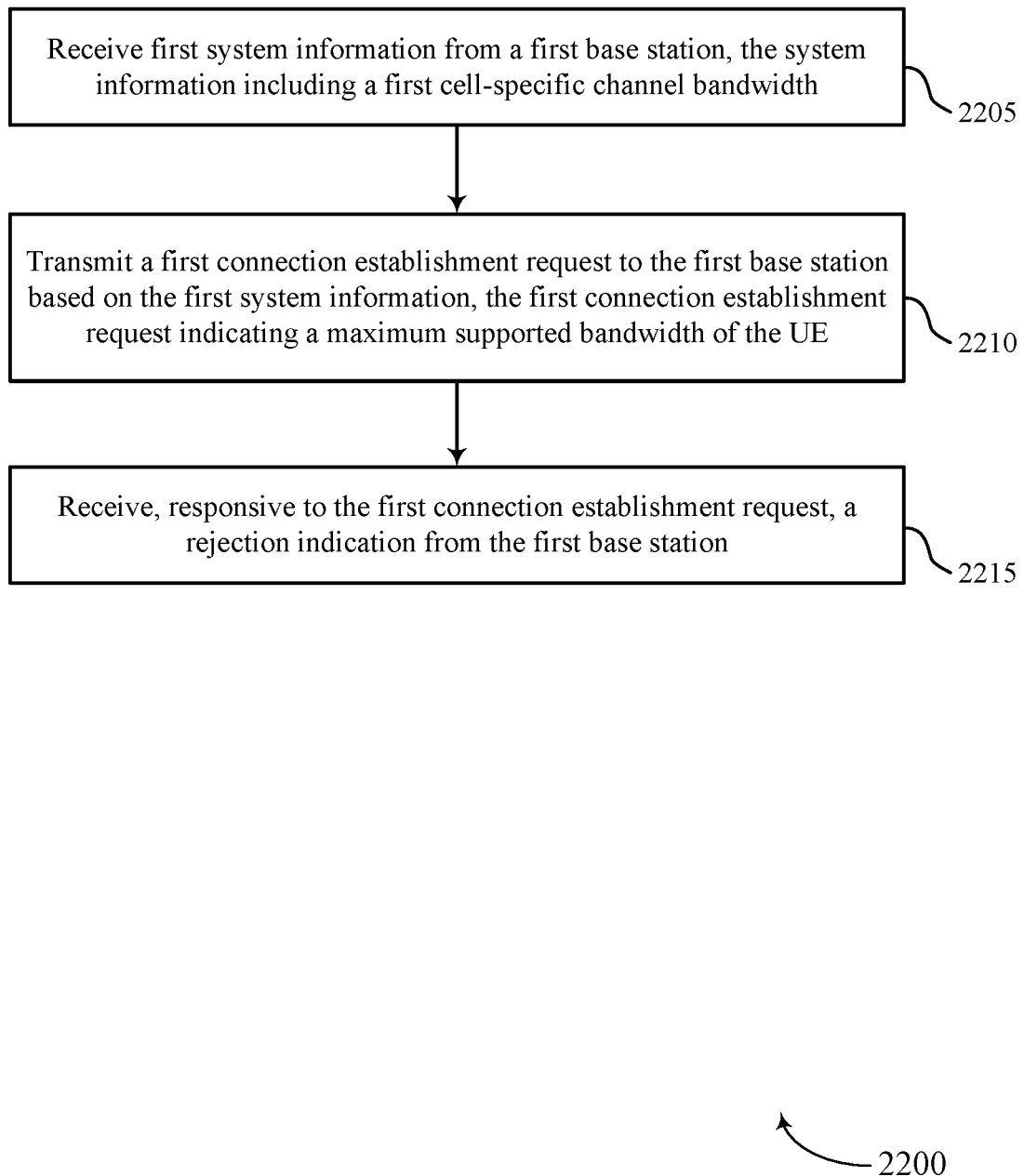

FIG. 22 shows a flowchart illustrating a method 2200 that supports bandwidth configuration techniques in wireless communications in accordance with aspects of the present disclosure. The operations of method 2200 may be implemented by a UE 115 or its components as described herein. For example, the operations of method 2200 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2205, the UE may receive first system information from a first base station, the system information including a first cell-specific channel bandwidth. The operations of 2205 may be performed according to the methods described herein. In some examples, aspects of the operations of 2205 may be performed by a system information component as described with reference to FIGS. 12 through 15. In some cases, the cell-specific channel bandwidth corresponds to the cell-specific channel bandwidth or the maximum channel bandwidth supported by the base station. In some cases, the cell-specific channel bandwidth is a minimum bandwidth supported by the base station. In other cases, the cell-specific channel bandwidth is a placeholder indication of bandwidth that is provided for backward compatibility, and the UE not be informed of the cell-specific channel bandwidth. Such system information may be received via one or more of an SSB transmission, RMSI transmission, OSI transmission, or any combinations thereof.

At 2210, the UE may transmit a first connection establishment request to the first base station based on the first system information, the first connection establishment request indicating a maximum supported bandwidth of the UE. The operations of 2210 may be performed according to the methods described herein. In some examples, aspects of the operations of 2210 may be performed by a connection establishment component as described with reference to FIGS. 12 through 15. In some cases, the first connection establishment request is a random access message (e.g., a message 3) transmitted to the first base station as part of a random access procedure. In some cases, the maximum supported bandwidth of the UE is transmitted in a PUSCH transmission as part of the random access procedure.

At 2215, the UE may receive, responsive to the first connection establishment request, a rejection indication from the first base station. The operations of 2215 may be performed according to the methods described herein. In some examples, aspects of the operations of 2215 may be performed by a connection establishment component as described with reference to FIGS. 12 through 15. In some cases, the rejection indication from the first base station is received prior to the UE camping on the first base station. In some cases, the rejection indication is received in a random access response from the first base station as part of the random access procedure. In some cases, the rejection indication is received in a PDSCH transmission, as part of the random access procedure.

Figure 23:
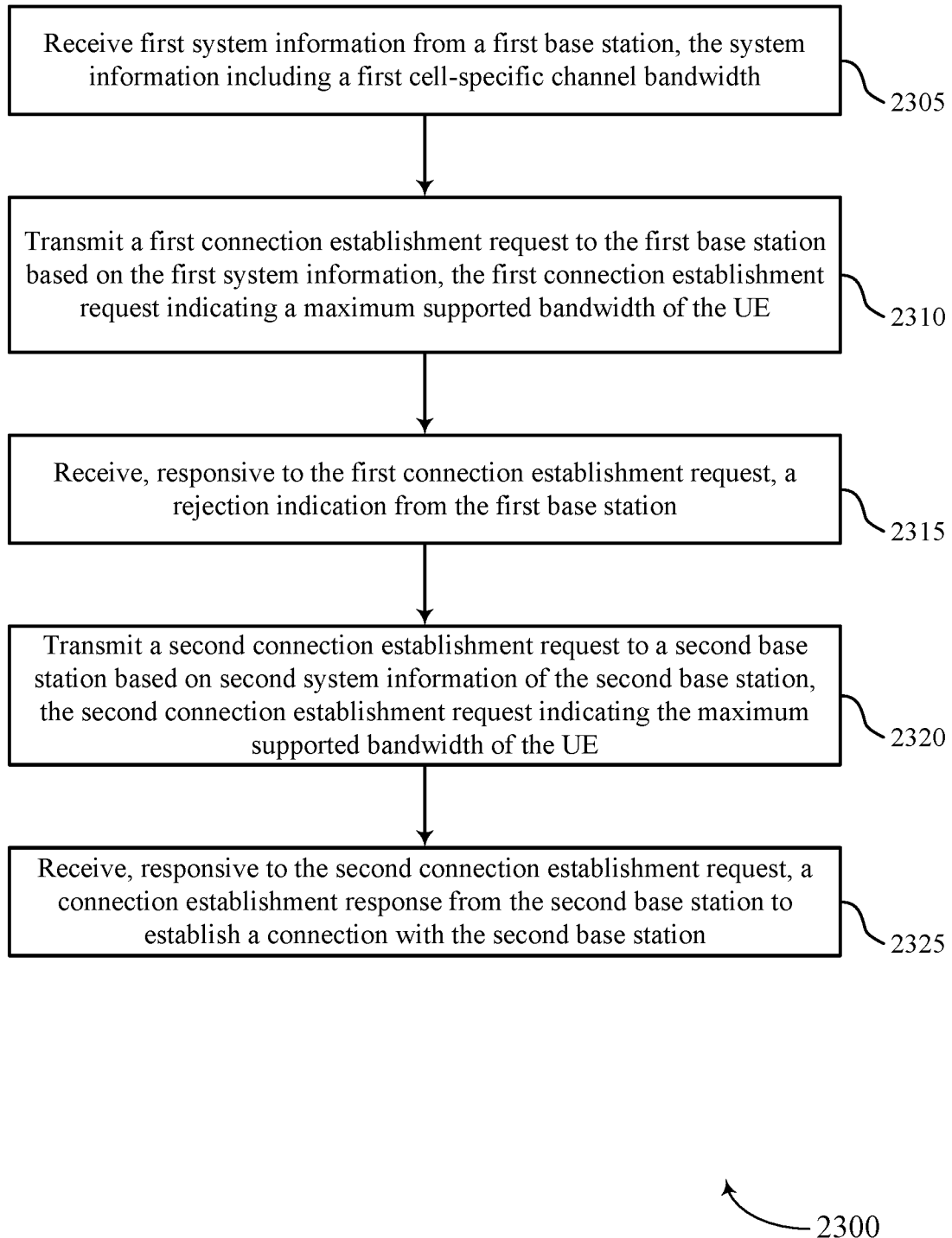

FIG. 23 shows a flowchart illustrating a method 2300 that supports bandwidth configuration techniques in wireless communications in accordance with aspects of the present disclosure. The operations of method 2300 may be implemented by a UE 115 or its components as described herein. For example, the operations of method 2300 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2305, the UE may receive first system information from a first base station, the system information including a first cell-specific channel bandwidth. The operations of 2305 may be performed according to the methods described herein. In some examples, aspects of the operations of 2305 may be performed by a system information component as described with reference to FIGS. 12 through 15. In some cases, the cell-specific channel bandwidth corresponds to the cell-specific channel bandwidth or the maximum channel bandwidth supported by the base station. In some cases, the cell-specific channel bandwidth is a minimum bandwidth supported by the base station. In other cases, the cell-specific channel bandwidth is a placeholder indication of bandwidth that is provided for backward compatibility, and the UE not be informed of the cell-specific channel bandwidth. Such system information may be received via one or more of an SSB transmission, RMSI transmission, OSI transmission, or any combinations thereof.

At 2310, the UE may transmit a first connection establishment request to the first base station based on the first system information, the first connection establishment request indicating a maximum supported bandwidth of the UE. The operations of 2310 may be performed according to the methods described herein. In some examples, aspects of the operations of 2310 may be performed by a connection establishment component as described with reference to FIGS. 12 through 15. In some cases, the first connection establishment request is a random access message (e.g., a message 3) transmitted to the first base station as part of a random access procedure. In some cases, the maximum supported bandwidth of the UE is transmitted in a PUSCH transmission as part of the random access procedure.

At 2315, the UE may receive, responsive to the first connection establishment request, a rejection indication from the first base station. The operations of 2315 may be performed according to the methods described herein. In some examples, aspects of the operations of 2315 may be performed by a connection establishment component as described with reference to FIGS. 12 through 15. In some cases, the rejection indication from the first base station is received prior to the UE camping on the first base station. In some cases, the rejection indication is received in a random access response from the first base station as part of the random access procedure. In some cases, the rejection indication is received in a PDSCH transmission, as part of the random access procedure. In some cases, the rejection indication includes an identification of a second base station that is a candidate for a connection establishment.

At 2320, the UE may transmit a second connection establishment request to a second base station based on second system information of the second base station, the second connection establishment request indicating the maximum supported bandwidth of the UE. The operations of 2320 may be performed according to the methods described herein. In some examples, aspects of the operations of 2320 may be performed by a connection establishment component as described with reference to FIGS. 12 through 15.

At 2325, the UE may receive, responsive to the second connection establishment request, a connection establishment response from the second base station to establish a connection with the second base station. The operations of 2325 may be performed according to the methods described herein. In some examples, aspects of the operations of 2325 may be performed by a connection establishment component as described with reference to FIGS. 12 through 15.

Figure 24:
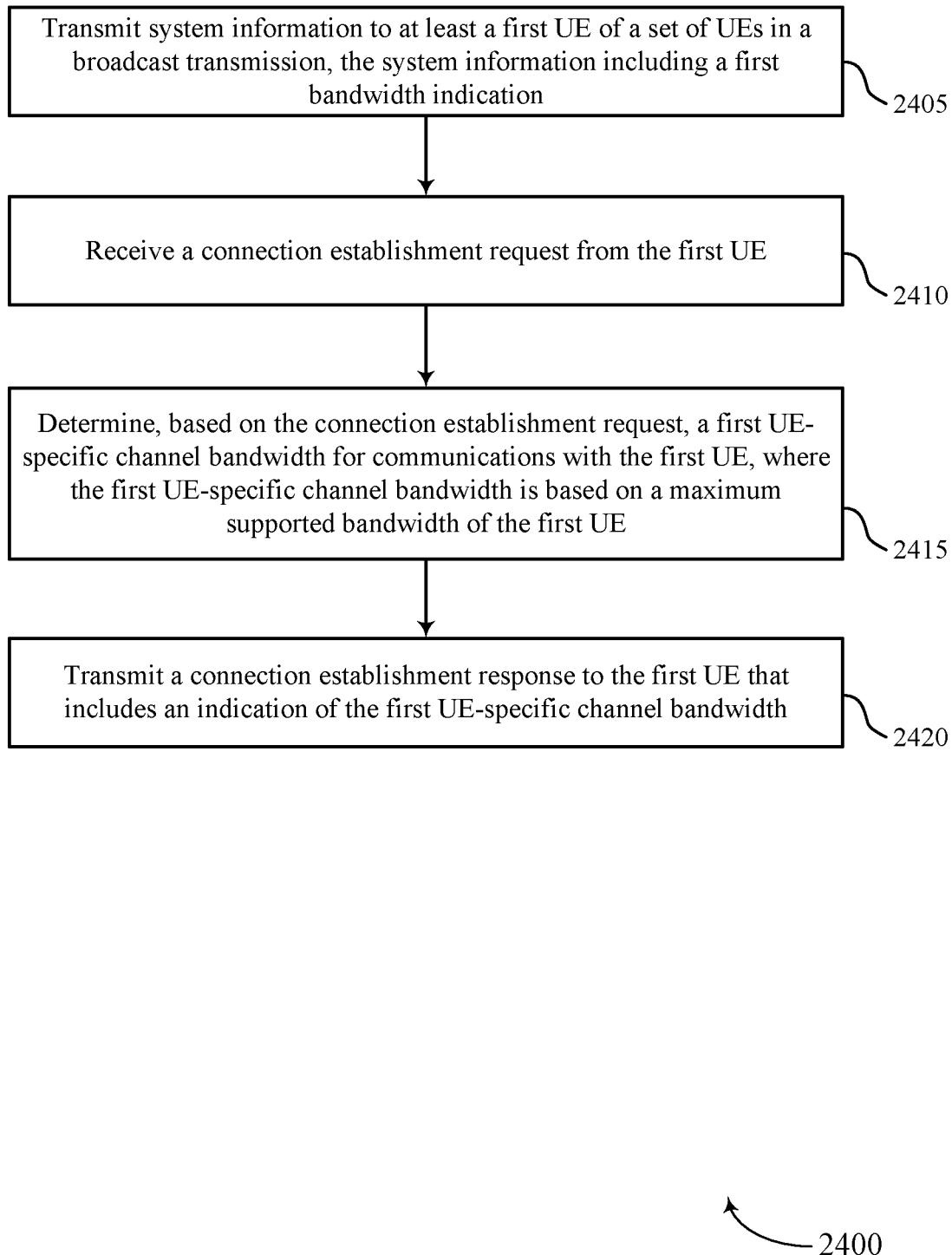

FIG. 24 shows a flowchart illustrating a method 2400 that supports bandwidth configuration techniques in wireless communications in accordance with aspects of the present disclosure. The operations of method 2400 may be implemented by a base station 105 or its components as described herein. For example, the operations of method 2400 may be performed by a communications manager as described with reference to FIGS. 16 through 19. In some examples, a base station may execute a set of instructions to control the functional elements of the base station to perform the functions described herein. Additionally or alternatively, a base station may perform aspects of the functions described herein using special-purpose hardware.

At 2405, the base station may transmit system information to at least a first UE of a set of UEs in a broadcast transmission, the system information including a first bandwidth indication. The operations of 2405 may be performed according to the methods described herein. In some examples, aspects of the operations of 2405 may be performed by a system information component as described with reference to FIGS. 16 through 19. In some cases, the first bandwidth indication corresponds to the cell-specific channel bandwidth or the maximum channel bandwidth supported by the base station. In some cases, the first bandwidth indication is a minimum bandwidth supported by the base station. In other cases, the first bandwidth indication is a placeholder indication of bandwidth that is provided for backward compatibility, and the UE not be informed of the cell-specific channel bandwidth. Such system information may be received via one or more of an SSB transmission, RMSI transmission, OSI transmission, or any combinations thereof.

At 2410, the base station may receive a connection establishment request from the first UE. The operations of 2410 may be performed according to the methods described herein. In some examples, aspects of the operations of 2410 may be performed by a connection establishment component as described with reference to FIGS. 16 through 19. In some cases, the connection establishment request includes an indication of the maximum supported bandwidth of the first UE.

At 2415, the base station may determine, based on the connection establishment request, a first UE-specific channel bandwidth for communications with the first UE, where the first UE-specific channel bandwidth is based on a maximum supported bandwidth of the first UE. The operations of 2415 may be performed according to the methods described herein. In some examples, aspects of the operations of 2415 may be performed by a channel bandwidth component as described with reference to FIGS. 16 through 19. In some cases, the first UE-specific channel bandwidth is a subset of the maximum supported bandwidth of the first UE.

At 2420, the base station may transmit a connection establishment response to the first UE that includes an indication of the first UE-specific channel bandwidth. The operations of 2420 may be performed according to the methods described herein. In some examples, aspects of the operations of 2420 may be performed by a connection establishment component as described with reference to FIGS. 16 through 19. In some cases, the base station may transmit UE-specific RRC signaling to the first UE that includes the indication of the UE-specific channel bandwidth. In some cases, the first UE-specific channel bandwidth is different than a second UE-specific channel bandwidth of a second UE of the set of UEs.

Figure 25:
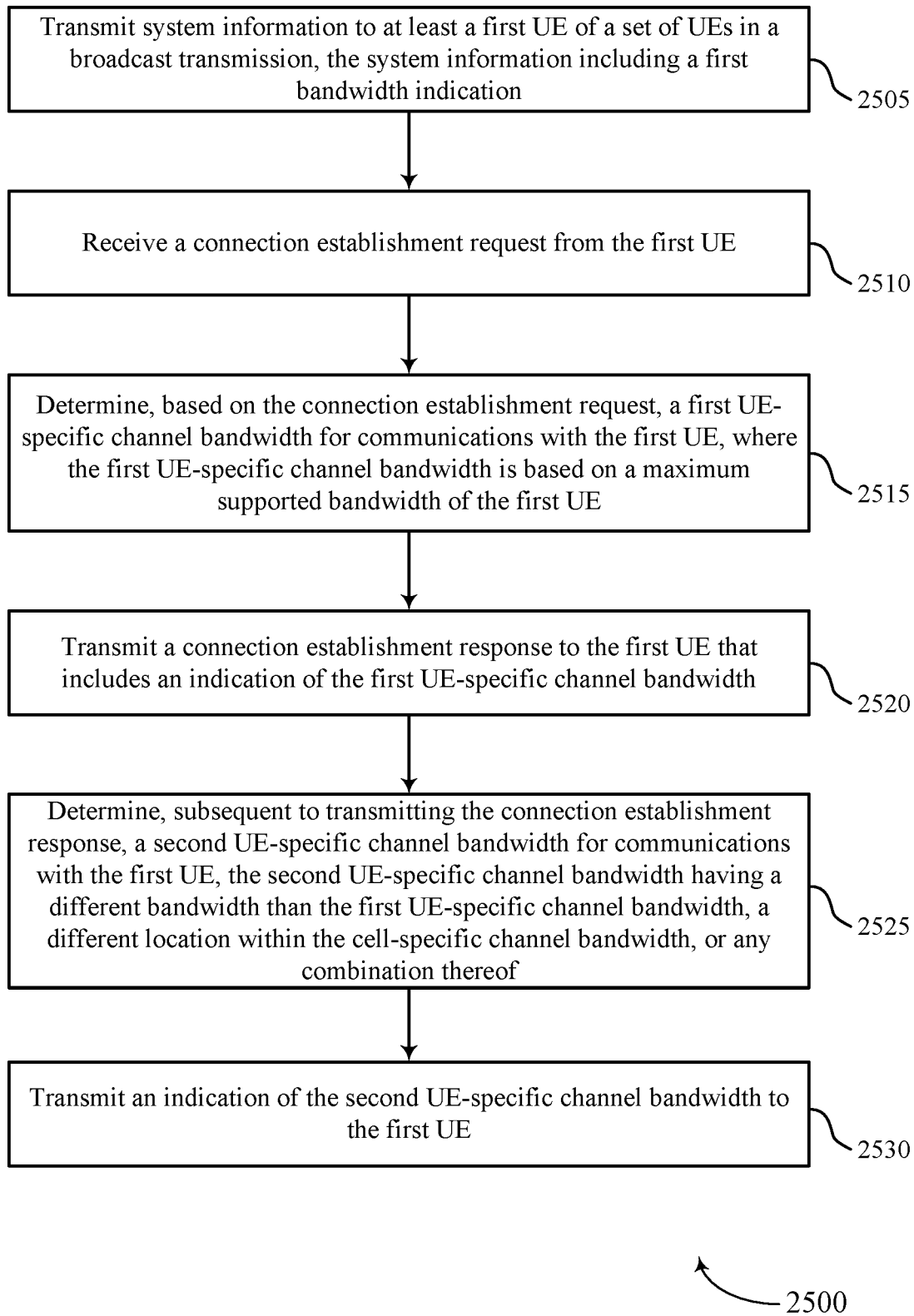

FIG. 25 shows a flowchart illustrating a method 2500 that supports bandwidth configuration techniques in wireless communications in accordance with aspects of the present disclosure. The operations of method 2500 may be implemented by a base station 105 or its components as described herein. For example, the operations of method 2500 may be performed by a communications manager as described with reference to FIGS. 16 through 19. In some examples, a base station may execute a set of instructions to control the functional elements of the base station to perform the functions described herein. Additionally or alternatively, a base station may perform aspects of the functions described herein using special-purpose hardware.

At 2505, the base station may transmit system information to at least a first UE of a set of UEs in a broadcast transmission, the system information including a first bandwidth indication. The operations of 2505 may be performed according to the methods described herein. In some examples, aspects of the operations of 2505 may be performed by a system information component as described with reference to FIGS. 16 through 19. In some cases, the first bandwidth indication corresponds to the cell-specific channel bandwidth or the maximum channel bandwidth supported by the base station. In some cases, the first bandwidth indication is a minimum bandwidth supported by the base station. In other cases, the first bandwidth indication is a placeholder indication of bandwidth that is provided for backward compatibility, and the UE not be informed of the cell-specific channel bandwidth. Such system information may be received via one or more of an SSB transmission, RMSI transmission, OSI transmission, or any combinations thereof.

At 2510, the base station may receive a connection establishment request from the first UE. The operations of 2510 may be performed according to the methods described herein. In some examples, aspects of the operations of 2510 may be performed by a connection establishment component as described with reference to FIGS. 16 through 19. In some cases, the connection establishment request includes an indication of the maximum supported bandwidth of the first UE.

At 2515, the base station may determine, based on the connection establishment request, a first UE-specific channel bandwidth for communications with the first UE, where the first UE-specific channel bandwidth is based on a maximum supported bandwidth of the first UE. The operations of 2515 may be performed according to the methods described herein. In some examples, aspects of the operations of 2515 may be performed by a channel bandwidth component as described with reference to FIGS. 16 through 19. In some cases, the first UE-specific channel bandwidth is a subset of the maximum supported bandwidth of the first UE.

At 2520, the base station may transmit a connection establishment response to the first UE that includes an indication of the first UE-specific channel bandwidth. The operations of 2520 may be performed according to the methods described herein. In some examples, aspects of the operations of 2520 may be performed by a connection establishment component as described with reference to FIGS. 16 through 19.

At 2525, the base station may determine, subsequent to transmitting the connection establishment response, a second UE-specific channel bandwidth for communications with the first UE, the second UE-specific channel bandwidth having a different bandwidth than the first UE-specific channel bandwidth, a different location within the cell-specific channel bandwidth, or any combination thereof. The operations of 2525 may be performed according to the methods described herein. In some examples, aspects of the operations of 2525 may be performed by a reconfiguration component as described with reference to FIGS. 16 through 19.

At 2530, the base station may transmit an indication of the second UE-specific channel bandwidth to the first UE. The operations of 2530 may be performed according to the methods described herein. In some examples, aspects of the operations of 2530 may be performed by a reconfiguration component as described with reference to FIGS. 16 through 19.

Figure 26:
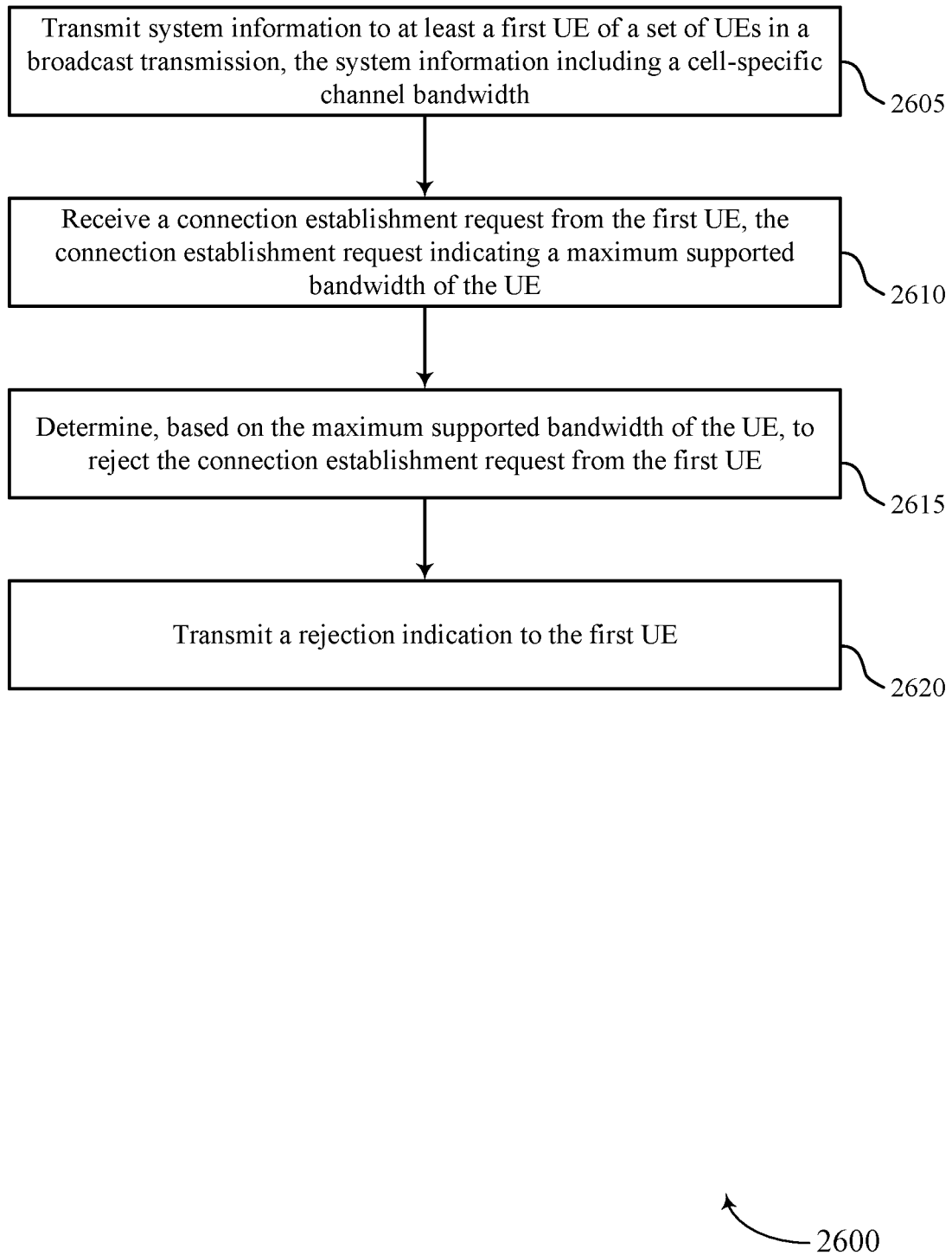

FIG. 26 shows a flowchart illustrating a method 2600 that supports bandwidth configuration techniques in wireless communications in accordance with aspects of the present disclosure. The operations of method 2600 may be implemented by a base station 105 or its components as described herein. For example, the operations of method 2600 may be performed by a communications manager as described with reference to FIGS. 16 through 19. In some examples, a base station may execute a set of instructions to control the functional elements of the base station to perform the functions described herein. Additionally or alternatively, a base station may perform aspects of the functions described herein using special-purpose hardware.

At 2605, the base station may transmit system information to at least a first UE of a set of UEs in a broadcast transmission, the system information including a cell-specific channel bandwidth. The operations of 2605 may be performed according to the methods described herein. In some examples, aspects of the operations of 2605 may be performed by a system information component as described with reference to FIGS. 16 through 19. In some cases, the first bandwidth indication corresponds to the cell-specific channel bandwidth or the maximum channel bandwidth supported by the base station. In some cases, the first bandwidth indication is a minimum bandwidth supported by the base station. In other cases, the first bandwidth indication is a placeholder indication of bandwidth that is provided for backward compatibility, and the UE not be informed of the cell-specific channel bandwidth. Such system information may be received via one or more of an SSB transmission, RMSI transmission, OSI transmission, or any combinations thereof.

At 2610, the base station may receive a connection establishment request from the first UE, the connection establishment request indicating a maximum supported bandwidth of the UE. The operations of 2610 may be performed according to the methods described herein. In some examples, aspects of the operations of 2610 may be performed by a connection establishment component as described with reference to FIGS. 16 through 19. In some cases, the connection establishment request includes an indication of the maximum supported bandwidth of the first UE. In some cases, the connection establishment request is a random access message transmitted to the base station as part of a random access procedure.

At 2615, the base station may determine, based on the maximum supported bandwidth of the UE, to reject the connection establishment request from the first UE. The operations of 2615 may be performed according to the methods described herein. In some examples, aspects of the operations of 2615 may be performed by a connection establishment component as described with reference to FIGS. 16 through 19.

At 2620, the base station may transmit a rejection indication to the first UE. The operations of 2620 may be performed according to the methods described herein. In some examples, aspects of the operations of 2620 may be performed by a connection establishment component as described with reference to FIGS. 16 through 19. In some cases, the rejection indication is transmitted to the first UE prior to the first UE camping on the base station. In some cases, the rejection indication is transmitted in a random access response as part of a random access procedure. In some cases, the rejection indication includes an identification of one or more other base stations that are configured to support the maximum supported bandwidth of the UE.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. Similarly, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving system information from a base station, the system information including a first bandwidth indication;
    transmitting a connection establishment request to the base station based at least in part on the system information;
    receiving, from the base station responsive to the connection establishment request, a plurality of indications of UE-specific channel bandwidths corresponding to respective ones of a plurality of subcarrier spacings (SCSs), the plurality of indications of UE-specific channel bandwidths including an indication of a UE-specific channel bandwidth, wherein the UE-specific channel bandwidth is less than or equal to a cell-specific channel bandwidth and is based at least in part on a maximum supported bandwidth of the UE; and
    communicating with the base station using the UE-specific channel bandwidth.

2. The method of claim 1, wherein the transmitting the connection establishment request further comprises:
    transmitting the maximum supported bandwidth of the UE to the base station.

3. The method of claim 2, wherein the maximum supported bandwidth of the UE is less than the cell-specific channel bandwidth.

4. The method of claim 2, wherein the maximum supported bandwidth of the UE is a maximum supported bandwidth part (BWP) bandwidth that is less than or equal to a full bandwidth capability of the UE.

5. The method of claim 4, further comprising:
    determining the maximum supported BWP bandwidth of the UE to include with the connection establishment request based at least in part on the full bandwidth capability of the UE, the cell-specific channel bandwidth, a current data usage of the UE, a power consumption mode of the UE, a thermal status of the UE, or any combinations thereof.

6. The method of claim 1, wherein the first bandwidth indication corresponds to the cell-specific channel bandwidth or a maximum channel bandwidth supported by the base station.

7. The method of claim 1, wherein the first bandwidth indication is a minimum bandwidth supported by the base station.

8. The method of claim 1, wherein the first bandwidth indication is a placeholder indication of bandwidth.

9. The method of claim 1, wherein the receiving the plurality of indications of the UE-specific channel bandwidths comprises:
    receiving UE-specific radio resource control (RRC) signaling that includes the plurality of indications of the UE-specific channel bandwidths.

10. The method of claim 1, wherein the UE-specific channel bandwidth is a subset of the maximum supported bandwidth of the UE.

11. The method of claim 1, wherein the UE-specific channel bandwidth is a first UE-specific channel bandwidth, and wherein the method further comprises:
    receiving, subsequent to communicating with the base station using the first UE-specific channel bandwidth, a bandwidth reconfiguration message from the base station that indicates a second UE-specific channel bandwidth that has a different bandwidth than the first UE-specific channel bandwidth, a different location within the cell-specific channel bandwidth, or any combination thereof.

12. The method of claim 1, wherein the connection establishment request includes one or more of the maximum supported bandwidth of the UE, a maximum carrier aggregation supported by the UE, a UE capability to dynamically or semi-statically reconfigure the UE-specific channel bandwidth within the cell-specific channel bandwidth, a maximum modulation and coding scheme (MCS) supported by the UE, a UE processing timeline capability, or any combinations thereof.

13. The method of claim 1, wherein the communicating with the base station using the UE-specific channel bandwidth comprises transmitting one or more uplink transmissions to the base station using a first subset of resource blocks within the UE-specific channel bandwidth.

14. The method of claim 13, wherein the first subset of resource blocks and a second subset of resource blocks occupy alternating resource blocks within the UE-specific channel bandwidth.

15. A method for wireless communications at a user equipment (UE), comprising:
    receiving first system information from a first base station, the first system information including a first cell-specific channel bandwidth;
    transmitting a first connection establishment request to the first base station based at least in part on the first system information, the first connection establishment request indicating a maximum supported bandwidth of the UE that is less than the first cell-specific channel bandwidth; and
    receiving, from the first base station responsive to the first connection establishment request, an indication that the first connection establishment request indicating the maximum supported bandwidth of the UE is rejected.

16. The method of claim 15, further comprising:
    transmitting a second connection establishment request to a second base station based at least in part on second system information of the second base station, the second connection establishment request indicating the maximum supported bandwidth of the UE; and receiving, from the second base station responsive to the second connection establishment request, a connection establishment response to establish a connection with the second base station.

17. The method of claim 15, wherein the indication from the first base station is received prior to the UE camping on the first base station.

18. The method of claim 15, wherein the first connection establishment request is a random access message transmitted to the first base station as part of a random access procedure, and wherein the indication is received in a random access response from the first base station as part of the random access procedure.

19. The method of claim 18, wherein the maximum supported bandwidth of the UE is transmitted in a physical uplink shared channel (PUSCH) transmission, and the indication is received in a physical downlink shared channel (PDSCH) transmission, as part of the random access procedure.

20. A method for wireless communications at a base station, comprising:
transmitting system information to at least a first user equipment (UE) of a plurality of UEs in a broadcast transmission, the system information including a first bandwidth indication;
receiving a connection establishment request from the first UE;
determining, based at least in part on the connection establishment request, a first UE-specific channel bandwidth for communications with the first UE, wherein the first UE-specific channel bandwidth is less than or equal to a cell-specific channel bandwidth and is based at least in part on a maximum supported bandwidth of the first UE; and
transmitting a connection establishment response to the first UE that includes a plurality of indications of UE-specific channel bandwidths corresponding to respective ones of a plurality of subcarrier spacings (SCSs), the plurality of indications of UE-specific channel bandwidths including an indication of the first UE-specific channel bandwidth.

21. The method of claim 20, wherein the transmitting the connection establishment response comprises:
transmitting UE-specific radio resource control (RRC) signaling to the first UE that includes the plurality of indications of the UE-specific channel bandwidths.

22. The method of claim 20, wherein the first UE-specific channel bandwidth is different than a second UE-specific channel bandwidth of a second UE of the plurality of UEs.

23. The method of claim 20, wherein the connection establishment request includes an indication of the maximum supported bandwidth of the first UE.

24. The method of claim 23, wherein the maximum supported bandwidth of the first UE is less than or equal to the cell-specific channel bandwidth.

25. The method of claim 23, wherein the maximum supported bandwidth of the first UE is a maximum supported bandwidth part (BWP) bandwidth that is less than or equal to a full bandwidth capability of the first UE.

26. The method of claim 20, wherein the first bandwidth indication corresponds to the cell-specific channel bandwidth or a maximum channel bandwidth supported by the base station.

27. The method of claim 20, wherein the first bandwidth indication is a minimum bandwidth supported by the base station.

28. The method of claim 20, wherein the first bandwidth indication is a placeholder indication of bandwidth.

29. The method of claim 20, wherein the first UE-specific channel bandwidth is a subset of the maximum supported bandwidth of the first UE.

30. The method of claim 20, further comprising:
determining, subsequent to transmitting the connection establishment response, a second UE-specific channel bandwidth for communications with the first UE, the second UE-specific channel bandwidth having a different bandwidth than the first UE-specific channel bandwidth, a different location within the cell-specific channel bandwidth, or any combination thereof; and
transmitting an indication of the second UE-specific channel bandwidth to the first UE.

31. The method of claim 20, wherein the connection establishment request includes one or more of the maximum supported bandwidth of the first UE, a maximum carrier aggregation supported by the first UE, a capability of the first UE to dynamically or semi-statically reconfigure the first UE-specific channel bandwidth within the cell-specific channel bandwidth, a maximum modulation and coding scheme (MCS) supported by the first UE, a first UE processing timeline capability, or any combinations thereof.

32. The method of claim 20, further comprising:
configuring the first UE to use a first subset of resource blocks within the first UE-specific channel bandwidth.

33. The method of claim 32, wherein the first subset of resource blocks and a second subset of resource blocks occupy alternating resource blocks within the first UE-specific channel bandwidth.

34. A method for wireless communications at a base station, comprising:
transmitting system information to at least a first user equipment (UE) of a plurality of UEs in a broadcast transmission, the system information including a cell-specific channel bandwidth;
receiving a connection establishment request from the first UE, the connection establishment request indicating a maximum supported bandwidth of the first UE that is less than the cell-specific channel bandwidth;
determining, based at least in part on the maximum supported bandwidth of the first UE, to reject the connection establishment request from the first UE; and
transmitting, to the first UE, an indication that the connection establishment request indicating the maximum supported bandwidth of the UE is rejected.

35. The method of claim 34, wherein the indication is transmitted to the first UE prior to the first UE camping on the base station.

36. The method of claim 34, wherein the connection establishment request is a random access message transmitted to the base station as part of a random access procedure, and wherein the indication is transmitted in a random access response as part of the random access procedure.

37. The method of claim 34, wherein the indication includes an identification of one or more other base stations that are configured to support the maximum supported bandwidth of the first UE.

38. An apparatus for wireless communications at a user equipment (UE), comprising: a processor, memory in electronic communication with the processor; and instructions stored in the memory and executable by the processor to cause the apparatus to:

receive system information from a base station, the system information including a first bandwidth indication;
transmit a connection establishment request to the base station based at least in part on the system information;
receive, from the base station responsive to the connection establishment request, a plurality of indications of UE-specific channel bandwidths corresponding to respective ones of a plurality of subcarrier spacings (SCSs), the plurality of indications of UE-specific channel bandwidths including an indication of a UE-specific channel bandwidth, wherein the UE-specific channel bandwidth is less than or equal to a cell-specific channel bandwidth and is based at least in part on a maximum supported bandwidth of the UE; and
communicate with the base station using the UE-specific channel bandwidth.

39. The apparatus of claim 38, wherein the connection establishment request includes the maximum supported bandwidth of the UE.

40. The apparatus of claim 39, wherein the maximum supported bandwidth of the UE is less than or equal to the cell-specific channel bandwidth.

41. The apparatus of claim 39, wherein the maximum supported bandwidth of the UE is a maximum supported bandwidth part (BWP) bandwidth that is less than or equal to a full bandwidth capability of the UE.

42. The apparatus of claim 41, wherein the instructions are further executable by the processor to cause the apparatus to:
determine the maximum supported BWP bandwidth of the UE to include with the connection establishment request based at least in part on the full bandwidth capability of the UE, the cell-specific channel bandwidth, a current data usage of the UE, a power consumption mode of the UE, a thermal status of the UE, or any combinations thereof.

43. The apparatus of claim 38, wherein the first bandwidth indication corresponds to the cell-specific channel bandwidth or a maximum channel bandwidth supported by the base station.

44. The apparatus of claim 38, wherein the first bandwidth indication is a minimum bandwidth supported by the base station.

45. The apparatus of claim 38, wherein the first bandwidth indication is a placeholder indication of bandwidth.

46. The apparatus of claim 38, wherein the plurality of indications of the UE-specific channel bandwidths is received in UE-specific radio resource control (RRC) signaling that includes the plurality of indications of the UE-specific channel bandwidths.

47. The apparatus of claim 38, wherein the connection establishment request includes one or more of the maximum supported bandwidth of the UE, a maximum carrier aggregation supported by the UE, a UE capability to dynamically or semi-statically reconfigure the UE-specific channel bandwidth within the cell-specific channel bandwidth, a maximum modulation and coding scheme (MCS) supported by the UE, a UE processing timeline capability, or any combinations thereof.

48. The apparatus of claim 38, wherein the communicating with the base station using the UE-specific channel bandwidth comprises transmitting one or more uplink transmissions to the base station using a first subset of resource blocks within the UE-specific channel bandwidth.

49. The apparatus of claim 48, wherein the first subset of resource blocks and a second subset of resource blocks occupy alternating resource blocks within the UE-specific channel bandwidth.

50. An apparatus for wireless communications at a user equipment (UE), comprising: a processor, memory in electronic communication with the processor; and instructions stored in the memory and executable by the processor to cause the apparatus to:
receive first system information from a first base station, the first system information including a first cell-specific channel bandwidth;
transmit a first connection establishment request to the first base station based at least in part on the first system information, the first connection establishment request indicating a maximum supported bandwidth of the UE that is less than the first cell-specific channel bandwidth; and
receive, responsive to the first connection establishment request, an indication from the first base station that the first connection establishment request indicating the maximum supported bandwidth of the UE is rejected.

51. The apparatus of claim 50, wherein the instructions are further executable by the processor to cause the apparatus to:
transmit a second connection establishment request to a second base station based at least in part on second system information of the second base station, the second connection establishment request indicating the maximum supported bandwidth of the UE; and
receive, responsive to the second connection establishment request, a connection establishment response from the second base station to establish a connection with the second base station.

52. The apparatus of claim 50, wherein the indication from the first base station is received prior to the UE camping on the first base station.

53. The apparatus of claim 50, wherein the first connection establishment request is a random access message transmitted to the first base station as part of a random access procedure, and wherein the indication is received in a random access response from the first base station as part of the random access procedure.

54. The apparatus of claim 53, wherein the maximum supported bandwidth of the UE is transmitted in a physical uplink shared channel (PUSCH) transmission, and the indication is received in a physical downlink shared channel (PDSCH) transmission, as part of the random access procedure.

55. An apparatus for wireless communications at a base station, comprising: a processor, memory in electronic communication with the processor; and instructions stored in the memory and executable by the processor to cause the apparatus to:
transmit system information to at least a first user equipment (UE) of a plurality of UEs in a broadcast transmission, the system information including a first bandwidth indication;
receive a connection establishment request from the first UE;
determine, based at least in part on the connection establishment request, a first UE-specific channel bandwidth for communications with the first UE, wherein the first UE-specific channel bandwidth is less than or equal to a cell-specific channel bandwidth and is based at least in part on a maximum supported bandwidth of the first UE; and transmit a connection establishment response to the first UE that includes a plurality of indications of UE-specific channel bandwidths corresponding to respective ones of a plurality of subcarrier spacings (SCSs), the plurality of indications of UE-specific channel bandwidths including an indication of the first UE-specific channel bandwidth.

56. The apparatus of claim 55, wherein the connection establishment response is provided via UE-specific radio resource control (RRC) signaling to the first UE that includes the plurality of indications of the UE-specific channel bandwidths.

57. The apparatus of claim 55, wherein the first UE-specific channel bandwidth is different than a second UE-specific channel bandwidth of a second UE of the plurality of UEs.

58. The apparatus of claim 55, wherein the connection establishment request includes an indication of the maximum supported bandwidth of the first UE.

59. The apparatus of claim 58, wherein the maximum supported bandwidth of the first UE is less than or equal to the cell-specific channel bandwidth.

60. The apparatus of claim 58, wherein the maximum supported bandwidth of the first UE is a maximum supported bandwidth part (BWP) bandwidth that is less than or equal to a full bandwidth capability of the first UE.

61. The apparatus of claim 55, wherein the first bandwidth indication corresponds to the cell-specific channel bandwidth or a maximum channel bandwidth supported by the base station.

62. The apparatus of claim 55, wherein the first bandwidth indication is a minimum bandwidth supported by the base station.

63. The apparatus of claim 55, wherein the first bandwidth indication is a placeholder indication of bandwidth.

64. The apparatus of claim 55, wherein the first UE-specific channel bandwidth is a subset of the maximum supported bandwidth of the first UE.

65. An apparatus for wireless communications at a base station, comprising: a processor, memory in electronic communication with the processor; and instructions stored in the memory and executable by the processor to cause the apparatus to:

transmit system information to at least a first user equipment (UE) of a plurality of UEs in a broadcast transmission, the system information including a cell-specific channel bandwidth;

receive a connection establishment request from the first UE, the connection establishment request indicating a maximum supported bandwidth of the first UE that is less than the cell-specific channel bandwidth;

determine, based at least in part on the maximum supported bandwidth of the first UE, to reject the connection establishment request from the first UE; and transmit, to the first UE, an indication that the connection establishment request indicating the maximum supported bandwidth of the UE is rejected.

66. The apparatus of claim 65, wherein the indication is transmitted to the first UE prior to the first UE camping on the base station.

67. The apparatus of claim 65, wherein the connection establishment request is a random access message transmitted to the base station as part of a random access procedure, and wherein the indication is transmitted in a random access response as part of the random access procedure.

68. The apparatus of claim 65, wherein the indication includes an identification of one or more other base stations that are configured to support the maximum supported bandwidth of the first UE.

* * * * *